US012616198B2

(12) United States Patent
Habib et al.

(10) Patent No.: US 12,616,198 B2
(45) Date of Patent: May 5, 2026

(54) LIPO-CHITOOLIGOSACCHARIDE COMPOSITIONS FOR ENHANCING PLANT GROWTH

(71) Applicant: Novozymes BIOAG A/S, Bagsvaerd (DK)

(72) Inventors: Ahsan Habib, Roanoke, VA (US); Kristi Woods, Roanoke, VA (US); Michael Frodyma, St. Louis, MO (US); Shawn Semones, St. Louis, MO (US)

(73) Assignee: Novozymes BIOAG A/S, Bagsvaerd (DK)

( * ) Notice: Subject to any disclaimer, the term of this patent is extended or adjusted under 35 U.S.C. 154(b) by 0 days.

(21) Appl. No.: 18/638,945

(22) Filed: Apr. 18, 2024

(65) Prior Publication Data

US 2024/0292838 A1 Sep. 5, 2024

Related U.S. Application Data

(63) Continuation of application No. 17/898,781, filed on Aug. 30, 2022, now abandoned, which is a continuation of application No. 15/954,808, filed on Apr. 17, 2018, now Pat. No. 11,464,230, which is a continuation of application No. 15/327,671, filed as application No. PCT/US2015/041086 on Jul. 20, 2015, now abandoned.

(60) Provisional application No. 62/027,950, filed on Jul. 23, 2014.

(51) Int. Cl.

| | |
|---|---|
| ***A01N 43/16*** | (2006.01) |
| ***A01N 37/46*** | (2006.01) |
| ***A01N 43/36*** | (2006.01) |
| ***A01N 47/40*** | (2006.01) |
| ***A01N 51/00*** | (2006.01) |
| ***A01N 63/20*** | (2020.01) |
| ***A01N 63/22*** | (2020.01) |
| ***A01N 63/28*** | (2020.01) |
| ***A01N 63/38*** | (2020.01) |

(52) U.S. Cl.

CPC ............ *A01N 43/16* (2013.01); *A01N 37/46* (2013.01); *A01N 43/36* (2013.01); *A01N 47/40* (2013.01); *A01N 51/00* (2013.01); *A01N 63/20* (2020.01); *A01N 63/22* (2020.01); *A01N 63/28* (2020.01); *A01N 63/38* (2020.01); *Y02A 50/30* (2018.01)

(58) Field of Classification Search

None

See application file for complete search history.

(56) References Cited

U.S. PATENT DOCUMENTS

| | | | |
|---|---|---|---|
| 2005/0096225 | A1 | 5/2005 | Johnson |
| 2010/0048404 | A1 | 2/2010 | Hungenberg et al. |
| 2010/0113278 | A1 | 5/2010 | Suty-Heinze et al. |
| 2013/0096002 | A1 | 4/2013 | Smith et al. |

FOREIGN PATENT DOCUMENTS

| | | | |
|---|---|---|---|
| JP | H09500268 | * | 1/1997 |
| WO | 2013040366 | A1 | 3/2013 |
| WO | 2013174836 | A1 | 11/2013 |

OTHER PUBLICATIONS

Alejandro et al., 2011, Current Opinion Biotechnology, 22, 187-193.
Idris et al., 2004, Journal of Plant Diseases Protection, 111(6), 583-597.
Mao et al., 1998, Crop Protection, 17(6), 535-542.
Rethwisch et al., 2012, Annual Meet Plant Grow Reg, 46-94.

* cited by examiner

*Primary Examiner* — Alton N Pryor

(74) *Attorney, Agent, or Firm* — Adam Rucker

(57) ABSTRACT

Compositions and methods for improving one or more aspects of plant growth using synergistically effective amounts of one or more lipo-chitooligosaccharides and one or more agriculturally beneficial microorganisms, such as *Streptomyces lydicus* WYEC 108, *Trichoderma virens* GI-3 and *Bacillus amyloliquefaciens* SB3778.

18 Claims, No Drawings

LIPO-CHITOOLIGOSACCHARIDE COMPOSITIONS FOR ENHANCING PLANT GROWTH

RELATED APPLICATION

The present invention claims priority to U.S. patent application Ser. No. 17/898,781, filed Aug. 30, 2022, which is a continuation of U.S. patent application Ser. No. 15/954,808, filed Apr. 17, 2018, and issued as U.S. Pat. No. 11,464,230, which is a continuation of U.S. patent application Ser. No. 15/327,671, filed Jan. 20, 2017, now abandoned, which is itself a national stage entry of PCT/US2015/041086, filed Jul. 20, 2015, which claims priority to U.S. Provisional Patent Application No. 62/027,950, filed Jul. 23, 2014, the entire contents of each of which are hereby incorporated by reference.

FIELD OF THE INVENTION

The present invention relates to compositions and methods for enhancing plant growth.

BACKGROUND

The symbiosis between the gram-negative soil bacteria, Rhizobiaceae and Bradyrhizobiaceae, and legumes such as soybean, is well documented. The biochemical basis for these relationships includes an exchange of molecular signaling, wherein the plant-to-bacteria signal compounds include flavones, isoflavones and flavanones, and the bacteria-to-plant signal compounds, which include the end products of the expression of the bradyrhizobial and rhizobial nod genes, known as lipo-chitooligosaccharides (LCOs). The symbiosis between these bacteria and the legumes enables the legume to fix atmospheric nitrogen for plant growth, thus obviating a need for nitrogen fertilizers. Since nitrogen fertilizers can significantly increase the cost of crops and are associated with a number of polluting effects, the agricultural industry continues its efforts to exploit this biological relationship and develop new agents and methods for improving plant yield without increasing the use of nitrogen-based fertilizers.

SUMMARY OF THE CLAIMED INVENTION

The present claims encompass methods and compositions for improving plant growth with synergistic combinations of *Streptomyces lydicus* WYEC 108 and one or more lipo-chitooligosaccharides.

In a first aspect, the present claims recite a method comprising application of *Streptomyces lydicus* WYEC 108 and a lipo-chitooligosaccharide selected from the lipo-chitooligosaccharide represented herein by structure V and the lipo-chitooligosaccharide represented herein by structure VII to a plant seed in amounts effective to synergistically enhance one or more growth parameters of the plant that grows from said seed.

In a second aspect, the present claims recite a composition comprising *Streptomyces lydicus* WYEC 108 and one or more of the lipo-chitooligosaccharide represented herein by structure V and the lipo-chitooligosaccharide represented herein by structure VII in amounts effective to synergistically enhance one or more growth parameters of a plant when said composition is applied to the plant and/or to the seed from which the plant is grown.

DETAILED DESCRIPTION

The present invention is explained in greater detail below. This description is not intended to be a detailed catalog of all the different ways in which the invention may be implemented or of all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein, which do not depart from the instant invention, will be apparent to those skilled in the art in light of the instant disclosure. Hence, the following specification is intended to illustrate some particular embodiments of the invention, and not to exhaustively specify all permutations, combinations and variations thereof.

The terminology used herein is for the purpose of describing particular embodiments only and is not intended to be limiting of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For the sake of brevity and/or clarity, well-known functions or constructions may not be described in detail.

As used herein, the singular forms "a," "an," and "the" are intended to include the plural forms as well, unless the context clearly indicates otherwise.

As used herein, the terms "acaricide" and "acaricidal" refer to an agent or combination of agents the application of which is toxic to an acarid (i.e., kills an acarid, inhibits the growth of an acarid, and/or inhibits the reproduction of an acarid).

As used herein, the term "agriculturally beneficial agent" refers to any agent (e.g., chemical or biological agent) or combination of agents the application of which causes or provides a beneficial and/or useful effect in agriculture (e.g., enhanced plant growth), including, but not limited to, agriculturally beneficial microorganisms, biostimulants, nutrients, pesticides (e.g., acaricides, fungicides, gastropodicides, herbicides, insecticides, nematicides, rodenticides, and virucides), and plant signal molecules.

As used herein the terms "agriculturally beneficial microorganism," "agriculturally beneficial microbe," "beneficial microorganism," and "beneficial microbe" refer to a microorganism having at least one agriculturally beneficial property (e.g., the ability to produce an agriculturally beneficial agent, such as a one of the plant signal molecules described herein; to enhance nutrient and/or water uptake; to promote and/or enhance nitrogen fixation; to enhance growth; to enhance seed germination; to enhance seedling emergence; to increase seed number or size; to break the dormancy or quiescence of a plant; etc.).

As used herein, the term "and/or" is intended to include any and all combinations of one or more of the associated listed items, as well as the lack of combinations when interpreted in the alternative ("or").

As used herein, the term "biostimulant" refers to an agent or combination of agents the application of which enhances one or more metabolic and/or physiological processes of a plant or plant part (e.g., respiration, photosynthesis, nucleic acid uptake, ion uptake and/or nutrient delivery).

As used herein, the term "carrier" means an "agronomically acceptable carrier." An "agronomically acceptable carrier" means any material which can be used to deliver the actives (e.g., LCOs, pesticides, beneficial microorganisms, etc.) to a plant, plant part or plant growing locus (e.g., foliage, seed, soil). As used herein, the term "soil-compatible carrier" means any material which can be added to a soil without causing/having an adverse effect on plant growth, soil structure, soil drainage, or the like. As used herein, the term "seed-compatible carrier" means any material which can be added to a seed without causing/having an adverse effect on the seed, the plant that grows from the seed, seed germination, or the like. As used herein, the term "foliar-compatible carrier" means any material which can be added to a plant or plant part without causing/having an adverse effect on the plant, plant part, plant growth, plant health, or the like.

As used herein, the terms "comprise," "comprises," "comprising," "include," "includes" and "including" specify the presence of stated features, steps, operations, elements, and/or components, but do not preclude the presence or addition of one or more other features, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more. For example, a component added to a composition of the present invention would "materially alter" the composition if it increases or decreases the composition's ability to enhance plant growth by at least about 50%.

As used herein, the term "control" or "controlling" as in e.g., the phrase: the "control" of pests or pest populations, or "controlling" pests or pest populations, or as in the phrase: "controlling pests", means preventing, reducing, killing, inhibiting the growth of, inhibiting the reproduction of, and/or eliminating a pest or population of pests as defined herein. Indeed. "control" or "controlling" as used herein refers to any indicia of success in prevention, killing, inhibition, elimination, reduction or amelioration of a pest or pest population.

As used herein, the terms "effective amount," "effective concentration," and "effective dosage" (and grammatical variants thereof) refer to an amount, concentration or dosage that is sufficient to cause a desired effect (e.g., enhanced plant growth). The absolute value of the amount/concentration/dosage that is sufficient to cause the desired effect may be affected by factors such as the size (e.g., area, total acreage, etc.) of land being treated and the stability of the agriculturally beneficial agent(s) being applied. Those skilled in the art will understand how to select an effective amount/concentration/dosage using routine dose-response experiments.

As used herein, the terms "enhanced growth" and "enhanced plant growth" refer to an improvement in one or more characteristics of plant growth and/or development as compared to one or more control plants (e.g., a plant germinated from an untreated seed or an untreated plant). Exemplary plant growth/development characteristics include, but are not limited to, biomass, height, leaf length, leaf mass, leaf number, leaf surface area, leaf volume, nutrient uptake, root area, root diameter, root length, root mass, root nodulation, root number, root surface area, root volume, seed germination, seedling emergence, shoot diameter, shoot length, shoot mass, shoot number, shoot surface area, shoot volume, spread, and survival rate.

As used herein, the term "foliage" refers to those portions of a plant that normally grow above the ground, including, but not limited to, leaves, stalks, stems, flowers, fruiting bodies, and fruits.

As used herein, the terms "foliar application," "foliarly applied" and grammatical variations thereof, refer to the application of one or more active ingredients to the foliage of a plant (e.g., to the leaves of the plant). Application may be effected by any suitable means, including, but not limited to, spraying the plant with a composition comprising the active ingredient(s). In some embodiments, the active ingredient(s) is/are applied to the leaves, stems and/or stalk of the plant and not to the flowers, fruiting bodies or fruits of the plant.

As used herein, the terms "fungicide" and "fungicidal" refer to an agent or combination of agents the application of which is toxic to a fungus (i.e., kills a fungus, inhibits the growth of a fungus, and/or inhibits the reproduction of a fungus).

As used herein, the terms "herbicide" and "herbicidal" refer to an agent or combination of agents the application of which is toxic to a weed (i.e., kills a weed, inhibits the growth of a weed, and/or inhibits the reproduction of a weed).

As used herein, the terms "inoculant composition" and "inoculum" refer to compositions comprising microbial cells and/or spores, said cells/spores being capable of propagating on or in a substrate (e.g., a soil) when conditions (e.g., temperature, moisture, nutrient availability, pH, etc.) are favorable for microbial growth.

As used herein, the terms "insecticide" and "insecticidal" refer to an agent or combination of agents the application of which is toxic to an insect (i.e., kills an insect, inhibits the growth of an insect, and/or inhibits the reproduction of an insect).

As used herein, the term "isomer" includes all stereoisomers of the compounds and/or molecules to which it refers, including enantiomers and diastereomers, as well as all conformers, rotamers and tautomers, unless otherwise indicated. Compounds and/or molecules disclosed herein include all enantiomers in either substantially pure levorotatory or dextrorotatory form, or in a racemic mixture, or in any ratio of enantiomers. Where embodiments disclose a (D)-enantiomer, that embodiment also includes the (L)-enantiomer; where embodiments disclose a (L)-enantiomer, that embodiment also includes the (D)-enantiomer. Where embodiments disclose a (+)-enantiomer, that embodiment also includes the (−)-enantiomer; where embodiments disclose a (−)-enantiomer, that embodiment also includes the (+)-enantiomer. Where embodiments disclose a (S)-enantiomer, that embodiment also includes the (R)-enantiomer; where embodiments disclose a (R)-enantiomer, that embodiment also includes the (S)-enantiomer. Embodiments are intended to include any diastereomers of the compounds and/or molecules referred to herein in diastereomerically pure form and in the form of mixtures in all ratios. Unless stereochemistry is explicitly indicated in a chemical structure or chemical name, the chemical structure or chemical name is intended to embrace all possible stereoisomers, conformers, rotamers, and tautomers of compounds and/or molecules depicted.

As used herein, the terms "nematicide" and "nematicidal" refer to an agent or combination of agents the application of which is toxic to a nematode (i.e., kills a nematode, inhibits the growth of a nematode, and/or inhibits the reproduction of a nematode).

As used herein, the term "nitrogen fixing organism" refers to an organism capable of converting atmospheric nitrogen ($N_2$) into a form that may be utilized by a plant or plant part (e.g., ammonia ($NH_3$), ammonium ($NH_4$+), etc.).

As used herein, the term "nutrient" refers to a compound or element useful for nourishing a plant (e.g., vitamins, macrominerals, micronutrients, trace minerals, organic acids, etc. that are necessary for plant growth and/or development).

As used herein, the term "pest" includes any organism or virus that negatively affects a plant, including, but not limited to, organisms and viruses that spread disease, damage host plants and/or compete for soil nutrients. The term "pest" encompasses organisms and viruses that are known to associate with plants and to cause a detrimental effect on the plant's health and/or vigor. Plant pests include, but are not limited to, arachnids (e.g., mites, ticks, spiders, etc.), bacteria, fungi, gastropods (e.g., slugs, snails, etc.), invasive plants (e.g., weeds), insects (e.g., white flies, thrips, weevils, etc.), nematodes (e.g., root-knot nematode, soybean cyst nematode, etc.), rodents, and viruses (e.g., tobacco mosaic virus (TMV), tomato spotted wilt virus (TSWV), cauliflower mosaic virus (CaMV), etc.).

As used herein, the terms "pesticide" and "pesticidal" refer to agents or combinations of agents the application of which is toxic to a pest (i.e., kills a pest, inhibits the growth of a pest, and/or inhibits the reproduction of a pest). Non-limiting examples of pesticides include fungicides, herbicides, insecticides, acaricides, nematicides, rodenticides, virucides, gastropodicides, etc.

As used herein, the term "phosphate solubilizing microorganism" refers to a microorganism capable of converting insoluble phosphate into a soluble form of phosphate.

As used herein, the term "plant" can refer to a whole plant, any part thereof, or a cell or tissue culture derived from a plant. Thus, the term "plant" may refer to any of whole plants, plant components or organs (e.g., leaves, stems, roots, etc.), plant tissues, plant cells and seeds. The term "plant" includes all naturally occurring and non-naturally occurring plant populations, including, agricultural, horticultural and silvicultural plants. Thus, the term "plant" encompasses plants obtained by conventional plant breeding and optimization methods (e.g., marked-assisted selection) and plants obtained by genetic engineering, including cultivars protectable and not protectable by plant breeders' rights.

As used herein, the term "plant cell" refers to a cell of an intact plant, a cell taken from a plant, or a cell derived from a cell taken from a plant. Thus, the term "plant cell" includes cells within seeds, suspension cultures, embryos, meristematic regions, callus tissue, leaves, shoots, gametophytes, sporophytes, pollen and microspores.

As used herein, the term "plant part" can refers to any part of a plant, including single plant cells and plant tissues from which plants can be derived. Examples of plant parts, include, but are not limited to, anthers, embryos, flowers, fruits, fruiting bodies, leaves, ovules, pollen, rhizomes, roots, seeds, shoots, stems, and tubers, as well as scions, rootstocks, protoplasts, calli and the like.

As used herein, the term "plant propagation material" refers to a plant part from which a whole plant can be generated. Examples of plant propagation materials include, but are not limited to, cuttings (e.g., leaves, stems), rhizomes, seeds, tubers, and cells/tissues that can be cultured into a whole plant.

As used herein, the terms "signal molecule" and "plant signal molecule" refer to an agent that, when applied to a plant or plant part, results in enhanced growth and/or development as compared to untreated plants or plant parts (e.g., seeds and plants harvested from untreated seeds). Non-limiting examples of signal molecules include lipo-chitooligosaccharides, chitooligosaccharides, chitinous compounds, flavonoids, jasmonic acid or derivatives thereof, linoleic acid or derivatives thereof, linolenic acid or derivatives thereof, karrikins, etc.

As used herein, the terms "spore" and "microbial spore" refer to a microorganism in its dormant, protected state.

As used herein, the term "stable inoculant composition" refers to an inoculant composition's ability to improve the survival rate and/or one or more microbial stability characteristics of a microorganism contained therein. In general, an inoculant composition is labeled as "stable" if it improves the survival rate and/or at least one microbial stability characteristic of at least one microorganism contained therein.

While certain aspects of the present invention will hereinafter be described with reference to embodiments thereof, it will be understood by those of ordinary skill in the art that various changes in form and details may be made therein without departing from the spirit and scope of the present invention.

All publications, patent applications, patents, and other references mentioned herein are incorporated by reference in their entirety, except insofar as they contradict any statement expressly set forth herein.

Compositions

The compositions disclosed comprise at least one lipo-chitooligosaccharide compound (LCOs) as described herein and at least one agriculturally beneficial agent selected from the group consisting of pesticides, agriculturally beneficial microorganisms, and combinations thereof.

In a particular embodiment, the compositions disclosed comprise an effective amount of at least one lipo-chitooligosaccharide compound (LCOs) as described herein, and an effective amount of at least one agriculturally beneficial agent selected from the group consisting of at least one pesticide, at least one beneficial microorganism, and combinations thereof to enhance plant growth (e.g., increased plant yield, such as increased biomass, increased fruit number increased bolls, increased seed number or size, or a combination thereof as measured by bushels per acre, increased root number, increased root mass, increased root volume, increased leaf area, increased plant stand, increased plant vigor, faster seedling emergence (e.g., enhanced emergence), faster germination, (e.g., enhanced germination), or combinations thereof) when compared to an untreated plant or plant part.

In certain embodiments, the composition may be in the form of a liquid, a gel, a slurry, a solid, or a powder (wettable powder or dry powder). In a particular embodiment, the composition is a liquid composition.

Lipo-Chitooligosaccharides:

Lipo-chitooligosaccharide compounds (LCOs), also known as symbiotic Nod signals or Nod factors, consist of an oligosaccharide backbone of β-1,4-linked N-acetyl-D-glucosamine ("GlcNAc") residues with an N-linked fatty acyl chain condensed at the non-reducing end. LCO's differ in the number of GlcNAc residues in the backbone, in the length and degree of saturation of the fatty acyl chain, and in the substitutions of reducing and non-reducing sugar residues. See, e.g., Denarie, et al., Ann. Rev. Biochem. 65:503-35 (1996), Hamel, et al., Planta 232:787-806 (2010); Prome, et al., Pure & Appl. Chem. 70(1):55-60 (1998). An example of an LCO is presented below as formula I:

(I)

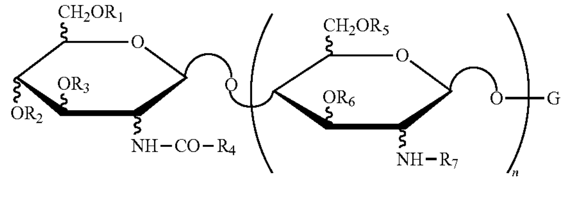

in which:

G is a hexosamine which can be substituted, for example, by an acetyl group on the nitrogen, a sulfate group, an acetyl group and/or an ether group on an oxygen, $R_1$, $R_2$, $R_3$, $R_5$, $R_6$ and $R_7$, which may be identical or different, represent H, $CH_3CO$—, $C_xH_yCO$— where x is an integer between 0 and 17, and y is an integer between 1 and 35, or any other acyl group such as for example a carbamoyl, $R_4$ represents a saturated or mono-, di- or triunsaturated aliphatic chain containing at least 12 carbon atoms, and n is an integer between 1 and 4.

LCOs may be obtained (isolated and/or purified) from bacteria such as Rhizobia, e.g., *Rhizobium* sp., *Bradyrhizobium* sp., *Sinorhizobium* sp. and *Azorhizobium* sp. LCO structures are characteristic for each such bacterial species, and each strain may produce multiple LCO's with different structures. For example, specific LCOs from *S. meliloti* have also been described in U.S. Pat. No. 5,549,718 as having the formula II:

LCOs from *Bradyrhizobium japonicum* are described in U.S. Pat. Nos. 5,175,149 and 5,321,011. Broadly, they are pentasaccharide phytohormones comprising methylfucose. A number of these *B. japonicum*-derived LCOs are described: BjNod-V ($C_{18:1}$); BjNod-V ($A_C$, $C_{18:1}$), BjNod-V ($C_{16:1}$); and BjNod-V ($A_C$, $C_{16:0}$), with "V" indicating the presence of five N-acetylglucosamines; "Ac" an acetylation; the number following the "C" indicating the number of carbons in the fatty acid side chain; and the number following the ":" the number of double bonds.

LCO's used in embodiments of the invention may be obtained (i.e., isolated and/or purified) from bacterial strains that produce LCO's, such as strains of *Azorhizobium, Bradyrhizobium* (including *B. japonicum*), *Mesorhizobium, Rhizobium* (including *R. leguminosarum*), *Sinorhizobium* (including *S. meliloti*), and bacterial strains genetically engineered to produce LCO's. In some embodiments, there is a combination of two or more LCO's obtained from these rhizobial and bradyrhizobial microorganisms.

LCO's are the primary determinants of host specificity in legume symbiosis (Diaz, et al., Mol. Plant-Microbe Interactions 13:268-276 (2000)). Thus, within the legume family, specific genera and species of rhizobia develop a symbiotic nitrogen-fixing relationship with a specific legume host. These plant-host/bacteria combinations are described in Hungria, et al., Soil Biol. Biochem. 29:819-830 (1997). Examples of these bacteria/legume symbiotic partnerships include *S. meliloti*/alfalfa and sweet clover; *R. leguminosarum* biovar *viciae*/peas and lentils; *R. leguminosarum* biovar *phaseoli*/beans; *Bradyrhizobium japonicum*/soybeans; and *R. leguminosarum* biovar *trifolii*/red clover. Hungria also lists the effective flavonoid Nod gene inducers of the rhizobial species, and the specific LCO structures that are produced by the different rhizobial species. However, LCO specificity is only required to establish nodulation in legumes. Use of a given LCO is not limited to treatment of seed of its symbiotic legume partner, in order to achieve (II)

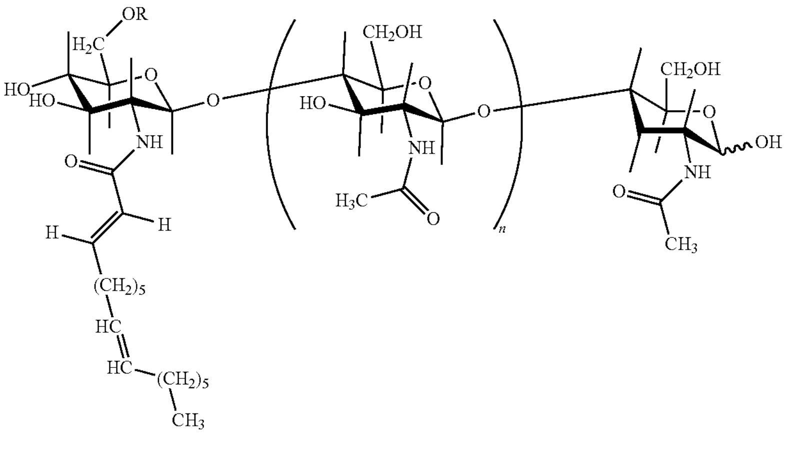

in which R represents H or $CH_3CO$— and n is equal to 2 or 3.

Even more specific LCOs include NodRM, NodRM-1, NodRM-3. When acetylated (the R=$CH_3CO$—), they become AcNodRM-1, and AcNodRM-3, respectively (U.S. Pat. No. 5,545,718).

increased plant yield measured in terms of bushels/acre, increased root number, increased root length, increased root mass, increased root volume and increased leaf area, compared to plants harvested from untreated seed.

Thus, by way of further examples, LCO's and derivatives thereof that may be useful in some embodiments are represented by the following formula:

(III)

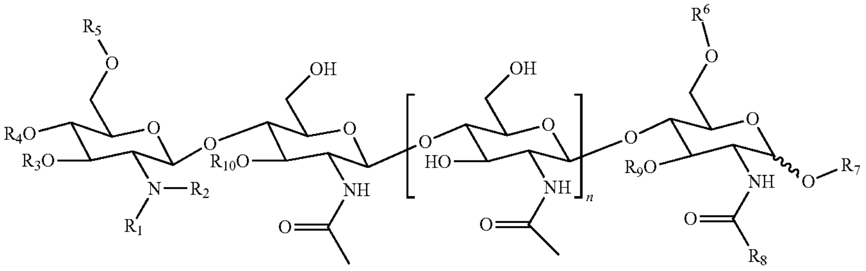

in which $R_1$ represents C14:0, 3OH—C14:0, iso-C15:0, C16:0, 3-OH—C16:0, iso-C15:0, C16:1, C16:2, C16:3, iso-C17:0, iso-C17:1, C18:0, 3OH—C18:0, C18:0/3-OH, C18:1, OH—C18:1, C18:2, C18:3, C18:4, C19:1 carbamoyl, C20:0, C20:1, 3-OH—C20:1, C20:1/3-OH, C20:2, C20:3, C22:1, and C18-26(ω-1)-OH (which according to D'Haeze, et al., Glycobiology 12:79R-105R (2002), includes C18, C20, C22, C24 and C26 hydroxylated species and C16:1Δ9, C16:2 (Δ2,9) and C16:3 (Δ2,4,9)); $R_2$ represents hydrogen or methyl; $R_3$ represents hydrogen, acetyl or carbamoyl; $R_4$ represents hydrogen, acetyl or carbamoyl; $R_5$ represents hydrogen, acetyl or carbamoyl; $R_6$ represents hydrogen, arabinosyl, fucosyl, acetyl, $SO_3H$, sulfate ester, 3-0-S-2-0-MeFuc, 2-0-MeFuc, and 4-0-AcFuc; $R_7$ represents hydrogen, mannosyl or glycerol; $R_8$ represents hydrogen, methyl, or —$CH_2OH$; $R_9$ represents hydrogen, arabinosyl, or fucosyl; $R_{10}$ represents hydrogen, acetyl or fucosyl; and n represents 0, 1, 2 or 3. The structures of the naturally occurring Rhizobial LCO's embraced by this structure are described in D'Haeze, et al., supra.

Also encompassed in some embodiments is use of LCO's obtained (i.e., isolated and/or purified) from a mycorrhizal fungi, such as fungi of the group Glomerocycota, e.g., *Glomus intraradicus*. The structures of representative LCOs obtained from these fungi are described in WO 2010/049751 and WO 2010/049751 (the LCOs described therein also referred to as "Myc factors"). Representative mycorrhizal fungi-derived LCO's and non-naturally occurring derivatives thereof are represented by the following formula:

produced through genetic engineering. The basic, naturally occurring LCO structure may contain modifications or substitutions found in naturally occurring LCO's, such as those described in Spaink, Crit. Rev. Plant Sci. 54:257-288 (2000) and D'Haeze, supra. Precursor oligosaccharide molecules (COs, which as described below, are also useful as plant signal molecules) for the construction of LCOs may also be synthesized by genetically engineered organisms, e.g., as described in Samain, et al., Carbohydrate Res. 302:35-42 (1997); Cottaz, et al., Meth. Eng. 7(4):311-7 (2005) and Samain, et al., J. Biotechnol. 72:33-47 (1999) (e.g., FIG. 1 therein which shows structures of CO's that can be made recombinantly in *E. coli* harboring different combinations of genes nodBCHL).

LCO's may be utilized in various forms of purity and may be used alone or in the form of a culture of LCO-producing bacteria or fungi. For example, OPTIMIZE® (commercially available from Novozymes BioAg Inc.) contains a culture of *B. japonicum* that produces an LCO (LCO-V(C18:1, MeFuc), MOR116). Methods to provide substantially pure LCO's include removing the microbial cells from a mixture of LCOs and the microbe, or continuing to isolate and purify the LCO molecules through LCO solvent phase separation followed by HPLC chromatography as described, for example, in U.S. Pat. No. 5,549,718. Purification can be enhanced by repeated HPLC, and the purified LCO molecules can be freeze-dried for long-term storage. Chitooli- (IV)

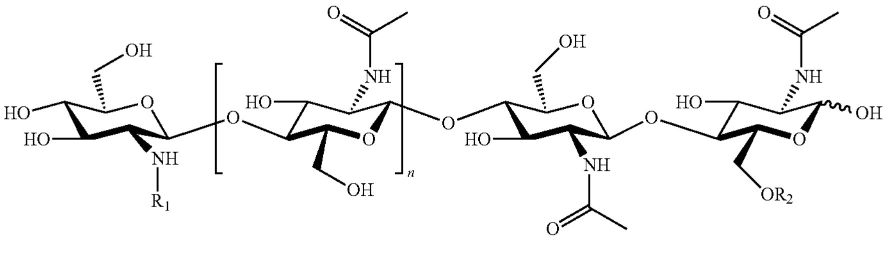

in which n=1 or 2; $R_1$ represents C16, C16:0, C16:1, C16:2, C18:0, C18:1Δ9Z or C18:1Δ11Z; and $R_2$ represents hydrogen or $SO_3H$. In some embodiments, the LCO's are produced by the mycorrhizal fungi. In some embodiments, these LCO's are used in the methods described herein.

Further encompassed in some embodiments described herein is use of synthetic LCO compounds, such as those described in WO 2005/063784 and WO 2008/071674, chemically synthesized LCO compounds, such as those described in WO 2007/117500, and recombinant LCO's gosaccharides (COs), may be used as starting materials for the production of synthetic LCOs. For the purposes of some embodiments, recombinant LCO's suitable for use are least 60% pure, e.g., at least 60% pure, at least 65% pure, at least 70% pure, at least 75% pure, at least 80% pure, at least 85% pure, at least 90% pure, at least 91% pure, at least 92% pure, at least 93% pure, at least 94% pure, at least 95% pure, at least 96% pure, at least 97% pure, at least 98% pure, at least 99% pure, up to 100% pure.

In an embodiment, the at least one LCO for use herein comprises an LCO having the following structure:
(V)
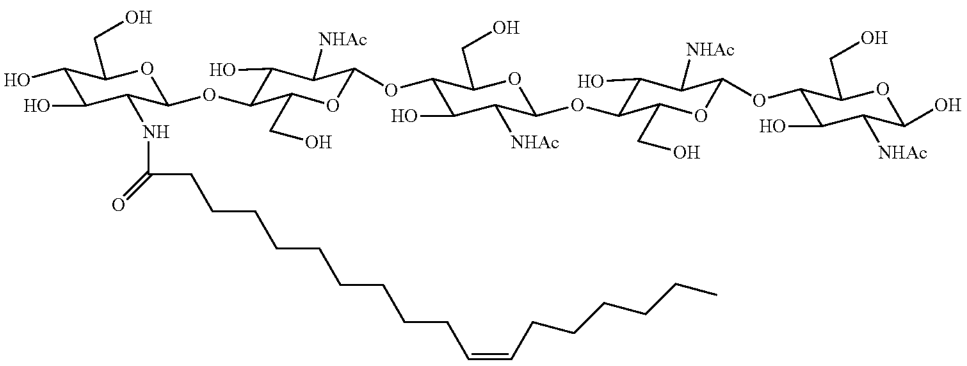
In an embodiment, the at least one LCO for use herein comprises an LCO having the following structure:
(VI)
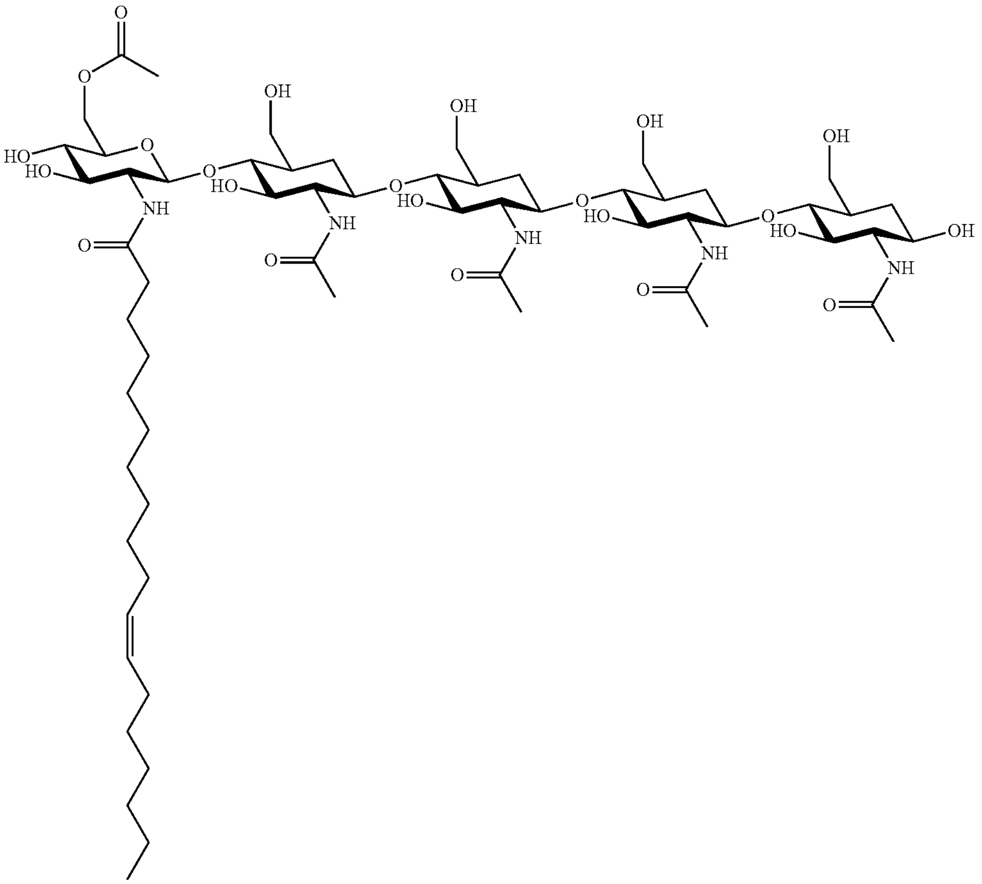

In an embodiment, the at least one LCO for use herein comprises an LCO having the following structure:
(VII)
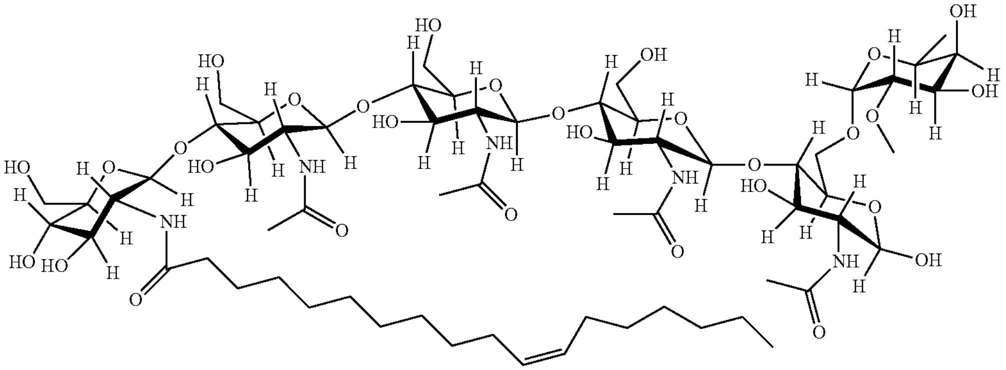
In an embodiment, the at least one LCO for use herein comprises an LCO having the following structure:
(VIII)
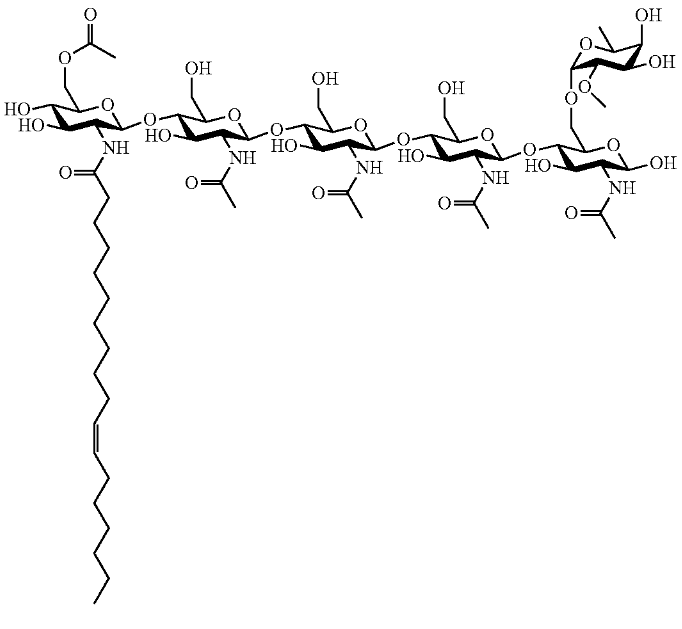

In an embodiment, the at least one LCO for use herein comprises an LCO having the following structure:
(IX)
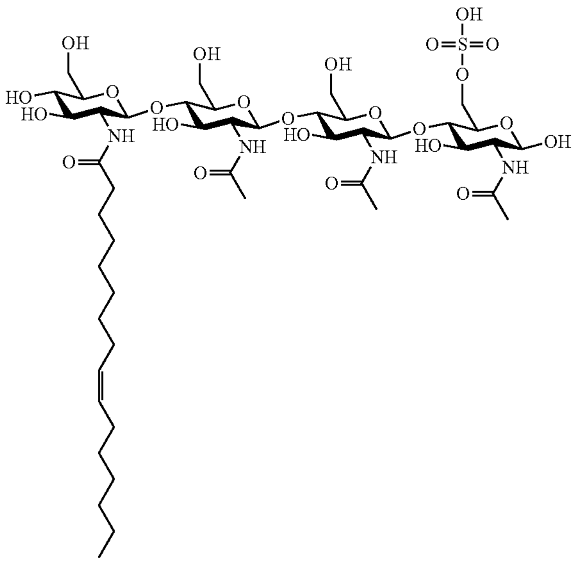
In an embodiment, the at least one LCO for use herein comprises an LCO having the following structure:
(X)
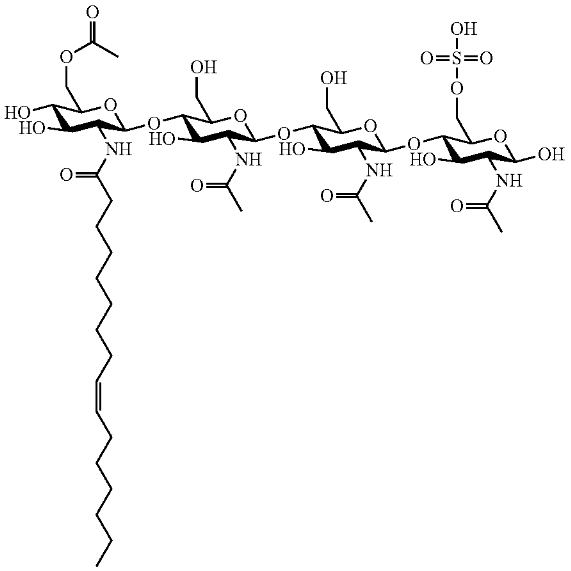
In an embodiment, the at least one LCO for use herein comprises an LCO having the following structure:
(XI)
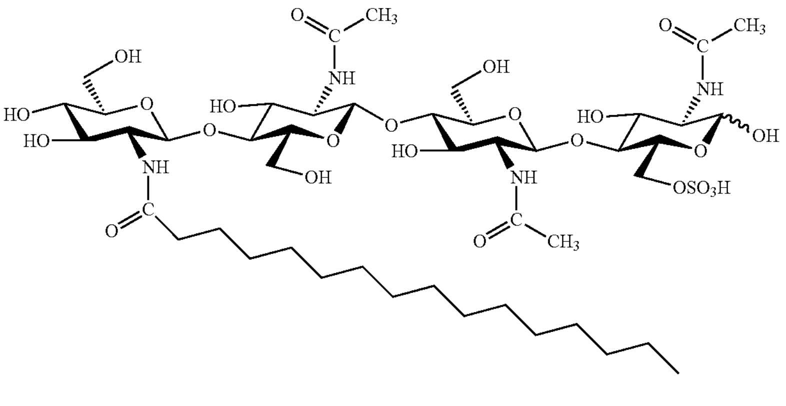

In an embodiment, the at least one LCO for use herein comprises an LCO having the following structure:

(XII)

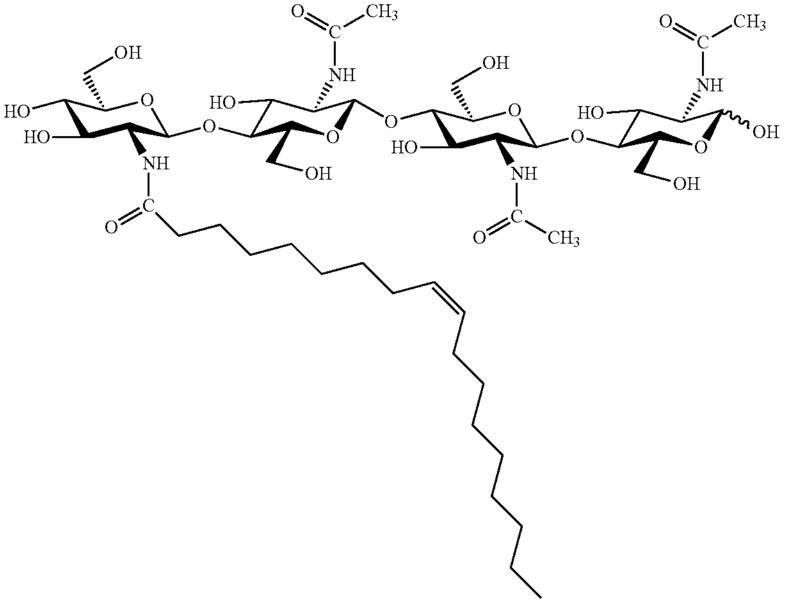

In an embodiment, the at least one LCO for use herein comprises a synthetic LCO having the following structure:

(XIII)

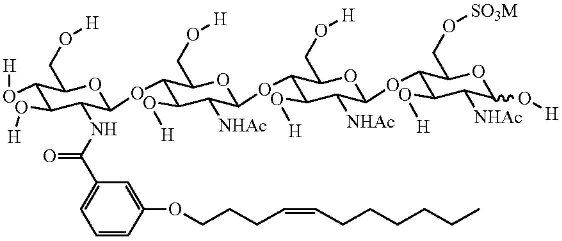

In an embodiment, the at least one LCO for use herein comprises a synthetic LCO having the following structure:

(XIV)

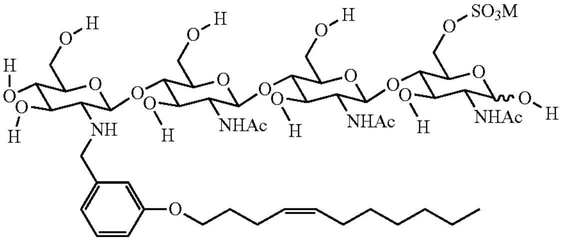

In an embodiment, the at least one LCO for use herein comprises a synthetic LCO having the following structure:

(XV)

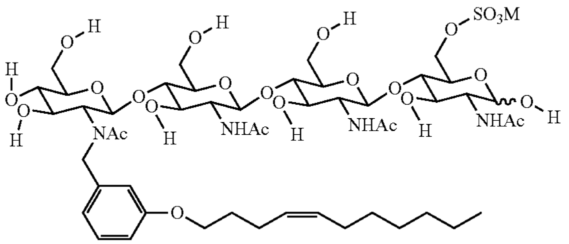

In an embodiment, the at least one LCO for use herein comprises a synthetic LCO having the following structure:

(XVI)

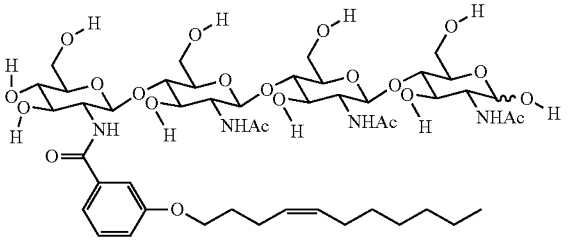

In an embodiment, the at least one LCO for use herein comprises a synthetic LCO having the following structure:

(XVII)

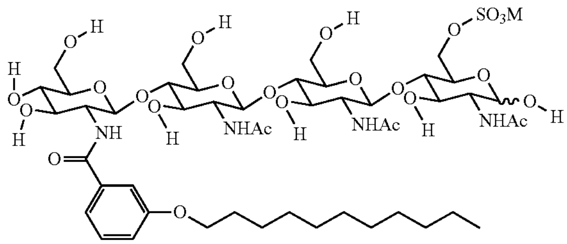

In an embodiment, the at least one LCO for use herein comprises a synthetic LCO having the following structure:

(XVIII)

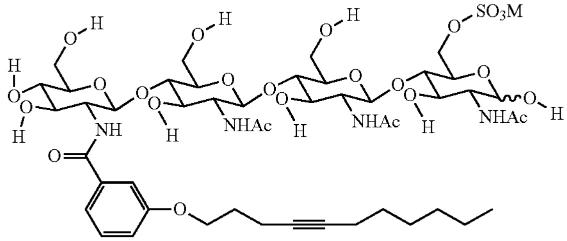

In an embodiment, the at least one LCO for use herein comprises a synthetic LCO having the following structure:

(XIX)

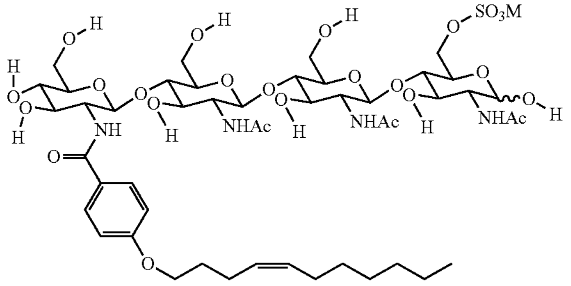

In an embodiment, the at least one LCO for use herein comprises a synthetic LCO having the following structure:

(XX)

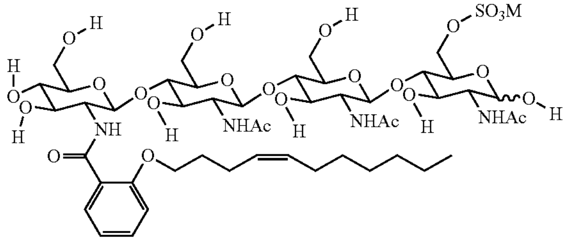

In an embodiment, the at least one LCO for use herein comprises a synthetic LCO having the following structure:

(XXI)

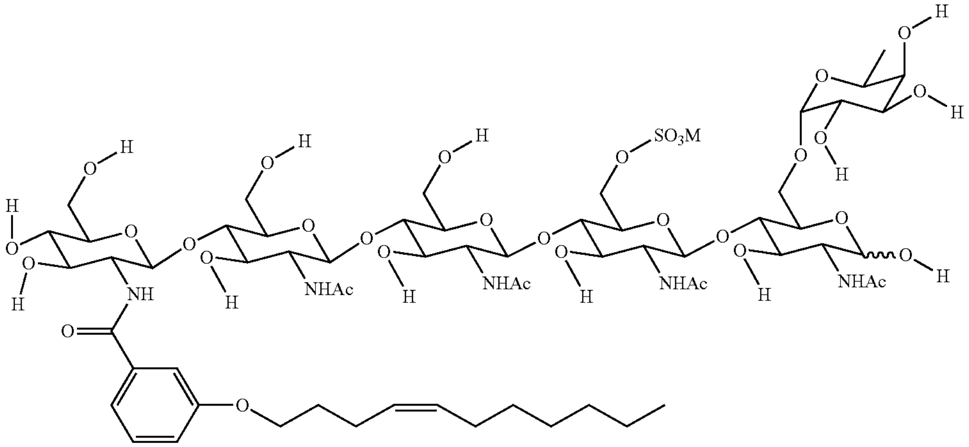

In an embodiment, the at least one LCO for use herein comprises a synthetic LCO having the following structure:

(XXII)

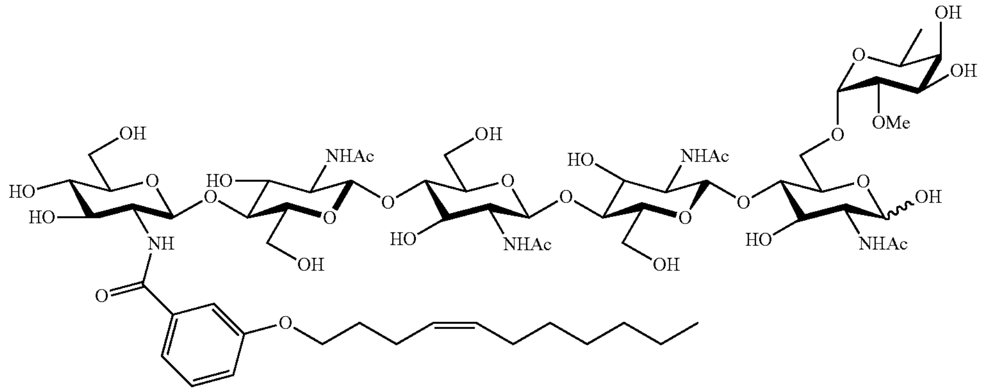

In an embodiment, the at least one LCO for use herein comprises a synthetic LCO having the following structure:

(XXIII)

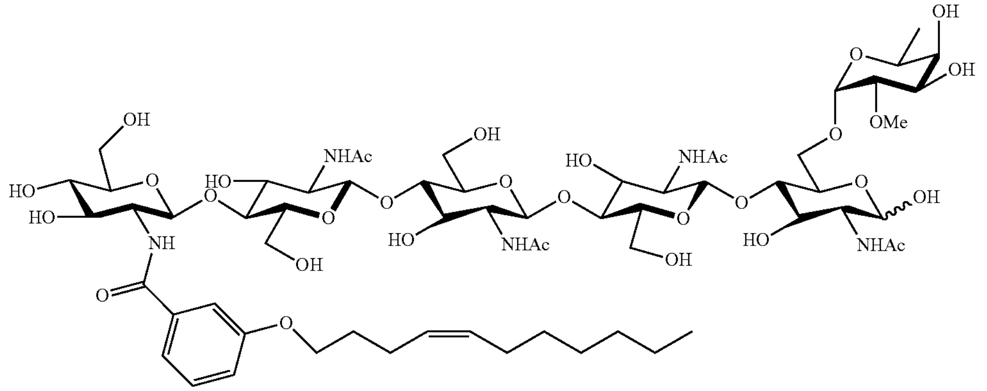

In an embodiment, the at least one LCO for use herein comprises a synthetic LCO having the following structure:

(XXIV)

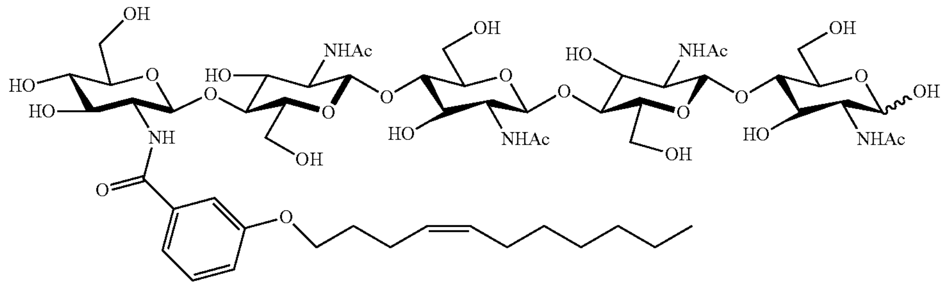

In an embodiment, the at least one LCO for use herein comprises a synthetic LCO having the following structure:

(XXV)
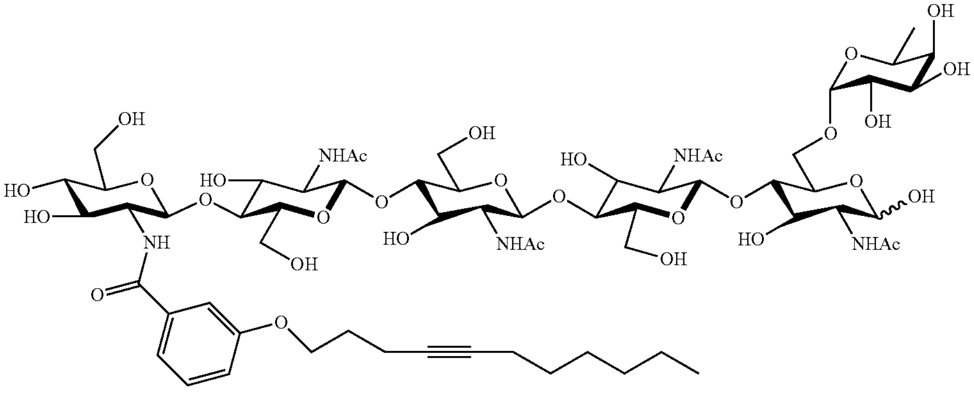
In an embodiment, the at least one LCO for use herein comprises a synthetic LCO having the following structure:
(XXVI)
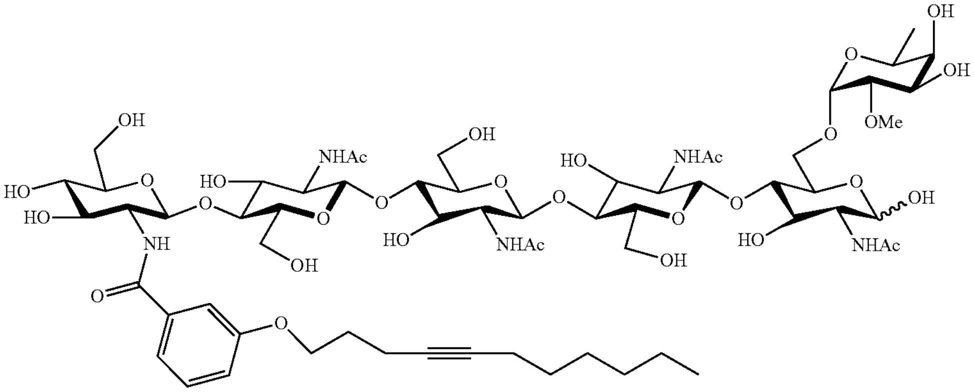
In an embodiment, the at least one LCO for use herein comprises a synthetic LCO having the following structure:
(XXVII)
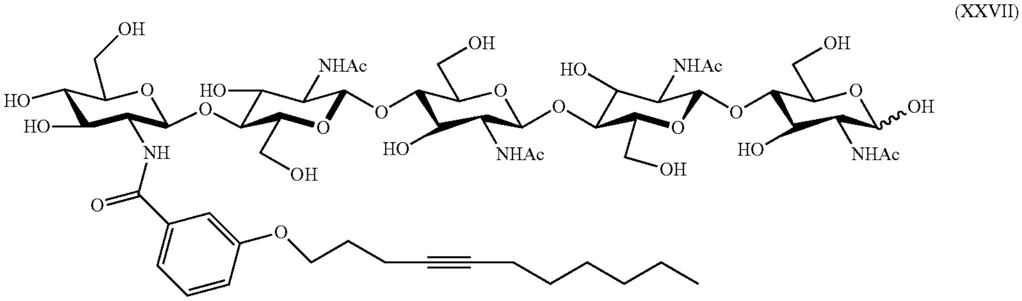
In an embodiment, the at least one LCO for use herein comprises a synthetic LCO having the following structure:

(XXVIII)
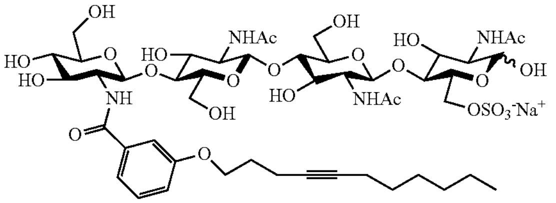
In an embodiment, the at least one LCO for use herein comprises a synthetic LCO having the following structure:
(XXIX)
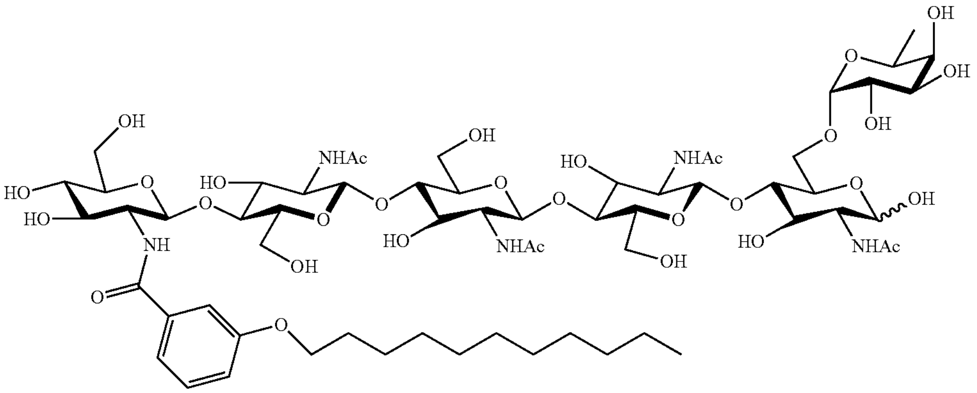
In an embodiment, the at least one LCO for use herein comprises a synthetic LCO having the following structure:
(XXX)
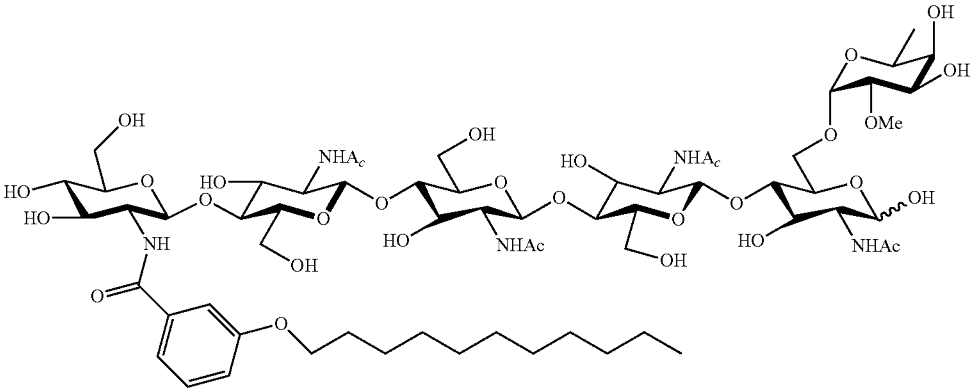
In an embodiment, the at least one LCO for use herein comprises a synthetic LCO having the following structure:

(XXXI)

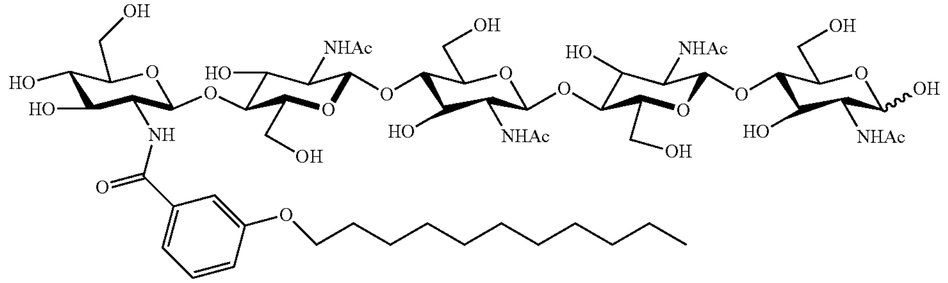

In an embodiment, the at least one LCO for use herein comprises a synthetic LCO having the following structure:

(XXXII)

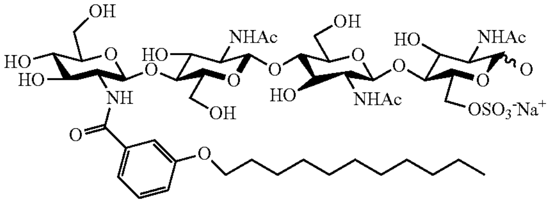

In an embodiment, the at least one LCO for use herein comprises a synthetic LCO having the following structure:

(XXXIII)

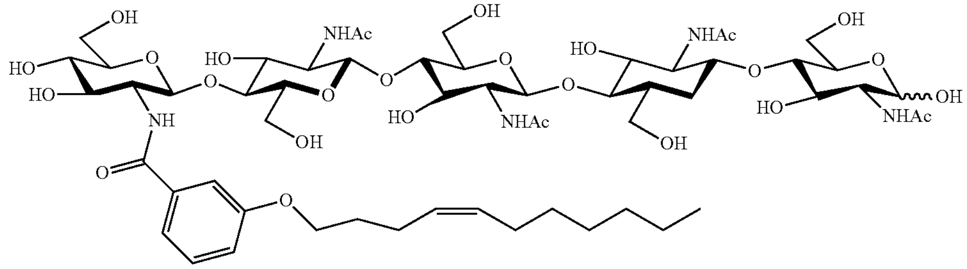

In one embodiment, the at least one LCO used in the compositions described herein may comprises at least two of the above LCOs (i.e., at least two of I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII), at least three of the above LCOs, at least four of the above LCOs, at least five of the above LCOs, at least six of the above LCOs, at least seven of the above LCOs, at least eight of the above LCOs, at least nine of the above LCOs, at least ten of the above LCOs, at least eleven of the above LCOs, at least twelve of the above LCOs, at least thirteen of the above LCOs, at least fourteen of the above LCOs, at least fifteen of the above LCOs, at least sixteen of the above LCOs, at least seventeen of the above LCOs at least eighteen of the above LCOs, at least nineteen of the above LCOs, at least twenty of the above LCOs, at least twenty-one of the above LCOs, at least twenty-two of the above LCOs, at least twenty-three of the above LCOs, at least twenty-four of the above LCOs, at least twenty-five of the above LCOs, at least twenty-six of the above LCOs, at least twenty-seven of the above LCOs, at least twenty-eight of the above LCOs, at least twenty-nine of the above LCOs, at least thirty of the above LCOs, at least thirty-one of the above LCOs, at least thirty-two of the above LCOs, and up to and including, all thirty-three of the above LCOs.

In another embodiment, the at least one LCO used in the compositions described herein (i.e., at least one of I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII), are combined with at least one pesticide, at least one beneficial microorganism, and combiations thereof.

In some embodiments, the compositions described herein comprise about $1\times10^{-20}$ M to about $1\times10^{-1}$ M LCO. For example, the compositions described herein may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M of one or more LCOs. In some preferred embodiments, the LCO concentration is $1\times10^{-14}$ M to $1\times10^{-5}$ M, $1\times10^{-12}$ M to $1\times10^{-6}$ M, or $1\times10^{-10}$ M to $1\times10^{-7}$ M. In some preferred embodiments, the LCO concentration is $1\times10^{-14}$ M to $1\times10^{-5}$ M, $1\times10^{-12}$ M to $1\times10^{-6}$ M, or $1\times10^{-10}$ M to $1\times10^{-7}$ M.

Pesticides:

Pesticides useful to compositions described herein may be chemical pesticides, biological pesticides, or combinations thereof. Non-limiting examples of pesticides that may be useful to compositions described herein include fungicides, herbicides, insecticides, acaricides, nematicides, rodenticides, virucides, and combinations thereof. In particular embodiments, the compositions described herein comprise fungicides, herbicides, insecticides, acaricides, nematicides, and combinations thereof.

Fungicides:

In one embodiment, the compositions described herein may comprise at least one fungicide ("f"). Fungicides useful to the compositions described herein may be biological fungicides ("bf"), chemical fungicides ("cf"), or combinations thereof. Fungicides may be selected so as to be provide effective control against a broad spectrum of phytopathogenic fungi, including soil-borne fungi, which derive especially from the classes of the Plasmodiophoromycetes, Peronosporomycetes (syn. Oomycetes), Chytridiomycetes, Zygomycetes, Ascomycetes, Basidiomycetes, and Deuteromycetes (syn. Fungi imperfecti). More common fungal pathogens that may be effectively targeted include *Pytophthora, Rhizoctonia, Fusarium, Pythium, Phomopsis* or *Selerotinia* and *Phakopsora* and combinations thereof.

Biological Fungicides ("bf"):

In embodiments, the biological fungicide ("bf") can be at least one bacterium of the genus *Actinomycetes, Agrobacterium, Arthrobacter, Alcaligenes, Aureobacterium, Azobacter, Bacillus, Beijerinckia, Brevibacillus, Burkholderia, Chromobacterium, Clostridium, Clavibacter, Comomonas, Corynebacterium, Curtobacterium, Enterobacter, Flavobacterium, Gluconobacter, Hydrogenophage, Klebsiella, Methylobacterium, Paenibacillus, Pasteuria, Phingobacterium, Photorhabdus, Pseudomonas, Phyllobacterium, Rhizobium, Serratia, Stenotrophomonas, Streptomyces, Variovorax*, and *Xenorhadbus*. In particular embodiments the bacteria is selected from the group consisting of *Bacillus amyloliquefaciens, Bacillus cereus, Bacillus firmus, Bacillus, licheniformis, Bacillus pumilus, Bacillus sphaericus, Bacillus subtilis, Bacillus thuringiensis, Pasteuria penetrans, Pasteuria usage, Pseudomona fluorescens*, and combinations thereof.

In embodiments the biological fungicide ("bf") can be a fungus of the genus *Alternaria, Ampelomyces, Aspergillus, Aureobasidium, Beauveria, Candida, Colletotrichum, Coniothyrium, Cryphonectria, Fusarium, Gliocladium, Metarhizium, Metschnikowia, Microdochium, Muscodor, Paecilonyces, Phlebiopsis, Pseudozyma, Pythium, Trichoderma, Typhula, Ulocladium*, and *Verticilium*. In particular embodiments the fungus is *Beauveria bassiana, Coniothyrium minitans, Gliocladium virens, Metarhizium anisopliae* (also may be referred to in the art as *Metarrhizium anisopliae, Metarhizium brunneum*, or "green muscadine"), *Muscodor albus, Paecilomyces lilacinus, Trichoderma polysporum*, and combinations thereof.

Non-limiting examples of biological fungicides ("bf") that may be suitable for use in the compositions disclosed herein include *Ampelomyces quisqualis* (bf.1) (e.g., AQ 10® (bf.1a) from Intrachem Bio GmbH & Co. KG, Germany), *Aspergillus flavus* (bf.2) (e.g., AFLAGUARD® (bf.2a) from Syngenta, CH), *Aureobasidium pullulans* (bf.3) (e.g., BOTECTOR® (bf.3a) from bio-ferm GmbH, Germany), *Bacillus pumilus* (bf.4), *Bacillus pumilus* isolate AQ717, NRRL B-21662 (bf.4a) (from Fa. AgraQuest Inc., USA), *Bacillus pumilus* isolate NRRL B-30087 (bf.4b) (from Fa. AgraQuest Inc., USA), *Bacillus* sp., isolate AQ175, ATCC 55608 (bf.5) (from Fa. AgraQuest Inc., USA), *Bacillus* sp., isolate AQ177, ATCC 55609 (bf.6) (from Fa. AgraQuest Inc., USA), *Bacillus subtilis* (bf.7), *Bacillus subtilis* isolate AQ713, NRRL B-21661 (bf.7a) (in RHAPSODY®, SERENADE® MAX and SERENADE® ASO) (from Fa. AgraQuest Inc., USA), *Bacillus subtilis* isolate AQ743, NRRL B-21665 (bf.7b) (from Fa. AgraQuest Inc., USA), *Bacillus amyloliquefaciens* (bf.8) *Bacillus amyloliquefaciens* FZB24 (bf.8a) (e.g., TAEGRO® (bf.8b) from Novozymes Biologicals, Inc., USA), *Bacillus amyloliquefaciens* isolate NRRL B-50349 (bf.8c), *Bacillus amyloliquefaciens* TJ1000 (bf.8d) (i.e., also known as 1BE, isolate ATCC BAA-390), *Bacillus thuringiensis* (bf.9), *Bacillus thuringiensis* isolate AQ52, NRRL B-21619 (bf.9a) (from Fa. AgraQuest Inc., USA), *Candida oleophila* (bf.10), *Candida oleophila* I-82 (bf.10a) (e.g., ASPIRE® (bf.10b) from Ecogen Inc., USA), *Candida saitoana* (bf.11) (e.g., BIOCURE® (bf.11a) (in mixture with lysozyme) and BIOCOAT® (bf.11b) from Micro Flo Company, USA (BASF SE) and Arysta), *Clonostachys rosea* f. *catenulata*, also named *Gliocladium catenulatum* (bf.12) (e.g., isolate J1446: PRESTOP® (bf.12a) from Verdera, Finland), *Coniothyrium minitans* (bf.13) (e.g., CONTANS® (bf.13a) from Prophyta, Germany), *Cryphonectria parasitica* (bf.14) (e.g., *Endothia parasitica* (bf.14a) from CNICM, France), *Cryptococcus albidus* (bf.15) (e.g., YIELD PLUS® (bf.15a) from Anchor Bio-Technologies, South Africa), *Fusarium oxysporum* (bf.16) (e.g., BIOFOX® (bf.16a) from S.I.A.P.A., Italy, FUSACLEAN® from Natural Plant Protection, France), *Metschnikowia fructicola* (bf.17) (e.g., SHEMER® (bf.17a) from Agrogreen, Israel), *Microdochium dimerum* (bf.18) (e.g., ANTIBOT® (bf.18a) from Agrauxine, France), *Muscodor albus* (bf.19), *Muscodor albus* isolate NRRL 30547 (bf.19a) (from Fa. AgraQuest Inc., USA), *Muscodor roseus* (bf.20), *Muscodor roseus* isolate NRRL 30548 (bf.20a) (from Fa. AgraQuest Inc., USA), *Phlebiopsis gigantea* (bf.21) (e.g., ROTSOP® (bf.21a) from Verdera, Finland), *Pseudozyma flocculosa* (bf.22) (e.g., SPORODEX® (bf.22a) from Plant Products Co. Ltd., Canada), *Pythium oligandrum* (bf.23), *Pythium oligandrum* DV74 (bf.23a) (e.g., POLYVERSUM® (bf.23b) from Remeslo SSRO, Biopreparaty, Czech Rep.), *Talaromyces flavus* (bf.24), *Talaromyces flavus* V117b (bf.24a) (e.g., PROTUS® (bf.24b) from Prophyta, Germany), *Trichoderma asperellum* (bf.25), *Trichoderma asperellum* SKT-1 (bf.25a) (e.g., ECO-HOPE® (bf.25b) from Kumiai Chemical Industry Co., Ltd., Japan), *Trichoderma atroviride* (bf.26), *Trichoderma atroviride* LC52 (bf.26a) (e.g., SENTINEL® (bf.26b) from Agrimm Technologies Ltd, NZ), *Trichoderma harzianum* (bf.27), *Trichoderma harzianum* T-22 (bf.27a) (e.g., PLANTSHIELD® (bf.27b) der Firma BioWorks Inc., USA), *Trichoderma harzianum* TH-35 (bf.27c) (e.g., ROOT PRO® (bf.27d) from Mycontrol Ltd., Israel), *Trichoderma harzianum* T-39 (bf.27e) (e.g., TRICHODEX® and TRICHODERMA 2000® (bf.27f) from Mycontrol Ltd., Israel and Makhteshim Ltd., Israel), *Trichoderma harzianum* ICC012 (bf.27g), *Trichoderma harzianum* and *Trichoderma viride* (bf.28) (e.g., TRICHOPEL (bf.28a) from Agrimm Technologies Ltd, NZ), *Trichoderma harzianum* ICC012 and *Trichoderma viride* ICC080 (bf.28b) (e.g., REMEDIER® WP (bf.28c) from Isagro Ricerca, Italy), *Trichoderma polysporum* and *Trichoderma harzianum* (bf.29) (e.g., BINAB® (bf.29a) from BINAB Bio-Innovation AB, Sweden), *Trichoderma stromaticum* (bf.30) (e.g., TRICOVAB® (bf.30a) from C.E.P.L.A.C., Brazil), *Trichoderma virens* (bf.31), *Trichoderma virens* GL-21 (bf.31a) (e.g., SOILGARD® (bf.31b) from Certis LLC, USA), *Trichoderma virens* G1-3 (bf.31c) (e.g., ATCC 58678, from Novozymes BioAg, Inc.), *Trichoderma virens* G1-21 (bf.31d) (commercially available from Thermo Trilogy Corporation), *Trichoderma virens* and *Bacillus amyloliquefaciens* (bf.32), *Trichoderma virens* G1-3 and *Bacillus amyloliquefaciens* FZB24 (bf.32a), *Trichoderma virens* G1-3 and *Bacillus amyloliquefaciens* isolate NRRL B-50349 (bf.32b), *Trichoderma virens* G1-3 and *Bacillus amyloliquefaciens* TJ1000 (bf.32c), *Trichoderma virens* G1-21 and *Bacillus amyloliquefaciens* FZB24 (bf.32d), *Trichoderma virens* G1-21 and *Bacillus amyloliquefaciens* isolate NRRL B-50349 (bf.32e), *Trichoderma virens* G1-21 and *Bacillus amyloliquefaciens* TJ1000 (bf.32f), *Trichoderma viride* (bf.33) (e.g., TRIECO® (bf.33a) from Ecosense Labs. (India) Pvt. Ltd., Indien, BIO-CURE® F from T. Stanes & Co. Ltd., Indien), *Trichoderma viride* TV1 (bf.33b) (e.g., *Trichoderma viride* TV1 from Agribiotec srl, Italy), *Trichoderma viride* ICC080 (bf.33c), *Streptomyces* sp. isolate NRRL No. B-30145 (bf.34) (from Fa. AgraQuest Inc., USA), *Streptomyces* sp. isolate M1064 (bf.35) (from Fa. AgraQuest Inc., USA), *Streptomyces galbus* (bf.36), *Streptomyces galbus* isolate NRRL 30232 (bf.36a) (from Fa. AgraQuest Inc., USA), *Streptomyces lydicus* (bf.37), *Streptomyces lydicus* WYEC 108 (bf.37a) (e.g., isolate ATCC 55445 in ACTINOVATER, ACTINOVATE AG®, ACTINOVATE STP®, ACTINO-IRON®, ACTINOVATE L&GR, and ACTINOGROW® from Idaho Research Foundation, USA), *Streptomyces violaceusniger* (bf.38), *Streptomyces violaceusniger* YCED 9 (bf.38a) (e.g., isolate ATCC 55660 in DE-THATCH-9R, DECOMP-9R, and THATCH CONTROL® from Idaho Research Foundation, USA), *Streptomyces* WYE 53 (bf.39) (e.g., isolate ATCC 55750 in DE-THATCH-9®, DECOMP-9®, and THATCH CONTROL® from Idaho Research Foundation, USA) and *Ulocladium oudemansii* (bf.40), *Ulocladium oudemansii* HRU3 (bf.40a) (e.g., BOTRY-ZEN® (bf.40b) from Botry-Zen Ltd, NZ).

In particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one biological fungicide ("bf") selected from (bf.1) to (bf.40b); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one biological fungicide selected from the group consisting of (bf.1), (bf.1a), (bf.2), (bf.2a), (bf.3), (bf.4), (bf.4a), (bf.4b), (bf.5), (bf.6), (bf.7), (bf.7a), (bf.7b), (bf.8), (bf.8a), (bf.8b), (bf.8c), (bf.8d), (bf.9), (bf.9a), (bf.10), (bf.10a), (bf.10b), (bf.11), (bf.11a), (bf.11b), (bf.12), (bf.12a), (bf.13), (bf.13a), (bf.14), (bf.14a), (bf.15), (bf.15a), (bf.16), (bf.16a), (bf.17), (bf.17a), (bf.18), (bf.18a), (bf.19), (bf.19a), (bf.20), (bf.20a), (bf.21), (bf.21a), (bf.22), (bf.22a), (bf.23), (bf.23a), (bf.23b), (bf.24), (bf.24a), (bf.24b), (bf.25), (bf.25a), (bf.25b), (bf.26), (bf.26a), (bf.26b), (bf.27), (bf.27a), (bf.27b), (bf.27c), (bf.27d), (bf.27e), (bf.27f), (bf.27g), (bf.28), (bf.28a), (bf.28b), (bf.28c), (bf.29), (bf.29a), (bf.30), (bf.30a), (bf.31), (bf.31a), (bf.31b), (bf.31c), (bf.31d), (bf.32), (bf.32a), (bf.32b), (bf.32c), (bf.32d), (bf.32e), (bf.32f), (bf.33), (bf.33a), (bf.33b), (bf.33c) (bf.34), (bf.35), (bf.36), (bf.36a), (bf.37), (bf.37a), (bf.37a), (bf.38), (bf.38a), (bf.39), (bf.40), (bf.40a), (bf.40b) and combinations thereof.

In further embodiments, the biological fungicide can be plant growth activators or plant defense agents including, but not limited to harpin, *Reynoutria sachlinensis* (e.g., REGALIA® (from Marrone BioInnovations, USA).

Chemical Fungicides ("cf")

In certain embodiments, the fungicide is a chemical fungicide ("cf"). Representative examples of useful chemical fungicides ("cf") that may be suitable for use in the present disclosure include aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides, and triazoles:

A) Strobilurins (cf.A):
 azoxystrobin (cf.A1), coumethoxystrobin (cf.A2), coumoxystrobin (cf.A3), dimoxystrobin (cf.A4), enestroburin (cf.A5), fluoxastrobin (cf.A6), kresoxim-methyl (cf.A7), metominostrobin (cf.A8), orysastrobin (cf.A9), picoxystrobin (cf.A10), pyraclostrobin (cf.A11), pyrametostrobin (cf.A12), pyraoxystrobin (cf.A13), pyribencarb (cf.A14), trifloxystrobin (cf.A15), 2-[2-(2,5-dimethyl-phenoxymethyl)-phenyl]-3-methoxy-acrylic acid methyl ester (cf.A16), and 2-(2-(3-(2,6-dichlorophenyl)-1-methyl-allylideneaminooxymethyl)-phenyl)-2-methoxyimino-N-methyl-acetamide (cf.A17);

B) Carboxamides (cf.B):
 carboxanilides (cf.B1): benalaxyl (cf.B1a), benalaxyl-M (cf.B1b), benodanil (cf.B1c), bixafen (cf.B1d), boscalid (cf.B1d), carboxin (cf.B1e), fenfuram (cf.B1f), fenhexamid (cf.B1g), flutolanil (cf.B1h), fluxapyroxad (cf.B1i), furametpyr (cf.B1j), isopyrazam (cf.B1k), isotianil (cf.B1l), kiralaxyl (cf.B1m), mepronil (cf.B1n), metalaxyl (cf.B1o), metalaxyl-M (mefenoxam) (cf.B1p), ofurace (cf.B1q), oxadixyl (cf.B1r), oxycarboxin (cf.B1s), penflufen (cf.B1t), penthiopyrad (cf.B1u), sedaxane (cf.B1v), tecloftalam (cf.B1w), thifluzamide (cf.B1x), tiadinil (cf.B1y), 2-amino-4-methyl-thiazole-5-carboxanilide (cf.B1z), N-(4'-trifluoromethylthiobiphenyl-2-yl)-3-difluoromethyl-1-methyl-1H-pyra-zole-4-carboxamide (cf.B1aa), and N-(2-(1,3,3-trimethylbutyl)-phenyl)-1,3-dimethyl-5-fluoro-1H-pyrazole-4-carboxamide (cf.B1ab);
 carboxylic morpholides (cf.B2): dimethomorph (cf.B2a), flumorph (cf.B2b), pyrimorph (cf.B2c);
 benzoic acid amides (cf.B3): flumetover (cf.B3a), fluopicolide (cf.B3b), fluopyram (cf.B3c), zoxamide (cf.B3d);
 other carboxamides (cf.B4): carpropamid (cf.B4a), dicyclomet (cf.B4b), mandipropamid (cf.B4c), oxytetracyclin (cf.B4d), silthiofam (cf.B4e), and N-(6-methoxy-pyridin-3-yl) cyclopropanecarboxylic acid amide (cf.B4f);

C) Azoles (cf.C):
 triazoles (cf.C1): azaconazole (cf.C1a), bitertanol (cf.C1b), bromuconazole (cf.C1c), cyproconazole (cf.C1d), difenoconazole (cf.C1e), diniconazole (cf.C1f), diniconazole-M (cf.C1g), epoxiconazole (cf.C1h), fenbuconazole (cf.C1i), fluquinconazole (cf.C1j), flusilazole (cf.C1k), flutriafol (cf.C1l), hexaconazole (cf.C1m), imibenconazole (cf.C1n), ipconazole (cf.C1o), metconazole (cf.C1p), myclobutanil (cf.C1q), oxpoconazole (cf.C1r), paclobutrazole (cf.C1s), penconazole (cf.C1t), propiconazole (cf.C1u), prothioconazole (cf.C1v), simeconazole (cf.C1w), tebuconazole (cf.C1x), tetraconazole (cf.C1y), triadimefon (cf.C1z), triadimenol (cf.C1aa), triticonazole (cf.C1ab), uniconazole (cf.C1ac);

imidazoles (cf.C2): cyazofamid (cf.C2a), imazalil (cf.C2b), pefurazoate (cf.C2c), prochloraz (cf.C2d), triflumizol (cf.C2e);

D) Heterocyclic Compounds (cf.D):

pyridines (cf.D1): fluazinam (cf.D1a), pyrifenox (cf.D1b), 3-[5-(4-chloro-phenyl)-2,3-dimethyl-isoxazolidin-3-yl]-pyridine (cf.D1c), 3-[5-(4-methyl-phenyl)-2,3-dimethyl-isoxazolidin-3-yl]-pyridine (cf.D1d);

pyrimidines (cf.D2): bupirimate (cf.D2a), cyprodinil (cf.D2b), diflumetorim (cf.D2c), fenarimol (cf.D2d), ferimzone (cf.D2e), mepanipyrim (cf.D2f), nitrapyrin (cf.D2g), nuarimol (cf.D2h), pyrimethanil (cf.D2i);

piperazines (cf.D3): triforine (cf.D3a);

pyrroles (cf.D4): fenpiclonil (cf.D4a), fludioxonil (cf.D4b);

morpholines (cf.D5): aldimorph (cf.D5a), dodemorph (cf.D5b), dodemorph-acetate (cf.D5c), fenpropimorph (cf.D5d), tridemorph (cf.D5e);

piperidines (cf.D6): fenpropidin (cf.D6a);

dicarboximides (cf.D7): fluoroimid (cf.D7a), iprodione (cf.D7b), procymidone (cf.D7c), vinclozolin (cf.D7d);

non-aromatic 5-membered heterocycles (cf.D8): famoxadone (cf.D8a), fenamidone (cf.D8b), flutianil (cf.D8c), octhilinone (cf.D8d), probenazole (cf.D8e), 5-amino-2-isopropyl-3-oxo-4-ortho-tolyl-2,3-dihydro-pyrazole-1-carbothioic acid S-allyl ester (cf.D8f);

others (cf.D9): acibenzolar-S-methyl (cf.D9a), ametoctradin (cf.D9b), amisulbrom (cf.D9c), anilazin (cf.D9d), blasticidin-S (cf.D9e), captafol (cf.D9f), captan (cf.D9g), chinomethionat (cf.D9h), dazomet (cf.D9i), debacarb (cf.D9j), diclomezine (cf.D9k), difenzoquat (cf.D9l), difenzoquat-methylsulfate (cf.D9m), fenoxanil (cf.D9n), Folpet (cf.D9o), oxolinic acid (cf.D9p), piperalin (cf.D9q), proquinazid (cf.D9r), pyroquilon (cf.D9s), quinoxyfen (cf.D9t), triazoxide (cf.D9u), tricyclazole (cf.D9v), 2-butoxy-6-iodo-3-propylchromen-4-one (cf.D9w), 5-chloro-1-(4,6-dimethoxy-pyrimidin-2-yl)-2-methyl-1H-benzoimidazole (cf.D9x), and 5-chloro-7-(4-methylpiperidin-1-yl)-6-(2,4,6-trifluoro-phenyl)-[1,2,4]triazolo-[1,5-a]pyrimidine (cf.D9y);

E) Benzimidazoles (cf.E): Carbendazim (cf.E1).

F) Other Active Substances (cf.F):

guanidines (cf.F1): guanidine (cf.F1a), dodine (cf.F1b), dodine free base (cf.F1c), guazatine (cf.F1d), guazatine-acetate (cf.F1e), iminoctadine (cf.F1f), iminoctadine-triacetate (cf.F1g), iminoctadine-tris(albesilate) (cf.F1h);

antibiotics (cf.F2): kasugamycin (cf.F2a), kasugamycin hydrochloride-hydrate (cf.F2b), streptomycin (cf.F2c), polyoxine (cf.F2d), validamycin A (cf.F2e);

nitrophenyl derivates (cf.F3): binapacryl (cf.F3a), dicloran (cf.F3b), dinobuton (cf.F3c), dinocap (cf.F3d), nitrothal-isopropyl (cf.F3e), tecnazen (cf.F3f), organometal compounds (cf.F4): fentin salts (cf.F4a), such as fentin-acetate (cf.F4b), fentin chloride (cf.F4c), or fentin hydroxide (cf.F4d);

sulfur-containing heterocyclyl compounds (cf.F5): dithianon (cf.F5a), isoprothiolane (cf.F5b);

organophosphorus compounds (cf.F6): edifenphos (cf.F6a), fosetyl (cf.F6b), fosetyl-aluminum (cf.F6c), iprobenfos (cf.F6d), phosphorus acid and its salts (cf.F6e), pyrazophos (cf.F6f), tolclofos-methyl (cf.F6g);

organochlorine compounds (cf.F7): chlorothalonil (cf.F7a), dichlofluanid (cf.F7b), dichlorophen (cf.F7c), flusulfamide (cf.F7d), hexachlorobenzene (cf.F7e), pencycuron (cf.F7f), pentachlorphenole and its salts (cf.F7g), phthalide (cf.F7h), quintozene (cf.F7i), thiophanate-methyl (cf.F7j), thiophanate (cf.F7k), tolylfluanid (cf.F7l), N-(4-chloro-2-nitro-phenyl)-N-ethyl-4-methyl-benzenesulfonamide (cf.F7m);

inorganic active substances (cf.F8): Bordeaux mixture (cf.F8a), copper acetate (cf.F8b), copper hydroxide (cf.F8c), copper oxychloride (cf.F8d), basic copper sulfate (cf.F8e), and sulfur (cf.F8f).

Commercial fungicides are most suitably used in accordance with the manufacturer's instructions at the recommended concentrations.

In particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XX VIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one chemical fungicide ("cf") selected from (cf.A) to (cf.F): i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one chemical fungicide selected from the group consisting of (cf.A), (cf.B), (cf.C), (cf.D), (cf.E), (cf.F) and combinations thereof.

In more particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one chemical fungicide ("cf") selected from (cf.A1) to (cf.F8b); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one chemical fungicide selected from the group consisting of (cf.A1), (cf.A2), (cf.A3), (cf.A4), (cf.A5), (cf.A6), (cf.A7), (cf.A8), (cf.A9), (cf.A10), (cf.A11), (cf.A12), (cf.A13), (cf.A14), (cf.A15), (cf.A16), (cf.A17); (cf.B1); (cf.B1a), (cf.B1b), (cf.B1c), (cf.B1d), (cf.B1d), (cf.B1e), (cf.B1f), (cf.B1g), (cf.B1h), (cf.B1i), (cf.B1j), (cf.B1k), (cf.B1l), (cf.B1m), (cf.B1n), (cf.B1o), (cf.B1p), (cf.B1q), (cf.B1r), (cf.B1s), (cf.B1t), (cf.B1u), (cf.B1v), (cf.B1w), (cf.B1x), (cf.B1y), (cf.B1z), (cf.B1aa), (cf.B1ab), (cf.B2a), (cf.B2b), (cf.B2c), (cf.B3a), (cf.B3b), (cf.B3c), (cf.B3d), (cf.B4a), (cf.B4b), (cf.B4c), (cf.B4d), (cf.B4e), (cf.B4f), (cf.C1a), (cf.C1b), (cf.C1c), (cf.C1d), (cf.C1e), (cf.C1f), (cf.C1g), (cf.C1h), (cf.C1i), (cf.C1j), (cf.C1k), (cf.C1l), (cf.C1m), (cf.C1n), (cf.C1o), (cf.C1p), (cf.C1q), (cf.C1r), (cf.C1s), (cf.C1t), (cf.C1u), (cf.C1v), (cf.C1w), (cf.C1x), (cf.C1y), (cf.C1z), (cf.C1aa), (cf.C1ab), (cf.C1ac), (cf.C2a), (cf.C2b), (cf.C2c), (cf.C2d), (cf.C2e) (cf.D1a), (cf.D1b), (cf.D1c), (cf.D1d), (cf.D2a), (cf.D2b), (cf.D2c), (cf.D2d), (cf.D2e), (cf.D2f), (cf.D2g), (cf.D2h), (cf.D2i), (cf.D3a), (cf.D4a), (cf.D4b), (cf.D5a), (cf.D5b), (cf.D5c), (cf.D5d), (cf.D5e), (cf.D6a), (cf.D7a), (cf.D7b), (cf.D7c), (cf.D7d), (cf.D8a), (cf.D8b), (cf.D8c), (cf.D8d), (cf.D8e), (cf.D8f), (cf.D9a), (cf.D9b), (cf.D9c), (cf.D9d), (cf.D9e), (cf.D9f), (cf.D9g), (cf.D9h), (cf.D9i), (cf.D9j), (cf.D9k), (cf.D9l), (cf.D9m), (cf.D9n), (cf.D9o), (cf.D9p), (cf.D9q), (cf.D9r), (cf.D9s), (cf.D9t), (cf.D9u), (cf.D9v), (cf.D9w), (cf.D9x), (cf.D9y), (cf.E1), (cf.F1a), (cf.F1b), (cf.F1c), (cf.F1d), (cf.F1e), (cf.F1f), (cf.F1g), (cf.F1h), (cf.F2a), (cf.F2b), (cf.F2c), (cf.F2d), (cf.F2e); (cf.F3a), (cf.F3b), (cf.F3c), (cf.F3d), (cf.F3e), (cf.F3f), (cf.F4a), (cf.F4b), (cf.F4c), (cf.F4d), (cf.F5a), (cf.F5b), (cf.F6a), (cf.F6b), (cf.F6c), (cf.F6d), (cf.F6e), (cf.F6f), (cf.F6g), (cf.F7a), (cf.F7b), (cf.F7c), (cf.F7d), (cf.F7e), (cf.F7f), (cf.F7g), (cf.F7h), (cf.F7i), (cf.F7j), (cf.F7k), (cf.F7l), (cf.F7m), (cf.F8a), (cf.F8b), (cf.F8c), (cf.F8d), (cf.F8e), (cf.F8f), and combinations thereof.

Herbicides:

In one embodiment, the compositions described herein may further comprise at least one herbicide ("h").

Non-limiting examples of herbicides may acetyl CoA carboxylase (ACCase) inhibitors (h.A), acetolactate synthase (ALS) (h.B) or acetohydroxy acid synthase (AHAS) inhibitors (h.C), photosystem II inhibitors (h.D), photosystem I inhibitors (h.E), protoporphyrinogen oxidase (PPO or Protox) inhibitors (h.F), carotenoid biosynthesis inhibitors (h.G), enolpyruvyl shikimate-3-phosphate (EPSP) synthase inhibitor (h.H), glutamine synthetase inhibitor (h.I), dihydropteroate synthetase inhibitor (h.J), mitosis inhibitors (h.K), 4-hydroxyphenyl-pyruvate-dioxygenase (4-HPPD) inhibitors (h.L), synthetic auxins (h.M), auxin herbicide salts (h.N), auxin transport inhibitors (h.O), and nucleic acid inhibitors (h.P), salts and esters thereof; racemic mixtures and resolved isomers thereof; and combinations thereof.

Specific examples of possible herbicides ("h") include 2,4-dichlorophenoxyacetic acid (2,4-D) (h.1), 2,4,5-trichlorophenoxyacetic acid (2,4,5-T) (h.2), ametryn (h.3), amicarbazone (h.4), aminocyclopyrachlor (h.5), acetochlor (h.6), acifluorfen (h.7), alachlor (h.8), atrazine (h.9), azafenidin (h.10), bentazon (h.11), benzofenap (h.12), bifenox (h.13), bromacil (h.14), bromoxynil (h.15), butachlor (h.16), butafenacil (h.17), butroxydim (h.18), carfentrazone-ethyl (h.19), chlorimuron (h.20), chlorotoluron (h.21), clethodim (h.22), clodinafop (h.23), clomazone (h.24), cyanazine (h.25), cycloxydim (h.26), cyhalofop (h.27), desmedipham (h.28), desmetryn (h.29), dicamba (h.30), diclofop (h.31), dimefuron (h.32), diuron (h.33), dithiopyr (h.34), fenoxaprop (h.35), fluazifop (h.36), fluazifop-P (h.37), fluometuron (h.38), flufenpyr-ethyl (h.39), flumiclorac-pentyl (h.40), flumioxazin (h.41), fluoroglycofen (h.42), fluthiacet-methyl (h.43), fomesafe (h.44), fomesafen (h.45), glyphosate (h.46), glufosinate (h.47), haloxyfop (h.48), hexazinone (h.49), imazamox (h.50), imazaquin (h.51), imazethapyr (h.52), ioxynil (h.53), isoproturon (h.54), isoxaflutole (h.55), lactofen (h.56), linuron (h.57), mecoprop (h.58), mecoprop-P (h.59), mesotrione (h.60), metamitron (h.61), metazochlor (h.62), methibenzuron (h.63), metolachlor (h.64) (and S-metolachlor (h.65)), metoxuron (h.66), metribuzin (h.67), monolinuron (h.68), oxadiargyl (h.69), oxadiazon (h.70), oxyfluorfen (h.71), phenmedipham (h.72), pretilachlor (h.73), profoxydim (h.74), prometon (h.75), prometryn (h.76), propachlor (h.77), propanil (h.78), propaquizafop (h.79), propisochlor (h.80), pyraflufen-ethyl (h.81), pyrazon (h.82), pyrazolynate (h.83), pyrazoxyfen (h.84), pyridate (h.85), quizalofop (h.86), quizalofop-P (h.87) (e.g., quizalofop-ethyl (h.88), quizalofop-P-ethyl (h.89), clodinafop-propargyl (h.90), cyhalofop-butyl (h.91), diclofop-methyl (h.92), fenoxaprop-P-ethyl (h.93), fluazifop-P-butyl (h.94), haloxyfop-methyl (h.95), haloxyfop-R-methyl (h.96)), saflufenacil (h.97), sethoxydim (h.98), siduron (h.99), simazine (h.100), simetryn (h.101), sulcotrione (h.102), sulfentrazone (h.103), tebuthiuron (h.104), tembotrione (h.105), tepraloxydim (h.106), terbacil (h.107), terbumeton (h.108), terbuthylazine (h.109), thaxtomin (e.g., the thaxtomins as described in U.S. Pat. No. 7,989,393) (h.110), thenylchlor (h.111), tralkoxydim (h.112), triclopyr (h.113), trietazine (h.114), tropramezone (h.115), and salts and esters thereof; racemic mixtures and resolved isomers thereof, and combinations thereof.

Commercial products containing herbicides are readily available. Herbicide concentration in the composition will generally correspond to the labeled use rate for a particular herbicide.

In particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one herbicide ("h") selected from (h.A) to (h.P); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one herbicide selected from the group consisting of (h.A), (h.B), (h.C), (h.D), (h.E), (h.F), (h.G), (h.H), (h.I), (h.J), (h.K), (h.L), (h.M), (h.N), (h.O), (h.P), and combinations thereof.

In more particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one herbicide ("h") selected from (h.1) to (h.115); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one herbicide selected from the group consisting of (h.1), (h.2), (h.3), (h.4), (h.5), (h.6), (h.7), (h.8), (h.9), (h.10), (h.11), (h.12), (h.13), (h.14), (h.15), (h.16), (h.17), (h.18), (h.19), (h.20), (h.21), (h.22), (h.23), (h.24), (h.25), (h.26), (h.27), (h.28), (h.29), (h.30), (h.31), (h.32), (h.33), (h.34), (h.35), (h.36), (h.37), (h.38), (h.39), (h.40), (h.41), (h.42), (h.43), (h.44), (h.45), (h.46), (h.47), (h.48), (h.49), (h.50), (h.51), (h.52), (h.53), (h.54), (h.55), (h.56), (h.57), (h.58), (h.59), (h.60), (h.61), (h.62), (h.63), (h.64), (h.65), (h.66), (h.67), (h.68), (h.69), (h.70), (h.71), (h.72), (h.73), (h.74), (h.75), (h.76), (h.77), (h.78), (h.79), (h.80), (h.81), (h.82), (h.83), (h.84), (h.85), (h.86), (h.87), (h.88), (h.89), (h.90), (h.91), (h.92), (h.93), (h.94), (h.95), (h.96), (h.97), (h.98), (h.99), (h.100), (h.101), (h.102), (h.103), (h.104), (h.105), (h.106), (h.107), (h.108), (h.109), (h.110), (h.111), (h.112), (h.113), (h.114), (h.115), and combinations thereof.

Insecticides, Acaricides, Nematicides:

In one embodiment, the compositions described herein may further comprise at least one insecticide, acaricide, nematicide ("ian"), or combinations thereof. Inseciticdes, acaricides, and nematicides useful to the compositions described herein will suitably exhibit activity against a broad range of nematodes, insects, and acarids. The inseciticdes, acaricides, and nematicides described herein may be chemical ("cian"), microbial ("bian") (e.g., biological solutions, such as fungal and/or bacterial inseciticdes, acaricides, and nematicides, etc.), or combinations thereof.

Chemical Insecticides, Acaricides, and Nematicides ("cian"):

Non-limiting examples of chemical insecticides, acaricides, and nematicides ("cian") that may be useful to the compositions disclosed herein include carbamates (cian.A), diamides (cian.B), macrocyclic lactones (cian.C), neonicotinoids (cian.D), organophosphates (cian.E), phenylpyrazoles (cian.F), pyrethrins (cian.G), spinosyns (cian.H), synthetic pyrethroids (cian.I), tetronic acids (cian.J) and tetramic acids (cian.K).

In particular embodiments useful chemical insecticides, acaricides, and nematicides include acrinathrin (cian.1), alpha-cypermethrin (cian.2), betacyfluthrin (cian.3), cyhalothrin (cian.4), cypermethrin (cian.5), deltamethrin (cian.6), csfenvalcrate (cian.7), etofenprox (cian.8), fenpropathrin (cian.9), fenvalerate (cian.10), flucythrinat (cian.11), fosthiazate (cian.12), lambda-cyhalothrin (cian.13), gamma-cyhalothrin (cian.14), permethrin (cian.15), tau-fluvalinate (cian.16), transfluthrin (cian.17), zeta-cypermethrin (cian.18), cyfluthrin (cian.19), bifenthrin (cian.20), tefluthrin (cian.21), eflusilanat (cian.22), fubfenprox (cian.23), pyrethrin (cian.24), resmethrin (cian.25), imidacloprid (cian.26), acetamiprid (cian.27), thiamethoxam (cian.28), nitenpyram (cian.29), thiacloprid (cian.30), dinotefuran (cian.31), clothianidin (cian.32), imidaclothiz (cian.33), chlorfluazuron (cian.34), diflubenzuron (cian.35), lufenuron (cian.36), teflubenzuron (cian.37), triflumuron (cian.38), novaluron (cian.39), flufenoxuron (cian.40), hexaflumuron (cian.41), bistrifluoron (cian.42), noviflumuron (cian.43), buprofezin (cian.44), cyromazine (cian.45), methoxyfenozide (cian.46), tebufenozide (cian.47), halofenozide (cian.48), chromafenozide (cian.49), endosulfan (cian.50), fipronil (cian.51), ethiprole (cian.52), pyrafluprole (cian.53), pyriprole (cian.54), flubendiamide (cian.55), chlorantraniliprole (cian.56) (e.g., Rynaxypyr (cian.56a)), cyazypyr (cian.57), emamectin (cian.58), emamectin benzoate (cian.59), abamectin (cian.60), ivermectin (cian.61), milbemectin (cian.62), lepimectin (cian.63), tebufenpyrad (cian.64), fenpyroximate (cian.65), pyridaben (cian.66), fenazaquin (cian.67), pyrimidifen (cian.68), tolfenpyrad (cian.69), dicofol (cian.70), cyenopyrafen (cian.71), cyflumetofen (cian.72), acequinocyl (cian.73), fluacrypyrin (cian.74), bifenazate (cian.75), diafenthiuron (cian.76), etoxazole (cian.77), clofentezine (cian.78), spinosad (cian.79), triarathen (cian.80), tetradifon (cian.81), propargite (cian.82), hexythiazox (cian.83), bromopropylate (cian.84), chinomethionat (cian.85), amitraz (cian.86), pyrifluquinazon (cian.87), pymetrozine (cian.88), flonicamid (cian.89), pyriproxyfen (cian.90), diofenolan (cian.91), chlorfenapyr (cian.92), metaflumizone (cian.93), indoxacarb (cian.94), chlorpyrifos (cian.95), spirodiclofen (cian.96), spiromesifen (cian.97), spirotetramat (cian.98), pyridalyl (cian.99), spinctoram (cian.100), acephate (cian.101), triazophos (cian.102), profenofos (cian.103), oxamyl (cian.104), spinetoram (cian.105), fenamiphos (cian.106), fenamipclothiahos (cian.107), 4-{[(6-chloropyrid-3-yl)methyl](2,2-difluoroethyl)amino}furan-2(5H)-one (cian.108), cadusaphos (cian.109), carbaryl (cian.110), carbofuran (cian.111), ethoprophos (cian.112), thiodicarb (cian.113), aldicarb (cian.114), aldoxycarb (cian.115), metamidophos (cian.116), methiocarb (cian.117), sulfoxaflor (cian.118), cyantraniliprole (cian.119), tioxazofen (cian.120), and combinations thereof.

In particular embodiments, compositions compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one chemical insecticide, acaricide, or nematicide ("cian") selected from (cian.A) to (cian.K); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one chemical insecticde, acaricide, or nematicide selected from the group consisting of (cian.A), (cian.B), (cian.C), (cian.D), (cian.E), (cian.F), (cian.G), (cian.H), (cian.I), (cian.J), (cian.K), and combinations thereof.

In more particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one chemical insecticide, acaricide, or nematicide ("cian") selected from (cian.1) to (cian.120); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one chemical insecticide, acaricide, or nematicide selected from the group consisting of (cian.1), (cian.2), (cian.3), (cian.4), (cian.5), (cian.6), (cian.7), (cian.8), (cian.9), (cian.10), (cian.11), (cian.12), (cian.13), (cian.14), (cian.15), (cian.16), (cian.17), (cian.18), (cian.19), (cian.20), (cian.21), (cian.22), (cian.23), (cian.24), (cian.25), (cian.26), (cian.27), (cian.28), (cian.29), (cian.30), (cian.31), (cian.32), (cian.33), (cian.34), (cian.35), (cian.36), (cian.37), (cian.38), (cian.39), (cian.40), (cian.41), (cian.42), (cian.43), (cian.44), (cian.45), (cian.46), (cian.47), (cian.48), (cian.49), (cian.50), (cian.51), (cian.52), (cian.53), (cian.54), (cian.55), (cian.56) (cian.56a), (cian.57), (cian.58), (cian.59), (cian.60), (cian.61), (cian.62), (cian.63), (cian.64), (cian.65), (cian.66), (cian.67), (cian.68), (cian.69), (cian.70), (cian.71), (cian.72), (cian.73), (cian.74), (cian.75), (cian.76), (cian.77), (cian.78), (cian.79), (cian.80), (cian.81), (cian.82), (cian.83), (cian.84), (cian.85), (cian.86), (cian.87), (cian.88), (cian.89), (cian.90), (cian.91), (cian.92), (cian.93), (cian.94), (cian.95), (cian.96), (cian.97), (cian.98), (cian.99), (cian.100), (cian.101), (cian.102), (cian.103), (cian.104), (cian.105), (cian.106), (cian.107), (cian.108), (cian.109), (cian.110), (cian.111), (cian.112), (cian.113), (cian.114), (cian.115), (cian.116), (cian.117), (cian.118), (cian.119), (cian.120) and combinations thereof.

Microbial Insecticides, Acaricides, and Nematicides ("mian")

A) Fungal Insecticides, Acaricides, and Nematicides (mian.A)

In a particular embodiment, the microbial insecticide, acaricide, or nematicide is a fungal insecticide, acaricide, or nematicide. Non-limiting examples of fungal insecticides, acaricides, or nematicides that may be used in the compositions disclosed herein are described in McCoy, C. W., Samson, R. A., and Coucias, D. G. "Entomogenous fungi. In "CRC Handbook of Natural Pesticides. Microbial Pesticides, Part A. Entomogenous Protozoa and Fungi." (C. M. Inoffo, ed.), (1988): Vol. 5, 151-236; Samson, R. A., Evans, H. C., and Latge, J. P. "Atlas of Entomopathogenic Fungi." (Springer-Verlag, Berlin) (1988); and deFaria, M. R. and Wraight, S. P. "Mycoinsecticides and Mycoacaricides: A comprehensive list with worldwide coverage and international classification of formulation types." Biol. Control (2007), doi: 10.1016/j.biocontrol.2007.08.001.

In embodiments, the fungal insecticide, acaricide, or nematicide can be a fungus of the genus *Aegerita, Akanthomyces, Alternaria, Arthrobotrys, Aschersonia, Ascophaera, Aspergillus, Beauveria, Blastodendrion, Calonectria, Coelemomyces, Coelomycidium, Conidiobolus, Cordyceps, Couchia, Culicinomyces, Dactylaria, Engyodontium, Entomophaga, Entomophthora, Erynia, Filariomyces, Filobasidiella, Fusarium, Gibellula, Harposporium, Hesperomyces, Hirsutella, Hymenostilbe, Hypocrella, Isaria, Lecanicillium, Lagenidium, Leptolegnia, Massospora, Metarhizium, Meristacrum, Metschnikowia, Monacrosporium, Mycoderma, Myiophagus, Myriangium, Myrothecium, Nectria, Nematoctonus, Neozygites, Nomuraea, Paecilomyces, Pandora, Paraisaria, Pasteuria, Pleurodesmospora, Pochonia, Podonectria, Polycephalomyces, Pseudogibellula, Septobasidium, Sorosporella, Sporodiniella, Stillbella, Tetranacrium, Tilachlidium, Tolypocladium, Torrubiella, Trenomyces, Trichoderma, Uredinella, Verticillium, Zoophthora*, and combinations thereof.

Non-limiting examples of particular species that may be useful as a fungal insecticide, acaricide, or nematicide in the compositions described herein include *Alternaria cassia* (mian.A1), *Arthrobotrys dactyloides* (mian.A2), *Arthrobotrys oligospora* (mian.A3), *Arthrobotrys superb* (mian.A4), *Arthrobotrys dactyloides* (mian.A5), *Aspergillus parasiticus* (mian.A6), *Beauveria bassiana* (mian.A7), *Beauveria bassiana* isolate ATCC-74040 (mian.A7a), *Beauveria bassiana* isolate ATCC-74250 (mian.A7b), *Dactylaria candida* (mian.A8), *Fusarium lateritum* (mian.A9), *Fusarium solani* (mian.A10), *Harposporium anguillulae* (mian.A11), *Hirsutella rhossiliensis* (mian.A12), *Hirsutella minnesotensis* (mian.A13), *Lecanicillium lecanii* (mian.A14), *Metarhizium anisopliae* (also may be referred to in the art as *Metarrhizium anisopliae, Metarhizium brunneum*, or "green muscadine") (mian.A15), *Metarhizium anisopliae* isolate F52 (mian.A15a) (also known as *Metarhizium anisopliae* strain 52, *Metarhizium anisopliae* strain 7, *Metarhizium anisopliae* strain 43, *Metarhizium anisopliae* BIO-1020, TAE-001 and deposited as DSM 3884, DSM 3885, ATCC 90448, SD 170, and ARSEF 7711) (available from Novozymes Biologicals, Inc., USA)), *Monacrosporium cionopagum* (mian.A16), *Nematoctonus geogenius* (mian.A17), *Nematoctonus leiosporus* (mian.A18), *Meristacrum asterospermum* (mian.A19), *Myrothecium verrucaria* (mian.A20), *Paecilomyces fumosoroseus* (mian.A21), *Paecilomyces fumosoroseus* FE991 (mian.A21a) (in NOFLY® from FuturEco BioScience S.L., Barcelona, Spain), *Paecilomyces lilacinus* (mian.A22), *Pasteuria penetrans* (mian.A23), *Pasteuria usage* (mian.A24), *Pochonia chlamydopora* (mian.A25), *Trichoderma hamatum* (mian.A26), *Trichoderma harzianum* (mian.A27), *Trichoderma virens* (mian.A28), *Verticillium chlamydosporum* (mian.A29), *Verticillium lecanii* (mian.A30), and combinations thereof.

B) Bacterial Insecticides, Acaricides, and Nematicides (mian.B)

In a particular embodiment, the microbial pesticide is a bacterial insecticide, acaricids, or nematicide.

In embodiments, the bacterial insecticide, acaricide, or nematicide can be a bacterium of the genus *Actinomycetes Agrobacterium, Arthrobacter, Alcaligenes, Aureobacterium, Azobacter, Bacillus, Beijerinckia, Burkholderia, Chromobacterium, Clavibacter, Clostridium, Comomonas, Corynebacterium, Curtobacterium, Desulforibtio, Enterobacter, Flavobacterium, Gluconobacter, Hydrogenophage, Klebsiella, Methylobacterium, Paenibacillus, Phyllobacterium, Phingobacterium, Photorhabdus, Pseudomonas, Rhodococcus, Serratia, Stenotrotrophomonas, Streptomyces, Xenorhadbus, Variovorax*, and combinations thereof.

Non-limiting examples of particular species that may be useful as a bacterial insecticide, acaricide, or nematicide in the compositions described herein include *Bacillus firmus* (mian.B1), *Bacillus firmus* isolate I-1582 (mian.B1a) (in BioNeem, Votivo), *Bacillus mycoides* (mian.B2), *Bacillus mycoides* isolate AQ726, NRRL B-21664 (mian.B2a), *Burkholderia* sp. (mian.B3), *Burkholderia* sp. nov. rinojensis (mian.B3a), *Burkholderia* sp. A396 sp. nov. rinojensis, NRRL B-50319 (mian.B3b), *Chromobacterium subtsugae* (mian.B4), *Chromobacterium subtsugae* sp. nov. (mian.B4a), *Chromobacterium subtsugae* sp. nov. isolate NRRL B-30655 (mian.B4b), *Chromobacterium vaccinii* (mian.B5), *Chromobacterium vaccinii* isolate NRRL B-50880 (mian.B5a), *Chromobacterium violaceum* (mian.B6), *Flavobacterium* sp. (mian.B7), *Flavobacterium* sp. isolate H492, NRRL B-50584 (mian.B7a), *Streptomyces lydicus* (mian.B8), *Streptomyces violaceusniger* (mian.B9), and combinations thereof.

Commercial microbial insecticides, acaricides, or nematicides are most suitably used in accordance with the manufacturer's instructions at the recommended concentrations.

In more particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one microbial insecticide, acaricide, or nematicide ("mian") selected from (mian.A1) to (mian.B9); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one microbial insecticide, acaricide, or nematicide selected from the group consisting of (mian.A1), (mian.A2), (mian.A3), (mian.A4), (mian.A5), (mian.A6), (mian.A7), (mian.A7a), (mian.A7b), (mian.A8), (mian.A9), (mian.A10), (mian.A11), (mian.A12), (mian.A13), (mian.A14), (mian.A15), (mian.A15a) (mian.A16), (mian.A17), (mian.A18), (mian.A19), (mian.A20), (mian.A21), (mian.A21a) (mian.A22), (mian.A23), (mian.A24), (mian.A25), (mian.A26), (mian.A27), (mian.A28), (mian.A29), (mian.A30) (mian.B1), (mian.Bla), (mian.B2), (mian.B2a), (mian.B3), (mian.B3a), (mian.B3b), (mian.B4), (mian.B4a), (mian.B4b), (mian.B5), (mian.B5a), (mian.B6), (mian.B7), (mian.B7a), (mian.B8), (mian.B9), and combinations thereof.

Beneficial Microorganisms ("bm"):

In one embodiment, the compositions described herein may further comprise at least one beneficial microorganism ("bm"). The at least one beneficial microorganism may be in a spore form, a vegetative form, or a combination thereof.

A) Diazotrophs (bm.A)

In particular embodiments, the at least one beneficial microorganism ("bm") is a diazotroph (i.e., bacteria which are symbiotic nitrogen-fixing bacteria).

In embodiments, the diazotroph is a bacterium of the genus *Azorhizobium, Azospirillum, Bradyrhizobium, Mesorhizobium, Rhizobium, Sinorhizobium*, and combinations thereof.

Non-limiting examples of particular species that may be useful as a bacterial diazotroph in the compositions described herein include *Azorhizobium caulinodans* (bm.A1), *Azorhizobium doebereinerae* (bm.A2), *Azospirillum amazonense* (bm.A3), *Azospirillum brasilense* (bm.A4), *Azospirillum brasilense* isolate INTA Az-39 (bm.A4a) (available from Novozymes), *Azospirillum canadense* (bm.A5), *Azospirillum doebereinerae* (bm.A6), *Azospirillum formosense* (bm.A7), *Azospirillum halopraeferans* (bm.A8), *Azospirillum irakense* (bm.A9), *Azospirillum largimobile* (bm.A10), *Azospirillum lipoferum* (bm.A11), *Azospirillum melinis* (bm.A12), *Azospirillum oryzae* (bm.A13), *Azospirillum picis* (bm.A14), *Azospirillum rugosum* (bm.A15), *Azospirillum thiophilum* (bm.A16), *Azospirillum zeae* (bm.A17), *Bradyrhizobium bête* (bm.A18), *Bradyrhizobium canariense* (bm.A19), *Bradyrhizobium elkanii* (bm.A20), *Bradyrhizobium elkanii* isolate SEMIA 587 (bm.A20a) (available from Novozymes), *Bradyrhizobium elkanii* isolate SEMIA 5019 (bm.A20b) (available from Novozymes), *Bradyrhizobium iriomotense* (bm.A21), *Bradyrhizobium japonicum* (bm.A22), *Bradyrhizobium japonicum* isolate SEMIA 5079 (bm.A22a) (available from Novozymes), *Bradyrhizobium japonicum* isolate SEMIA 5080 (bm.A22b) (available from Novozymes), *Bradyrhizobium japonicum* isolate NRRL B-50608 (bm.A22c) (available from Novozymes), *Bradyrhizobium japonicum* isolate NRRL B-50609 (bm.A22d) (available from Novozymes), *Bradyrhizobium japonicum* isolate NRRL B-50610 (bm.A22e) (available from Novozymes), *Bradyrhizobium japonicum* isolate NRRL B-50611 (bm.A22f) (available from Novozymes), *Bradyrhizobium japonicum* isolate NRRL B-50612 (bm.A22g) (available from Novozymes), *Bradyrhizobium japonicum* isolate NRRL B-50592 (deposited also as NRRL B-59571) (bm.A22h) (available from Novozymes), *Bradyrhizobium japonicum* isolate NRRL B-50593 (deposited also as NRRL B-59572) (bm.A22i) (available from Novozymes), *Bradyrhizobium japonicum* isolate NRRL B-50586 (deposited also as NRRL B-59565) (bm.A22j) (available from Novozymes), *Bradyrhizobium japonicum* isolate NRRL B-50588 (deposited also as NRRL B-59567) (bm.A22k) (available from Novozymes), *Bradyrhizobium japonicum* isolate NRRL B-50587 (deposited also as NRRL B-59566) (bm.A22l) (available from Novozymes), *Bradyrhizobium japonicum* isolate NRRL B-50589 (deposited also as NRRL B-59568) (bm.A22m) (available from Novozymes), *Bradyrhizobium japonicum* isolate NRRL B-50591 (deposited also as NRRL B-59570) (bm.A22n) (available from Novozymes), *Bradyrhizobium japonicum* NRRL B-50590 (deposited also as NRRL B-59569) (bm.A220) (available from Novozymes), *Bradyrhizobium japonicum* isolate NRRL B-50594 (deposited also as NRRL B-50493) (bm.A22p) (available from Novozymes), *Bradyrhizobium japonicum* isolate NRRL B-50726 (bm.A22q) (available from Novozymes), *Bradyrhizobium japonicum* isolate NRRL B-50727 (bm.A22r) (available from Novozymes), *Bradyrhizobium japonicum* isolate NRRL B-50728 (bm.A22s) (available from Novozymes), *Bradyrhizobium japonicum* isolate NRRL B-50729 (bm.A22t) (available from Novozymes), *Bradyrhizobium japonicum* isolate NRRL B-50730 (bm.A22u) (available from Novozymes), *Bradyrhizobium japonicum* isolate USDA 532C (bm.A22v), *Bradyrhizobium japonicum* isolate USDA 110 (bm.A22w), *Bradyrhizobium japonicum* isolate USDA 123 (bm.A22x), *Bradyrhizobium japonicum* isolate USDA 127 (bm.A22y), *Bradyrhizobium japonicum* isolate USDA 129 (bm.A22z), *Bradyrhizobium jicamae* (bm.A23), *Bradyrhizobium liaoningense* (bm.A24), *Bradyrhizobium pachyrhizi* (bm.A25), *Bradyrhizobium yuanmingense* (bm.A26), *Mesorhizobium albiziae* (bm.A27), *Mesorhizobium amorphae* (bm.A28), *Mesorhizobium chacoense* (bm.A29), *Mesorhizobium ciceri* (bm.A30), *Mesorhizobium huakuii* (bm.A31), *Mesorhizobium loti* (bm.A32), *Mesorhizobium mediterraneum* (bm.A33), *Mesorhizobium pluifarium* (bm.A34), *Mesorhizobium septentrionale* (bm.A35), *Mesorhizobium temperatum* (bm.A36), *Mesorhizobium tianshanense* (bm.A37), *Rhizobium cellulosilyticum* (bm.A38), *Rhizobium daejeonense* (bm.A39), *Rhizobium etli* (bm.A40), *Rhizobium galegae* (bm.A41), *Rhizobium gallicum* (bm.A42), *Rhizobium giardinii* (bm.A43), *Rhizobium hainanense* (bm.A44), *Rhizobium huautlense* (bm.A45), *Rhizobium indigoferae* (bm.A46), *Rhizobium leguminosarum* (bm.A47), *Rhizobium leguminosarum* isolate SO12A-2-(IDAC 080305-01) (bm.A47a), *Rhizobium loessense* (bm.A48), *Rhizobium lupini* (bm.A49), *Rhizobium lusitanum* (bm.A50), *Rhizobium meliloti* (bm.A51), *Rhizobium mongolense* (bm.A52), *Rhizobium miluonense* (bm.A53), *Rhizobium sullae* (bm.A54), *Rhizobium tropici* (bm.A55), *Rhizobium undicola* (bm.A56), *Rhizobium yanglingense* (bm.A57), *Sinorhizobium abri* (bm.A58), *Sinorhizobium adhaerens* (bm.A59), *Sinorhizobium americanum* (bm.A60), *Sinorhizobium aboris* (bm.A61), *Sinorhizobium fredii* (bm.A62), *Sinorhizobium indiaense* (bm.A63), *Sinorhizobium kostiense* (bm.A64), *Sinorhizobium kummerowiae* (bm.A65), *Sinorhizobium medicae* (bm.A66), *Sinorhizobium meliloti* (bm.A67), *Sinorhizobium mexicanus* (bm.A68), *Sinorhizobium morelense* (bm.A69), *Sinorhizobium saheli* (bm.A70), *Sinorhizobium terangae* (bm.A71), *Sinorhizobium xinjiangense* (bm.A72), and combinations thereof.

B) Phosphate Solubilizing Microorganisms (bm.B)

In particular embodiments, the at least one beneficial microorganism ("bm") is a phosphate solubilizing microorganism.

In embodiments, the at least one phosphate solubilizing microorganism is a fungus of the genus *Penicillium, Talaromyces*, and combinations thereof.

Non-limiting examples of particular species that may be useful as a phosphate solubilizing fungus in the compositions described herein include *Penicillium albidum* (bm.B1), *Penicillium aurantiogriseum* (bm.B2), *Penicillium bilaiae* (formerly known as *Penicillium bilaii* and *Penicillium bilaji*) (bm.B3), *Penicillium bilaiae* isolate ATCC 20851 (bm.B3a), *Penicillium bilaiae* isolate ATCC 22348 (bm.B3b), *Penicillium bilaiae* isolate V08/021001 (also deposited as NRRL B-50612) (bm.B3c), *Penicillium bilaiae* isolate NRRL B-50776 (bm.B3d), *Penicillium bilaiae* isolate NRRL B-50777 (bm.B3e), *Penicillium bilaiae* isolate NRRL B-50778 (bm.B3f), *Penicillium bilaiae* isolate NRRL B-50779 (bm.B3g), *Penicillium bilaiae* isolate NRRL B-50780 (bm.B3h), *Penicillium bilaiae* isolate NRRL B-50781 (bm.B3i), *Penicillium bilaiae* isolate NRRL B-50782 (bm.B3j), *Penicillium bilaiae* isolate NRRL B-50783 (bm.B3k), *Penicillium bilaiae* isolate NRRL B-50784 (bm.B3l), *Penicillium bilaiae* isolate NRRL B-50785 (bm.B3m), *Penicillium bilaiae* isolate NRRL B-50786 (bm.B3n), *Penicillium bilaiae* isolate NRRL B-50787 (bm.B3o), *Penicillium bilaiae* isolate NRRL B-50788 (bm.B3p), *Penicillium bilaiae* isolate NRRL B-50169 (bm.B3q), *Penicillium bilaiae* isolate ATCC 18309 (bm.B3r), *Penicillium brevicompactum* (bm.B4), *Penicillium brevicompactum* isolate AgRF18 (bm.B4a), *Penicillium canescens* (bm.B5), *Penicillium canescens* isolate ATCC 10419 (bm.B5a), *Penicillium chrysogenum* (bm.B6), *Penicillium citreonigrum* (bm.B7), *Penicillium citrinum* (bm.B8), *Penicillium digitatum* (bm.B9), *Penicillium expansum* (bm.B10), *Penicillium expansum* isolate ATCC 24692 (bm.B10a), *Penicillium expansum* isolate YT02 (bm.B10b), *Penicillium fellutanum* (bm.B11), *Penicillium fellutanum* isolate ATCC 48694 (bm.B11a), *Penicillium frequentas* (bm.B12), *Penicillium fuscum* (bm.B13), *Penicillium fussiporus* (bm.B14), *Penicillium gaestrivorus* (bm.B15), *Penicillium gaestrivorus* isolate NRRL 50170 (bm.B15a), *Penicillium glabrum* (bm.B16), *Penicillium glabrum* isolate DAOM 239074 (bm.B16a), *Penicillium glabrum* isolate CBS 229.28 (bm.B16b), *Penicillium glaucum* (bm.B17), *Penicillium griseofulvum* (bm.B18), *Penicillium implicatum* (bm.B19), *Penicillium janthinellum* (bm.B20), *Penicillium janthinellum* isolate ATCC 10455 (bm.B20a), *Penicillium lanosocoeruleum* (bm.B21), *Penicillium lanosocoeruleum* isolate ATCC 48919 (bm.B21a), *Penicillium lilacinum* (bm.B22), *Penicillium minioluteum* (bm.B23), *Penicillium montanense* (bm.B24), *Penicillium nigricans* (bm.B25), *Penicillium oxalicum* (bm.B26), *Penicillium pinetorum* (bm.B27), *Penicillium pinophilum* (bm.B28), *Penicillium purpurogenum* (bm.B29), *Penicillium radicum* (bm.B30), *Penicillium radicum* isolate N93/47267 (bm.B30a), *Penicillium radicum* isolate FRR 4717 (bm.B30b), *Penicillium radicum* isolate ATCC 201836 (bm.B30c), *Penicillium radicum* isolate FRR 4719 (bm.B30d), *Penicillium raistrickii* (bm.B31), *Penicillium raistrickii* isolate ATCC 10490 (bm.B31a), *Penicillium rugulosum* (bm.B32), *Penicillium simplicissimum* (bm.B33), *Penicillium solitum* (bm.B34), *Penicillium variabile* (bm.B35), *Penicillium velutinum* (bm.B36), *Penicillium viridicatum* (bm.B37), *Talaromyces aculeatus* (bm.B38), *Talaromyces aculeatus* isolate ATCC 10409 (bm.B38a), and combinations thereof.

C) Mycorrhiza (bm.C)

In particular embodiments, the at least one beneficial microorganism ("bm") is a mycorrhiza. Suitable mycorrhizae include endomycorrhiza (also called vesicular arbuscular mycorrhiza, VAMs, arbuscular mycorrhiza, or AMs), ectomycorrhiza, ericoid mycorrhiza, and combinations thereof.

In embodiments, the mycorrhiza is a fungus of the genus *Gigaspora, Glomus, Hymenoscyphous, Laccaria, Oidiodendron, Paraglomus, Pisolithus, Rhizoctonia, Rhizopogon, Scleroderma*, and combinations thereof.

Non-limiting examples of particular mycorrhizal species that may be useful in the compositions described herein include *Gigaspora margarita* (bm.C1), *Glomus aggregatum* (bm.C2), *Glomus brasilianum* (bm.C3), *Glomus clarum* (bm.C4), *Glomus deserticola* (bm.C5), *Glomus etunicatum* (bm.C6), *Glomus fasciculatum* (bm.C7), *Glomus intraradices* (bm.C8), *Glomus monosporum* (bm.C9), *Glomus mosseae* (bm.C10), *Hymenoscyphous ericae* (bm.C11), *Laccaria bicolor* (bm.C12), *Laccaria laccata* (bm.C13), *Oidiodendron* sp. (bm.C14), *Paraglomus brazilianum* (bm.C15), *Pisolithus tinctorius* (bm.C16), *Rhizoctonia* sp. (bm.C17), *Rhizopogon amylopogon* (bm.C18), *Rhizopogon fulvigleba* (bm.C19), *Rhizopogon luteolus* (bm.C20), *Rhizopogon villosuli* (bm.C21), *Scleroderma cepa* (bm.C22), *Scleroderma citrinum* (bm.C23), Rhizoplex® (*Gigaspora margarita, Glomus aggregatum, Glomus brasilianum, Glomus clarum, Glomus deserticola, Glomus etunicatum, Glomus intraradices, Glomus monosporum, Glomus mosseae, Laccaria bicolor, Laccaria laccata, Pisolithus tinctorius, Rhizopogon amylopogon, Rhizopogon fulvigleba, Rhizopogon luteolus, Rhizopogon villosuli, Scleroderma cepa* and *Scleroderma citrinum*) (bm.C24) (available from Novozymes), Rhizomyco® (*Gigaspora margarita, Glomus aggregatum, Glomus clarum, Glomus deserticola, Glomus etunicatum, Glomus intraradices, Glomus monosporum, Glomus mosseae, Laccaria bicolor, Laccaria laccata, Paraglomus brazilianum, Pisolithus tinctorius, Rhizopogon amylopogon, Rhizopogon fulvigleba, Rhizopogon luteolus, Rhizopogon villosuli, Scleroderma cepa* and *Scleroderma citrinum*) (bm.C25) (available from Novozymes), Rhizomyx® (*Gigaspora margarita, Glomus aggregatum, Glomus brasilianum, Glomus clarum, Glomus deserticola, Glomus etunicatum, Glomus intraradices, Glomus monosporum*, and *Glomus mosseae*) (bm.C26) (available from Novozymes), and combinations thereof.

In particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one beneficial microorganism selected from (bm.A) to (bm.C); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one beneficial microorganism ("bm") selected from the group consisting of (bm.A), (bm.B), (bm.C), and combinations thereof.

In more particular embodiments, compositions comprising at least one LCO (i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least three of the LCOs represented by I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least ten of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eleven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twelve of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fourteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least fifteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least sixteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least seventeen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least eighteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least nineteen of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-three of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-four of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-five of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-six of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-seven of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-eight of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least twenty-nine of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, at least thirty-two of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII, up to and including all thirty-three of the above LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII) are combined with at least one beneficial microorganism ("bm") selected from (bm.A1) to (bm.C26); i.e., at least one of the LCOs represented by the structures I, II, III, IV, V, VI, VII, VIII, IX, X, XI, XII, XIII, XIV, XV, XVI, XVII, XIII, XIX, XX, XI, XXII, XXIII, XXIV, XXV, XXVI, XXVII, XXVIII, XXIX, XXX, XXXI, XXXII, XXXIII are combined with at least one beneficial microorganism selected from the group consisting of (bm.A1), (bm.A2), (bm.A3), (bm.A4), (bm.A4a), (bm.A5), (bm.A6), (bm.A7), (bm.A8), (bm.A9), (bm.A10), (bm.A11), (bm.A12), (bm.A13), (bm.A14), (bm.A15), (bm.A16), (bm.A17), (bm.A18), (bm.A19), (bm.A20), (bm.A20a) (bm.A20b), (bm.A21), (bm.A22), (bm.A22a) (bm.A22b), (bm.A22c), (bm.A22d), (bm.A22e), (bm.A22f), (bm.A22g), (bm.A22h) (bm.A22i), (bm.A22j), (bm.A22k), (bm.A22l), (bm.A22m), (bm.A22n), (bm.A22o), (bm.A22p), (bm.A22q), (bm.A22r), (bm.A22s), (bm.A22t), (bm.A22u), (bm.A22v), (bm.A22w), (bm.A22x), (bm.A22y), (bm.A22z), (bm.A23), (bm.A24), (bm.A25), (bm.A26), (bm.A27), (bm.A28), (bm.A29), (bm.A30), (bm.A31), (bm.A32), (bm.A33), (bm.A34), (bm.A35), (bm.A36), (bm.A37), (bm.A38), (bm.A39), (bm.A40), (bm.A41), (bm.A42), (bm.A43), (bm.A44), (bm.A45), (bm.A46), (bm.A47), (bm.A47a), (bm.A48), (bm.A49), (bm.A50), (bm.A51), (bm.A52), (bm.A53), (bm.A54), (bm.A55), (bm.A56), (bm.A57), (bm.A58), (bm.A59), (bm.A60), (bm.A61), (bm.A62), (bm.A63), (bm.A64), (bm.A65), (bm.A66), (bm.A67), (bm.A68), (bm.A69), (bm.A70), (bm.A71), (bm.A72), (bm.B1), (bm.B2), (bm.B3), (bm.B3a), (bm.B3b), (bm.B3c), (bm.B3d), (bm.B3e), (bm.B3f), (bm.B3g), (bm.B3h), (bm.B3i), (bm.B3j), (bm.B3k), (bm.B3l), (bm.B3m), (bm.B3n), (bm.B3o), (bm.B3p), (bm.B3q), (bm.B3r), (bm.B4), (bm.B4a), (bm.B5), (bm.B5a), (bm.B6), (bm.B7), (bm.B8), (bm.B9), (bm.B10), (bm.B10a), (bm.B10b), (bm.B11), (bm.B11a), (bm.B12), (bm.B13), (bm.B14), (bm.B15), (bm.B15a), (bm.B16), (bm.B16a), (bm.B16b), (bm.B17), (bm.B18), (bm.B19), (bm.B20), (bm.B20a), (bm.B21), (bm.B21a), (bm.B22), (bm.B23), (bm.B24), (bm.B25), (bm.B26), (bm.B27), (bm.B28), (bm.B29), (bm.B30), (bm.B30a), (bm.B30b), (bm.B30c), (bm.B30d), (bm.B31), (bm.B31a), (bm.B32), (bm.B33), (bm.B34), (bm.B35), (bm.B36), (bm.B37), (bm.B38), (bm.B38a), (bm.C1), (bm.C2), (bm.C3), (bm.C4), (bm.C5), (bm.C6), (bm.C7), (bm.C8), (bm.C9), (bm.C10), (bm.C11), (bm.C12), (bm.C13), (bm.C14), (bm.C15), (bm.C16), (bm.C17), (bm.C18), (bm.C19), (bm.C20), (bm.C21), (bm.C22), (bm.C23), (bm.C24), (bm.C25), (bm.C26), and combinations thereof.

Additional Agriculturally Beneficial Agents:

The compositions disclosed herein may further comprise at least one additional agriculturally beneficial agent. Non-limiting examples of additional agriculturally beneficial agents include COs, chitinous compounds, flavonoids, nod-gene inducing compounds, karrikins, enzymes, nutrients, biostimulants, etc., or combinations thereof.

COs:

Chitooligosaccharides (COs), sometimes referred to as N-acetylchitooligosaccharides, are also composed of GlcNAc residues but have side chain decorations that make them different from chitin molecules [$(C_8H_{13}NO_5)_n$, CAS No. 1398-61-4] and chitosan molecules [$(C_5H_{11}NO_4)_n$, CAS No. 9012-76-4]. See, e.g., D'Haeze et al., Glycobiol. 12(6): 79R (2002); Demont-Caulet et al., Plant Physiol. 120(1):83 (1999); Hanel et al., Planta 232:787 (2010); Muller et al., Plant Physiol. 124:733 (2000); Robina et al., Tetrahedron 58:521-530 (2002); Rouge et al., *The Molecular Immunology of Complex Carbohydrates*, in Advances in Experimental Medicine and Biology (Springer Science, Oct. 4, 2011); Van der Holst et al., Curr. Opin. Struc. Biol. 11:608 (2001); and Wan et al., Plant Cell 21:1053 (2009); PCT/F100/00803 (2000). Chitooligosaccharides differ from lipo-chitooligosaccharides in that they lack the pendant fatty acid chain.

In some embodiments, compositions of the present invention comprise one or more COs represented by formula XXXIV:

(XXXIV)

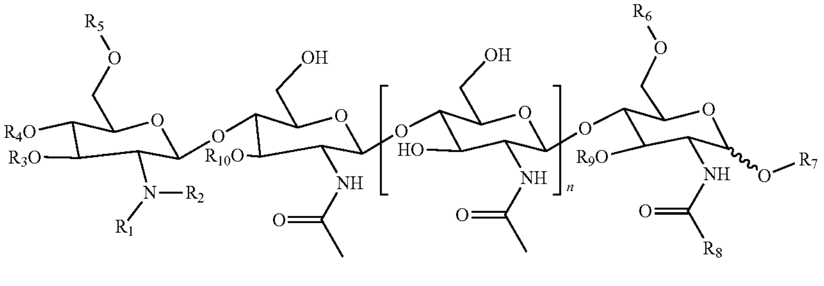

in which $R_1$ represents hydrogen or methyl; $R_2$ represents hydrogen or methyl; $R_3$ represents hydrogen, acetyl or carbamoyl; $R_4$ represents hydrogen, acetyl or carbamoyl; $R_5$ represents hydrogen, acetyl or carbamoyl; $R_6$ represents hydrogen, arabinosyl, fucosyl, acetyl, sulfate ester, 3-0-S-2-0-MeFuc, 2-0-MeFuc, and 4-0-AcFuc; $R_7$ represents hydrogen, mannosyl or glycerol; $R_8$ represents hydrogen, methyl, or —$CH_2OH$; $R_9$ represents hydrogen, arabinosyl, or fucosyl; $R_{10}$ represents hydrogen, acetyl or fucosyl; and n represents 0, 1, 2 or 3.

Chitooligosaccharides may be obtained from any suitable source.

In some embodiments, the CO is derived from a naturally occurring or non-naturally occurring lipo-chitooligosaccharide. For example, in some embodiments, inoculant compositions of the present invention comprise one or more COs derived from an LCO obtained (i.e., isolated and/or purified) from a naturally occurring or genetically engineered strain of *Azorhizobium, Bradyrhizobium* (e.g., *B. japonicum*), *Mesorhizobium, Rhizobium* (e.g., *R. leguminosarum*), *Sinorhizobium* (e.g., *S. meliloti*), or mycorhizzal fungus (e.g., *Glomus intraradicus*). In some embodiments, the CO is derived from an LCO represented by one or more of formulas I-IV and/or structures V-XXXIII. Thus, in some embodiments, compositions of the present invention may comprise one or more COs represented by one or more of formulas I-IV and/or structures V-XXXIII except that the pendant fatty acid is replaced with a hydrogen or methyl group.

In some embodiments, the CO is synthetic. Methods for the preparation of recombinant COs are known in the art. See, e.g., Cottaz et al., Meth. Eng. 7(4):311 (2005); Samain et al., Carbohydrate Res. 302:35 (1997.); and Samain et al., J. Biotechnol. 72:33 (1999).

Examples of chitooligosaccharides (and derivatives thereof) that may be useful in compositions of the present invention are provided below as formula XXXV:

(XXXV)

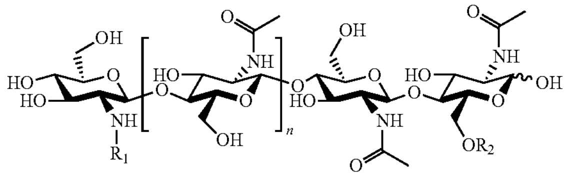

in which n=1 or 2; $R_1$ represents hydrogen or methyl; and $R_2$ represents hydrogen or $SO_3H$.

Further examples of chitooligosaccharides (and derivatives thereof) that may be useful in compositions of the present invention are provided below as structures XXXVI-XXXIX:

(XXXVI)

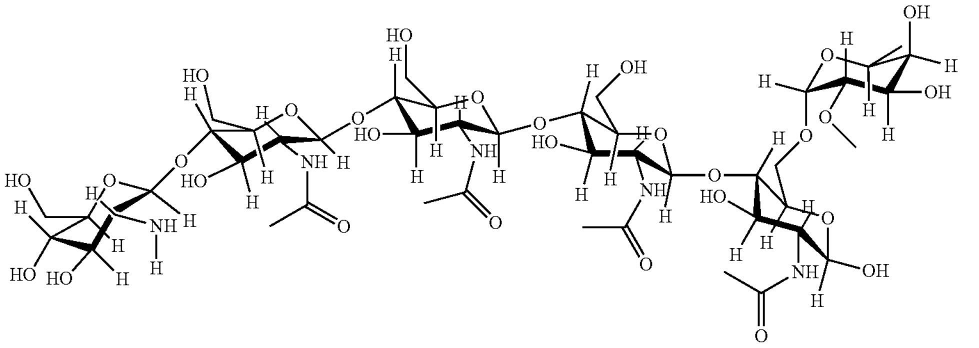

-continued (XXXVII)

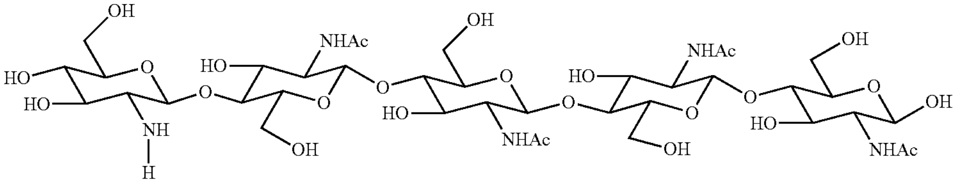

(XXXVIII)

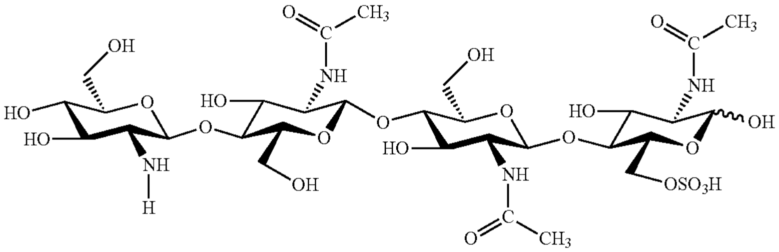

(XXXIX)

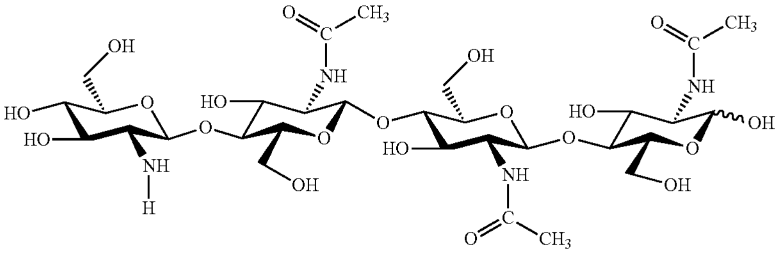

COs (and derivatives thereof) may be utilized in various forms of purity and may be used alone or in the form of a culture of CO-producing bacteria or fungi. For the purposes of some embodiments, recombinant COs suitable for use are least 60% pure, e.g., at least 60% pure, at least 65% pure, at least 70% pure, at least 75% pure, at least 80% pure, at least 85% pure, at least 90% pure, at least 91% pure, at least 92% pure, at least 93% pure, at least 94% pure, at least 95% pure, at least 96% pure, at least 97% pure, at least 98% pure, at least 99% pure, up to 100% pure.

It is to be understood that compositions of the present invention may comprise hydrates, isomers, salts, and/or solvates of COs.

Thus, in some embodiments, compositions of the present invention comprise one, two, three, four, five, six, seven, eight, nine, ten, or more COs represented by one or more of formulas XXXIV-XXXV and/or structures XXXVI-XXXIX and/or one, two, three, four, five, six, seven, eight, nine, ten, or more analogues, derivatives, hydrates, isomers, salts, and/or solvates of COs represented by one or more of formulas XXXIV-XXXV and/or structures XXXVI-XXXIX.

In some embodiments, the compositions described herein comprise about $1\times10^{-20}$ M to about $1\times10^{-1}$ M CO. For example, the compositions described herein may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M of one or more COs. In some preferred embodiments, the CO concentration is $1\times10^{-14}$ M to $1\times10^{-5}$ M, $1\times10^{-12}$ M to $1\times10^{-6}$ M, or $1\times10^{-10}$ M to $1\times10^{-7}$ M. In some preferred embodiments, the CO concentration is $1\times10^{-14}$ M to $1\times10^{-5}$ M, $1\times10^{-12}$ M to $1\times10^{-6}$ M, or $1\times10^{-10}$ M to $1\times10^{-7}$ M.

Chitinous Compounds:

Chitins and chitosans, which are major components of the cell walls of fungi and the exoskeletons of insects and crustaceans, are also composed of GlcNAc residues. Chitinous compounds include chitin, (IUPAC: N-[5-[[3-acetylamino-4,5-dihydroxy-6-(hydroxymethyl)oxan-2yl]methoxymethyl]-2-[[5-acetylamino-4,6-dihydroxy-2-(hydroxymethyl)oxan-3-yl]methoxymethyl]-4-hydroxy-6-(hydroxymethyl)oxan-3-ys]ethanamide), chitosan, (IUPAC: 5-amino-6-[5-amino-6-[5-amino-4,6-dihydroxy-2(hydroxymethyl)oxan-3-yl]oxy-4-hydroxy-2-(hydroxymethyl)oxan-3-yl]oxy-2(hydroxymethyl)oxane-3,4-diol), and isomers, salts, and solvates thereof.

Certain chitins and chitosan compounds may be obtained commercially, e.g., from Sigma-Aldrich, or prepared from insects, crustacean shells, or fungal cell walls. Methods for the preparation of chitin and chitosan are known in the art, and have been described, for example, in U.S. Pat. No. 4,536,207 (preparation from crustacean shells), Pochanavanich, et al., Lett. Appl. Microbiol. 35:17-21 (2002) (preparation from fungal cell walls), and U.S. Pat. No. 5,965,545 (preparation from crab shells and hydrolysis of commercial chitosan). Deacetylated chitins and chitosans may be obtained that range from less than 35% to greater than 90% deacetylation, and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Certain chitin and chitosan compositions formulated for seed treatment are also commercially available. Commercial products include, for example, ELEXA® (Plant Defense Boosters. Inc.) and BEYOND™ (Agrihouse, Inc.).

Flavonoids:

Flavonoids are phenolic compounds having the general structure of two aromatic rings connected by a three-carbon bridge. Flavonoids are produced by plants and have many functions, e.g., as beneficial signaling molecules, and as protection against insects, animals, fungi and bacteria. Classes of flavonoids include are known in the art. See, Jain, et al., J. Plant Biochem. & Biotechnol. 11:1-10 (2002); Shaw, et al., Environmental Microbiol. 11:1867-80 (2006). Flavonoid compounds are commercially available, e.g., from Novozymes BioAg, Saskatoon, Canada; Natland International Corp., Research Triangle Park, NC; MP Biomedicals, Irvine, CA; LC Laboratories, Woburn MA. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, as described in Ralston, et al., Plant Physiology 137:1375-88 (2005). Flavonoid compounds are intended to include all flavonoid compounds as well as isomers, salts, and solvates thereof.

The at least one flavonoid may be a natural flavonoid (i.e., not synthetically produced), a synthetic flavonoid (e.g., a chemically synthesized flavonoid) or a combination thereof. In a particular embodiment, the compositions described herein may further comprise a flavanol, a flavone, an anthocyanidin, an isoflavonoid, a neoflavonoid and combinations thereof, including all isomer, solvate, hydrate, polymorphic, crystalline form, non-crystalline form, and salt variations thereof.

In an embodiment, the compositions described herein may comprise at least one flavanol. In still another embodiment, the compositions described herein may comprise at least one flavanol selected from the group consisting of flavan-3-ols (e.g., catechin (C), gallocatechin (GC), catechin 3-gallate (Cg), gallcatechin 3-gallate (GCg), epicatechins (EC), epigallocatechin (EGC) epicatechin 3-gallate (ECg), epigallcatechin 3-gallate (EGCg), etc.), flavan-4-ols, flavan-3,4-diols (e.g., leucoanthocyanidin), proanthocyanidins (e.g., includes dimers, trimer, oligomers, or polymers of flavanols), and combinations thereof. In still yet another embodiment, the compositions described herein may comprise at least one flavanol selected from the group consisting of catechin (C), gallocatechin (GC), catechin 3-gallate (Cg), gallcatechin 3-gallate (GCg), epicatechins (EC), epigallocatechin (EGC) epicatechin 3-gallate (ECg), epigallcatechin 3-gallate (EGCg), flavan-4-ol, leucoanthocyanidin, and dimers, trimers, olilgomers or polymers thereof.

In another embodiment, the compositions described herein may comprise at least one flavone. In still another embodiment, the compositions described herein may comprise at least one flavone selected from the group consisting of flavones (e.g., luteolin, apigenin, tangeritin, etc.), flavonols (e.g., quercetin, quercitrin, rutin, kaempferol, kaempferitrin, astragalin, sophoraflavonoloside, myricetin, fisetin, isorhamnetin, pachypodol, rhamnazin, etc.), flavanones (e.g. hesperetin, hesperidin, naringenin, eriodictyol, homoeriodictyol, etc.), and flavanonols (e.g., dihydroquercetin, dihydrokaempferol, etc.). In still yet another embodiment, the compositions described herein may comprise at least one flavone selected from the group consisting of luteolin, apigenin, tangeritin, quercetin, quercitrin, rutin, kaempferol, kaempferitrin, astragalin, sophoraflavonoloside, myricetin, fisetin, isorhamnetin, pachypodol, rhamnazin, hesperetin, hesperidin, naringenin, eriodictyol, homoeriodictyol, dihydroquercetin, dihydrokaempferol, and combinations thereof.

In still another embodiment, the compositions described herein may comprise at least one anthocyanidin. In yet another embodiment, the compositions described herein may comprise at least one anthocyanidin selected from the group consisting of cyanidins, delphinidins, malvidins, pelargonidins, peonidins, petunidins, and combinations thereof.

In another embodiment, the compositions described herein may comprise at least one isoflavonoid. In still yet another embodiment, the compositions described herein comprise at least one isoflavonoid selected from the group consisting of phytoestrogens, isoflavones (e.g., genistein, daidzein, glycitein, etc.), and isoflavanes (e.g., equol, lonchocarpane, laxiflorane, etc.), and combinations thereof. In yet another embodiment the compositions described herein may comprise at least one isoflavonoid selected from the group consisting of genistein, daidzein, glycitein, equol, lonchocarpane, laxiflorane, and combinations thereof.

In another embodiment, the compositions described herein may comprise at least one neoflavonoid. In yet another embodiment, the compositions described herein may comprise at least one neoflavonoid selected from the group consisting of neoflavones (e.g., calophyllolide), neoflavenes (e.g., dalbergichromene), coutareagenins, dalbergins, nivetins, and combinations thereof. In still yet another embodiment, the compositions described herein may comprise at least one neoflavonoid selected from the group consisting of calophyllolide, dalbergichromene, coutareagenin, dalbergin, nivetin, and combinations thereof.

In another embodiment, the compositions described herein may comprise one or flavonoids selected from the group consisting of catechin (C), gallocatechin (GC), catechin 3-gallate (Cg), gallcatechin 3-gallate (GCg), epicatechins (EC), epigallocatechin (EGC) epicatechin 3-gallate (ECg), epigallcatechin 3-gallate (EGCg), flavan-4-ol, leucoanthocyanidin, proanthocyanidins, luteolin, apigenin, tangeritin, quercetin, quercitrin, rutin, kaempferol, kaempferitrin, astragalin, sophoraflavonoloside, myricetin, fisetin, isorhamnetin, pachypodol, rhamnazin, hesperetin, hesperidin, naringenin, eriodictyol, homoeriodictyol, dihydroquercetin, dihydrokaempferol, cyanidins, delphinidins, malvidins, pelargonidins, peonidins, petunidins, genistein, daidzein, glycitein, equol, lonchocarpane, laxiflorane, calophyllolide, dalbergichromene, coutareagenin, dalbergin, nivetin, and combinations thereof. In still another embodiment, the compositions described herein may comprise at least one flavonoid selected from the group consisting of hesperetin, hesperidin, naringenin, genistein, daidzein, and combinations thereof. In a particular embodiment, the composition described herein may comprise the flavonoid hesperetin. In another particular embodiment, the composition described herein may comprise the flavonoid hesperidin. In still another particular embodiment, the composition described herein may comprise the flavonoid naringenin. In still yet another particular embodiment, the composition described herein may comprise the flavonoid genistein. In yet still another particular embodiment, the composition described herein may comprise the flavonoid daidzein.

Non-Flavonoid Nod-Gene Inducer(s):

Jasmonic acid (JA, [1R-[1α,2β(Z)]]-3-oxo-2-(pentenyl) cyclopentaneacetic acid) and its derivatives, linoleic acid ((Z,Z)-9,12-Octadecadienoic acid) and its derivatives, and linolenic acid ((Z,Z,Z)-9,12,15-octadecatrienoic acid) and its derivatives, may also be used in the compositions described herein. Non-flavonoid nod-gene inducers are intended to include not only the non-flavonoid nod-gene inducers described herein, but isomers, salts, and solvates thereof.

Jasmonic acid and its methyl ester, methyl jasmonate (MeJA), collectively known as jasmonates, are octadecanoid-based compounds that occur naturally in plants. Jasmonic acid is produced by the roots of wheat seedlings, and by fungal microorganisms such as *Botryodiplodia theobromae* and *Gibbrella fujikuroi*, yeast (*Saccharomyces cerevisiae*), and pathogenic and non-pathogenic strains of *Escherichia coli*. Linoleic acid and linolenic acid are produced in the course of the biosynthesis of jasmonic acid. Jasmonates, linoleic acid and linolenic acid (and their derivatives) are reported to be inducers of nod gene expression or LCO production by rhizobacteria. See, e.g., Mabood, Fazli, Jasmonates induce the expression of nod genes in *Bradyrhizobium japonicum*, May 17, 2001; and Mabood, Fazli, "Linoleic and linolenic acid induce the expression of nod genes in *Bradyrhizobium japonicum*," USDA 3, May 17, 2001.

Useful derivatives of linoleic acid, linolenic acid, and jasmonic acid that may be useful in compositions of the present disclosure include esters, amides, glycosides and salts. Representative esters are compounds in which the carboxyl group of linoleic acid, linolenic acid, or jasmonic acid has been replaced with a —COR group, where R is an —$OR^1$ group, in which $R^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a —COR group, where R is an $NR^2R^3$ group, in which $R^2$ and $R^3$ are independently: hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent such as dicyclohexyl carbodiimide (DCC), under neutral conditions. Suitable salts of linoleic acid, linolenic acid, and jasmonic acid include e.g., base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing together a solution of linoleic acid, linolenic acid, or jasmonic acid with a solution of the base. The salt may be precipitated from solution and be collected by filtration or may be recovered by other means such as by evaporation of the solvent.

Karrikin(s):

Karrikins are vinylogous 4H-pyrones e.g., 2H-furo[2,3-c]pyran-2-ones including derivatives and analogues thereof. It is intended that the karrikins include isomers, salts, and solvates thereof. Examples of these compounds are represented by the following structure:

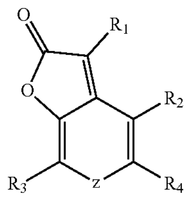

in which; Z is O, S or $NR_5$; $R_1$, $R_2$, $R_3$, and $R_4$ are each independently H, alkyl, alkenyl, alkynyl, phenyl, benzyl, hydroxy, hydroxyalkyl, alkoxy, phenyloxy, benzyloxy, CN, $COR_6$, COOR=, halogen, $NR_6R_7$, or $NO_2$; and $R_5$, $R_6$, and $R_7$ are each independently H, alkyl or alkenyl, or a biologically acceptable salt thereof. Examples of biologically acceptable salts of these compounds may include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Examples of compounds embraced by the structure and which may be suitable for use in the present disclosure include the following: 3-methyl-2H-furo[2,3-c]pyran-2-one (where $R_1$=$CH_3$, $R_2$, $R_3$, $R_4$=H), 2H-furo[2,3-c]pyran-2-one (where $R_1$, $R_2$, $R_3$, $R_4$=H), 7-methyl-2H-furo[2,3-c]pyran-2-one (where $R_1$, $R_2$, $R_4$=H, $R_3$=$CH_3$), 5-methyl-2H-furo[2,3-c]pyran-2-one (where $R_1$, $R_2$, $R_3$=H, $R_4$=$CH_3$), 3,7-dimethyl-2H-furo[2,3-c]pyran-2-one (where $R_1$, $R_3$=$CH_3$, $R_2$, $R_4$=H), 3,5-dimethyl-2H-furo[2,3-c]pyran-2-one (where $R_1$, $R_4$=$CH_3$, $R_2$, $R_3$=H), 3,5,7-trimethyl-2H-furo[2,3-c]pyran-2-one (where $R_1$, $R_3$, $R_4$=$CH_3$, $R_2$=H), 5-methoxymethyl-3-methyl-2H-furo[2,3-c]pyran-2-one (where $R_1$=$CH_3$, $R_2$, $R_3$=H, $R_4$=$CH_2OCH_3$), 4-bromo-3,7-dimethyl-2H-furo[2,3-c]pyran-2-one (where $R_1$, $R_3$=$CH_3$, $R_2$=Br, $R_4$=H), 3-methylfuro[2,3-c]pyridin-2(3H)-one (where Z=NH, $R_1$=$CH_3$, $R_2$, $R_3$, $R_4$=H), 3,6-dimethylfuro[2,3-c]pyridin-2(6H)-one (where Z=N—$CH_3$, $R_1$=$CH_3$, $R_2$, $R_3$, $R_4$=H). See, U.S. Pat. No. 7,576,213. These molecules are also known as karrikins. See, Halford, "Smoke Signals," in Chem. Eng. News (Apr. 12, 2010), at pages 37-38 (reporting that karrikins or butenolides which are contained in smoke act as growth stimulants and spur seed germination after a forest fire, and can invigorate seeds such as corn, tomatoes, lettuce and onions that had been stored). These molecules are the subject of U.S. Pat. No. 7,576,213.

Nutrient(s):

In still another embodiment, the compositions described herein may further comprise at least one beneficial nutrient. Non-limiting examples of nutrients for use in the compositions described herein include vitamins, (e.g., vitamin A, vitamin B complex (i.e., vitamin $B_1$, vitamin $B_2$, vitamin $B_3$, vitamin $B_5$, vitamin $B_6$, vitamin $B_7$, vitamin $B_8$, vitamin $B_9$, vitamin $B_{12}$, choline) vitamin C, vitamin D, vitamin E, vitamin K, carotenoids (α-carotene, β-carotene, cryptoxanthin, lutein, lycopene, zeaxanthin, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), organic acids (e.g., acetic acid, citric acid, lactic acid, malic aclid, taurine, etc.), and combinations thereof. In a particular embodiment, the compositions may comprise phosphorous, boron, chlorine, copper, iron, manganese, molybdenum, zinc or combinations thereof.

Gluconolactones:

In at least one embodiment, the compositions disclosed herein may comprise at least one gluconolactone. Alternatively, the at least one gluconolactone may be applied either simultaneously or applied sequentially, with the compositions disclosed herein. The at least one gluconolactone may be a natural gluconolactones (i.e., not synthetically produced), a synthetic glutathione (e.g., a chemically synthesized gluconolactones) or a combination thereof. The at least one gluconolactone may also be in any form (e.g., oxidized, reduced, or a combination of oxidized and reduced species).

In one embodiment, the at least one gluconolactone has the molecular formula $C_6H_{10}O_6$ and a molar mass of about 178.14 g $mol^{-1}$. In another embodiment, the at least one gluconolactone may comprise gluconolactones having the structure:

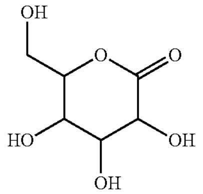 [SMILES: O=C1OC(CO)C(O)C(O)C1O]

and isomers, salts, and solvates thereof.

Glutathiones:

In at least one embodiment, the compositions disclosed herein may comprise at least one glutathione. Alternatively, the at least one glutathione may be applied either simultaneously or applied sequentially, with the compositions disclosed herein. The at least one glutathione may be a natural glutathione (i.e., not synthetically produced), a synthetic glutathione (e.g., a chemically synthesized glutathione) or a combination thereof. The at least one glutathione may also be in any form (e.g., oxidized, reduced, or a combination of oxidized and reduced species).

In one embodiment, the at least one glutathione has the molecular formula $C_{10}H_{17}N_3O_6S$ and a molar mass of about 307.32 g $mol^{-1}$. In another embodiment, the at least one glutathione may comprise glutathiones having the structure:

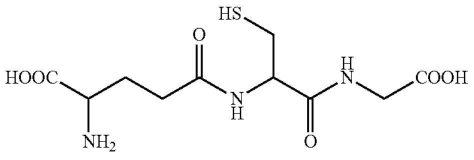 [SMILES: NC(CCC(=O)NC(CS)C(=O)NCC(=O)O)C(=O)O]

and isomers, salts, and solvates thereof.

Biostimulant(s):

In one embodiment, the compositions described herein may further comprise at least one biostimulant. Biostimulants may enhance metabolic or physiological processes such as respiration, photosynthesis, nucleic acid uptake, ion uptake, nutrient delivery, or a combination thereof. Non-limiting examples of biostimulants include seaweed extracts (e.g., ascophyllum nodosum), humic acids (e.g., potassium humate), fulvic acids, myo-inositol, glycine, and combinations thereof. In another embodiment, the compositions comprise seaweed extracts, humic acids, fulvic acids, myo-inositol, glycine, and combinations thereof.

Formulations

The compositions disclosed herein may be formulated for various agricultural applications (e.g., seed coating formulations, foliar applications, in-furrow applications, drench applications, etc.). The compositions described herein may be formulated with at least one additional agricultural excipient to achieve a particular purpose (e.g., to coat seeds, for foliar applications, for dilution, etc.).

Additional Agricultural Excipients:

Formulations of compositions disclosed herein may further comprise at least one additional agricultural excipient. Non-limiting examples of agriculturally excipients include carriers (e.g., agronomically acceptable carriers), polymers, wetting agents, surfactants, anti-freezing agents, and combinations thereof.

In an embodiment, the formulations described herein comprise at least one LCO compound, at least one agriculturally beneficial agent selected from the group consisting of at least one pesticide, at least one beneficial microorganism, at least one additional agricultural excipient, and combinations thereof. In a more particular embodiment, the formulations comprise at least one LCO compound, at least one agriculturally beneficial agent selected from the group consisting of at least one fungicides, at least one herbicide, at least one insecticide, at least one acaricide, at leaste one nematicide, at least one beneficial microorganism, at least one additional agricultural excipient, and combinations thereof and.

Carriers:

In certain embodiments, formulations may further comprise a carrier. The carriers described herein will allow the at least one agriculturally beneficial agent to remain efficacious (e.g., capable of increasing plant growth). Non-limiting examples of carriers described herein include liquids, gels, slurries, or solids (including wettable powders or dry powders). The selection of the carrier material will depend on the intended application. The carrier may, for example, be a soil-compatible carrier, a seed-compatible carrier, and/or a foliar-compatible carrier.

In one embodiment, the carrier is a liquid carrier. Non-limiting examples of liquids useful as carriers for the compositions disclosed herein include water, an organic solvent, an aqueous solution, or a non-aqueous solution. In an embodiment the carrier is an organic solvent. In another embodiment the carrier is an aqueous solution. In another embodiment, the carrier is a non-aqueous solution. In a particular embodiment the carrier is water.

If a liquid carrier is used, the liquid carrier may further include growth media to culture beneficial microorganisms used in the compositions described. Non-limiting examples of suitable growth media for microbial strains include YEM media, mannitol yeast extract, glycerol yeast extract, Czapek-Dox medium, potato dextrose broth, or any media known to those skilled in the art to be compatible with, and/or provide growth nutrients to microbial strain which may be included to the compositions described herein.

Polymer(s):

In one embodiment, formulations of the compositions described herein may further comprise at least one polymer. Non-limiting uses of polymers in the agricultural industry include agrochemical delivery, heavy metal removal, water retention and/or water delivery, and combinations thereof.

Pouci, et al., Am. J. Agri. & Biol. Sci., 3(1):299-314 (2008). In one embodiment, the at least one polymer is a natural polymer (e.g., agar, starch, alginate, pectin, cellulose, etc.), a synthetic polymer, a biodegradable polymer (e.g., polycaprolactone, polylactide, poly (vinyl alcohol), etc.), or a combination thereof.

For a non-limiting list of polymers useful for formulations of the compositions described herein, see Pouci, et al., Am. J. Agri. & Biol. Sci., 3(1):299-314 (2008). In one embodiment, formulations of the compositions described herein comprise cellulose, cellulose derivatives, methylcellulose, methylcellulose derivatives, starch, agar, alginate, pectin, polyvinylpyrrolidone, and combinations thereof.

Wetting Agent(s):

In one embodiment, formulations of the compositions described herein may further comprise at least one wetting agent. Wetting agents are commonly used on soils, particularly hydrophobic soils, to improve the infiltration and/or penetration of water into a soil. The wetting agent may be an adjuvant, oil, surfactant, buffer, acidifier, or combination thereof. In an embodiment, the wetting agent is a surfactant. Surfactants suitable as wetting agents for formulating the compositions described herein are provided in the "Surfactants" section.

Surfactant(s):

Surfactants suitable for formulations of the compositions described herein may be non-ionic surfactants (e.g., semi-polar and/or anionic and/or cationic and/or zwitterionic). The surfactants can wet and emulsify soil(s) and/or dirt(s). It is envisioned that the surfactants used for formulating the compositions described herein have low toxicity for any microorganisms contained within the formulation. It is further envisioned that the surfactants used for formulating the compositions described herein have a low phytotoxicity (i.e., the degree of toxicity a substance or combination of substances has on a plant). A single surfactant or a blend of several surfactants can be used.

Anionic Surfactants

Anionic surfactants or mixtures of anionic and nonionic surfactants may also be used in the compositions. Anionic surfactants are surfactants having a hydrophilic moiety in an anionic or negatively charged state in aqueous solution. The formulations of the compositions described herein may comprise at least one anionic surfactant. The anionic surfactant(s) may be either water soluble anionic surfactants, water insoluble anionic surfactants, or a combination of water soluble anionic surfactants and water insoluble anionic surfactants. Non-limiting examples of anionic surfactants include sulfonic acids, sulfuric acid esters, carboxylic acids, and salts thereof. Non-limiting examples of water soluble anionic surfactants include alkyl sulfates, alkyl ether sulfates, alkyl amido ether sulfates, alkyl aryl polyether sulfates, alkyl aryl sulfates, alkyl aryl sulfonates, monoglyceride sulfates, alkyl sulfonates, alkyl amide sulfonates, alkyl aryl sulfonates, benzene sulfonates, toluene sulfonates, xylene sulfonates, cumene sulfonates, alkyl benzene sulfonates, alkyl diphenyloxide sulfonate, alpha-olefin sulfonates, alkyl naphthalene sulfonates, paraffin sulfonates, lignin sulfonates, alkyl sulfosuccinates, ethoxylated sulfosuccinates, alkyl ether sulfosuccinates, alkylamide sulfosuccinates, alkyl sulfosuccinamate, alkyl sulfoacetates, alkyl phosphates, phosphate ester, alkyl ether phosphates, acyl sarconsinates, acyl isethionates, N-acyl taurates, N-acyl-N-alkyltaurates, alkyl carboxylates, or a combination thereof.

Nonionic Surfactants

Nonionic surfactants are surfactants having no electrical charge when dissolved or dispersed in an aqueous medium. In at least one embodiment of the formulations of compositions herein, at least one nonionic surfactant may be used to provide the desired wetting and emulsification actions and do not significantly inhibit spore stability and activity. The nonionic surfactant(s) may be either water soluble nonionic surfactants, water insoluble nonionic surfactants, or a combination of water soluble nonionic surfactants and water insoluble nonionic surfactants.

Water Insoluble Nonionic Surfactants

Non-limiting examples of water insoluble nonionic surfactants include alkyl and aryl: glycerol ethers, glycol ethers, ethanolamides, sulfoanylamides, alcohols, amides, alcohol ethoxylates, glycerol esters, glycol esters, ethoxylates of glycerol ester and glycol esters, sugar-based alkyl polyglycosides, polyoxyethylenated fatty acids, alkanolamine condensates, alkanolamides, tertiary acetylenic glycols, polyoxyethylenated mercaptans, carboxylic acid esters, polyoxyethylenated polyoxyproylene glycols, sorbitan fatty esters, or combinations thereof. Also included are EO/PO block copolymers (EO is ethylene oxide, PO is propylene oxide), EO polymers and copolymers, polyamines, and polyvinylpynolidones.

Water Soluble Nonionic Surfactants

Non-limiting examples of water soluble nonionic surfactants include sorbitan fatty acid alcohol ethoxylates and sorbitan fatty acid ester ethoxylates.

Combination of Nonionic Surfactants

In one embodiment formulations of the compositionsdescribed herein comprise at least at least one nonionic surfactant. In one embodiment, the compositions comprise at least one water insoluble nonionic surfactant and at least one water soluble nonionic surfactant. In still another embodiment, formulations of the compositions described herein comprise a combination of nonionic surfactants having hydrocarbon chains of substantially the same length.

Other Surfactants

In another embodiment, formulations of the compositions described herein may also comprise organosilicone surfactants, silicone-based antifoams used as surfactants in silicone-based and mineral-oil based antifoams. In yet another embodiment, formulations of the compositions described herein may also comprise alkali metal salts of fatty acids (e.g., water soluble alkali metal salts of fatty acids and/or water insoluble alkali metal salts of fatty acids).

Anti-Freezing Agent(s):

In one embodiment, formulations of the compositions described herein may further comprise at least one anti-freezing agent. Non-limiting examples of anti-freezing agents include ethylene glycol, propylene glycol, urea, glycerin, and combinations thereof.

Packages/Kits

In another aspect packages comprising the compositions and formulations disclosed herein are disclosed. In an embodiment, the package comprises a first container and at least a second container. The first container comprises at least one lipo-chitooligosaccharide (LCO), and as necessary, formulated with suitable agricultural excipients (agronomically acceptable carriers, polymers, wetting agents, surfactants, anti-freezing agents, etc.). The at least second container comprises at least one agriculturally beneficial ingredient, and as necessary, formulated with suitable agricultural excipients (agronomically acceptable carriers, polymers, wetting agents, surfactants, anti-freezing agents, etc.).

The contents present in the first and second containers respectively, are present in an amount effective to enhance plant growth.

In particular embodiments, the second container comprises at least one agriculturally beneficial ingredient selected from the group consisting of fungicides, herbicides, insecticides, acaricides, nematicides, beneficial microorganisms, and combinations thereof. In a particular embodiment, the second container comprises at least one fungicide. In another embodiment, the second container comprises at least one herbicide. In another embodiment, the second container comprises at least one insecticide. In another embodiment, the second container comprises at least one acaricide. In another embodiment, the second container comprises at least one nematicide. In another embodiment, the second container comprises at least one beneficial microorganism.

In some embodiments, the package may comprise additional containers. That is, the package may include more than two containers (i.e., three containers, four containers, five containers, six containers, seven containers, eight containers, nine containers, ten containers, etc.) wherein the additional containers may include any agriculturally beneficial ingredient or agricultural excipient (e.g., for formulating the contents of the packages, etc.) described herein.

Methods

In another aspect, methods of using the compositions to increase and/or enhance plant growth are disclosed. The method includes enhancing the growth of a plant or plant part comprising contacting a plant or plant part with at least one lipo-chitooligosaccharide compound (LCOs), as described herein, and at least one agriculturally beneficial ingredient. In a particular embodiment, the method includes enhancing the growth of a plant or plant part comprising contacting a plant or plant part with at least one lipo-chitooligosaccharide compound (LCOs), as described herein, and at least one agriculturally beneficial agent selected from the group consisting of at least one pesticide (e.g., fungicides, herbicides, insecticides, acaricides, nematicides, etc.), at least one beneficial microorganism, and combinations thereof.

The contacting step can be performed by any method known in the art (including both foliar and non-foliar applications). Non-limiting examples of contacting the plant or plant part include spraying a plant or plant part, drenching a plant or plant part, dripping on a plant or plant part, dusting a plant or plant part, and/or coating a seed. In one embodiment, the contacting step is repeated (e.g., more than once, as in the contacting step is repeated twice, three times, four times, five times, six times, seven times, eight times, nine times, ten times, etc.).

The amount of the at least one LCO effective to enhance plant growth according to the methods described herein, when expressed in units of concentration, generally ranges from about $10^{-5}$ to about $10^{-14}$ M (molar concentration), and in some embodiments, from about $10^{-5}$ to about $10^{-11}$ M, and in some other embodiments from about $10^{-7}$ to about $10^{-8}$ M. Expressed in units of weight, the effective amount generally ranges from about 1 to about 400 μg/hundred weight (cwt) seed, and in some embodiments from about 2 to about 70 μg/cwt, and in some other embodiments, from about 2.5 to about 3.0 μg/cwt seed.

For purposes of contacting a plant or plant part indirectly (e.g., in-furrow treatment), the effective amount of the at least one LCO generally ranges from 1 μg/acre to about 70 μg/acre, and in some embodiments, from about 50 μg/acre to about 60 μg/acre. For purposes of contacting a plant or plant part directly (e.g., foliar application), the effective amount of the at least one LCO generally ranges from 1 μg/acre to about 30 μg/acre, and in some embodiments, from about 11 μg/acre to about 20 μg/acre.

In particular embodiments, the contacting step includes contacting a plant or plant part with at least one of the compositions described herein. For example, the contacting step may comprise contacting a plant or plant part with an effective amount of at least one of the compositions described herein.

In another aspect, the method comprises contacting the plant or plant part with at least one LCO, as described herein, before, after, and/or simultaneously with at least one agriculturally beneficial agent.

In particular embodiments, the method comprises contacting the plant or plant part with at least one LCO, as described herein, before, after, and/or simultaneously with at least one pesticide.

In particular embodiments, the method comprises contacting the plant or plant part with at least one LCO, as described herein, before, after, and/or simultaneously with at least one beneficial microorganism.

In particular embodiments, the method comprises contacting the plant or plant part with at least one LCO, as described herein, before at least one fungicide contacts the plant or plant part. In an embodiment, the method comprises contacting the plant or plant part with at least one LCO, as described herein, before at least one herbicide contacts the plant or plant part. In an embodiment, the method comprises contacting the plant or plant part with at least one LCO, as described herein, before at least one insecticide contacts the plant or plant part. In an embodiment, the method comprises contacting the plant or plant part with at least one LCO, as described herein, before at least one acaricide contacts the plant or plant part. In an embodiment, the method comprises contacting the plant or plant part with at least one LCO, as described herein, before at least one nematicide contacts the plant or plant part. In an embodiment, the method comprises contacting the plant or plant part with at least one LCO, as described herein, before at least one beneficial microorganisms contact the plant or plant part. In an embodiment, the method comprises contacting the plant or plant part with at least one LCO, as described herein, before at least one fungicide, herbicide, insecticide, acaricide, nematicide, beneficial microorganism, and combinations thereof contact the plant or plant part.

In particular embodiments, the method comprises contacting the plant or plant part with at least one LCO, as described herein, after at least one fungicide contacts the plant or plant part. In an embodiment, the method comprises contacting the plant or plant part with at least one LCO, as described herein, after at least one herbicide contacts the plant or plant part. In an embodiment, the method comprises contacting the plant or plant part with at least one LCO, as described herein, after at least one insecticide contacts the plant or plant part. In an embodiment, the method comprises contacting the plant or plant part with at least one LCO, as described herein, after at least one acaricide contacts the plant or plant part. In an embodiment, the method comprises contacting the plant or plant part with at least one LCO, as described herein, after at least one nematicide contacts the plant or plant part. In an embodiment, the method comprises contacting the plant or plant part with at least one LCO, as described herein, after at least one beneficial microorganism contact the plant or plant part. In an embodiment, the method comprises contacting the plant or plant part with at least one LCO, as described herein, after at least one fungicide, herbicide, insecticide, acaricide, nematicide, beneficial microorganism, and combinations thereof contact the plant or plant part.

In particular embodiments, the method comprises contacting the plant or plant part with at least one LCO, as described herein, simultaneously with at least one fungicide. In an embodiment, the method comprises contacting the plant or plant part with at least one LCO, as described herein, simultaneously with at least one herbicide. In an embodiment, the method comprises contacting the plant or plant part with at least one LCO, as described herein, simultaneously with at least one insecticide. In an embodiment, the method comprises contacting the plant or plant part with at least one LCO, as described herein, simultaneously with at least one acaricide. In an embodiment, the method comprises contacting the plant or plant part with at least one LCO, as described herein, simultaneously with at least one nematicide. In an embodiment, the method comprises contacting the plant or plant part with at least one LCO, as described herein, simultaneously with at least one beneficial microorganism. In an embodiment, the method comprises contacting the plant or plant part with at least one LCO, as described herein, simultaneously with at least one fungicide, herbicide, insecticide, acaricide, nematicide, beneficial microorganism, and combinations thereof.

In another aspect, a method for enhancing the growth of a plant or plant part is described comprising treating a soil with at least one lipo-chitooligosaccharide compound (LCOs), as described herein, and at least one agriculturally beneficial ingredient and growing a plant or plant part in the soil. In a particular embodiment, the method includes enhancing the growth of a plant or plant part comprising treating a soil with at least one lipo-chitooligosaccharide compound (LCOs), as described herein, and at least one agriculturally beneficial agents selected from the group consisting of at least one pesticide (e.g., fungicides, herbicides, insecticides, acaricides, nematicides, etc.), at least one beneficial microorganism, and combinations thereof, and growing a plant or plant in the soil.

The treating step can be performed by any method known in the art (including both foliar and non-foliar applications). Non-limiting examples of treating the soil include spraying the soil, drenching the soil, dripping onto the soil, and/or dusting the soil. In one embodiment, the treating step is repeated (e.g., more than once, as in the treating step is repeated twice, three times, four times, five times, six times, seven times, eight times, nine times, ten times, etc.).

In a particular embodiment, the treating includes contacting a soil with at least one of the compositions described herein. In one embodiment, the treating step comprises contacting a soil with an effective amount of at least one of the compositions described herein.

In another aspect, the method comprises treating a soil with at least one LCO, as described herein, before, after, or simultaneously with at least one agriculturally beneficial agent.

In an embodiment, the method comprises treating a soil with at least one LCO, as described herein, before the at least one agriculturally beneficial agent contacts the soil.

In an embodiment, the method comprises treating a soil with at least one LCO, as described herein, before the at least one pesticide contacts the soil.

In particular embodiments, the method comprises treating a soil with at least one LCO, as described herein, before at least one fungicide contacts the soil. In an embodiment, the method comprises treating a soil with at least one LCO, as described herein, before at least one herbicide contacts the soil. In an embodiment, the method comprises treating a soil with at least one LCO, as described herein, before at least one insecticide contacts the soil. In an embodiment, the method comprises treating a soil with at least one LCO, as described herein, before at least one acaricide contacts the soil. In an embodiment, the method comprises treating a soil with at least one LCO, as described herein, before at least one nematicide contacts the soil. In an embodiment, the method comprises treating a soil with at least one LCO, as described herein, before at least one beneficial microorganisms contact the soil. In an embodiment, the method comprises treating a soil with at least one LCO, as described herein, before at least one fungicide, herbicide, insecticide, acaricide, nematicide, beneficial microorganism, and combinations thereof contact the soil.

In an embodiment, the method comprises treating a soil with at least one LCO, as described herein, after the at least one agriculturally beneficial agent contacts the soil.

In an embodiment, the method comprises treating a soil with at least one LCO, as described herein, after the at least one pesticide contacts the soil.

In particular embodiments, the method comprises treating a soil with at least one LCO, as described herein, after at least one fungicide contacts the soil. In an embodiment, the method comprises treating a soil with at least one LCO, as described herein, after at least one herbicide contacts the soil. In an embodiment, the method comprises treating a soil with at least one LCO, as described herein, after at least one insecticide contacts the soil. In an embodiment, the method comprises treating a soil with at least one LCO, as described herein, after at least one acaricide contacts the soil. In an embodiment, the method comprises treating a soil with at least one LCO, as described herein, after at least one nematicide contacts the soil. In an embodiment, the method comprises treating a soil with at least one LCO, as described herein, after at least one beneficial microorganisms contact the soil. In an embodiment, the method comprises treating a soil with at least one LCO, as described herein, after at least one fungicide, herbicide, insecticide, acaricide, nematicide, beneficial microorganism, and combinations thereof contact the soil.

In an embodiment, the method comprises treating a soil with at least one LCO, as described herein, simultaneously with at least one agriculturally beneficial agent.

In an embodiment, the method comprises treating a soil with at least one LCO, as described herein, simultaneously with at least one pesticide.

In particular embodiments, the method comprises treating a soil with at least one LCO, as described herein, simultaneously with at least one fungicide. In an embodiment, the method comprises treating a soil with at least one LCO, as described herein, simultaneously with at least one herbicide. In an embodiment, the method comprises treating a soil with at least one LCO, as described herein, simultaneously with at least one insecticide. In an embodiment, the method comprises treating a soil with at least one LCO, as described herein, simultaneously with at least one acaricide. In an embodiment, the method comprises treating a soil with at least one LCO, as described herein, simultaneously with at least one nematicide. In an embodiment, the method comprises treating a soil with at least one LCO, as described herein, simultaneously with at least one beneficial microorganism. In an embodiment, the method comprises treating a soil with at least one LCO, as described herein, simultaneously with at least one fungicide, herbicide, insecticide, acaricide, nematicide, beneficial microorganism, and combinations thereof.

In a particular aspect, the method comprises treating a soil with at least one LCO described herein before the at least one fungicide, herbicide, pesticide, or beneficial microorganism contacts the soil.

Further still, and according to the method described, the soil treatment can occur at any time during the growth of the plant or plant part. In one embodiment, the treating step occurs before the plant or plant part begins to grow. In another embodiment, the treating step occurs after the plant or plant part has started to grow.

It is understood that planting a plant can occur before, after, or during the soil treatment. In one embodiment, planting occurs before the soil is treated. In another embodiment, planting step occurs during soil treatment (e.g., the planting step occurs simultaneously with the treating step, the planting step occurs substantially simultaneous with the treating step, etc.). In still another embodiment, planting step occurs after the soil is treated.

The methods of the present disclosure are applicable to both leguiminous and non-leguminous plants or plant parts. In a particular embodiment the plants or plant parts are selected from the group consisting of alfalfa, rice, wheat, barley, rye, oat, cotton, canola, sunflower, peanut, corn, potato, sweet potato, bean, pea, chickpeas, lentil, chicory, lettuce, endive, cabbage, brussel sprout, beet, parsnip, turnip, cauliflower, broccoli, turnip, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, sorghum, and sugarcane.

Seed Coatings

In another aspect, seeds are coated with at least one of the compositions described herein.

In one embodiment, seeds may be treated with composition(s) described herein in several ways but in one embodiment via spraying or dripping. Spray and drip treatment may be conducted by formulating compositions described herein and spraying or dripping the composition(s) onto a seed(s) via a continuous treating system (which is calibrated to apply treatment at a predefined rate in proportion to the continuous flow of seed), such as a drum-type of treater. Batch systems, in which a predetermined batch size of seed and composition(s) as described herein are delivered into a mixer, may also be employed. Systems and apparati for performing these processes are commercially available from numerous suppliers, e.g., Bayer CropScience (Gustafson).

In another embodiment, the treatment entails coating seeds. One such process involves coating the inside wall of a round container with the composition(s) described herein, adding seeds, then rotating the container to cause the seeds to contact the wall and the composition(s), a process known in the art as "container coating". Seeds can be coated by combinations of coating methods. Soaking typically entails using liquid forms of the compositions described. For example, seeds can be soaked for about 1 minute to about 24 hours (e.g., for at least 1 min, 5 min, 10 min, 15 min, 20 min, 30 min, 40 min, 45 min, 60 min, 75 min, 80 min, 90 min, 120 min, 3 hr, 6 hr, 12 hr, 24 hr, 48 hr, etc.).

Compositions and methods of the present invention are useful for enhancing numerous aspects of plant growth and development.

In particular embodiments, compositions and methods of present invention may be used to enhance the biomass, height, leaf length, leaf mass, leaf number, leaf surface area, leaf volume, nutrient uptake, root area, root diameter, root length, root mass, root nodulation, root number, root surface area, root volume, seed germination, seedling emergence, shoot diameter, shoot length, shoot mass, shoot number, shoot surface area, shoot volume, spread, and/or survival rate of a plant or plant part.

In particular embodiments, compositions and methods of present invention may be used to synergsitcally enhance the biomass, height, leaf length, leaf mass, leaf number, leaf surface area, leaf volume, nutrient uptake, root area, root diameter, root length, root mass, root nodulation, root number, root surface area, root volume, seed germination, seedling emergence, shoot diameter, shoot length, shoot mass, shoot number, shoot surface area, shoot volume, spread, and/or survival rate of a plant or plant part.

Embodiments of the present invention are described in the following numbered paragraphs:

1. A composition comprising at least one lipo-chitooligosaccharide (LCO) and at least one agriculturally beneficial agent selected from the group consisting of pesticides, agriculturally beneficial microorganisms, and combinations thereof.

2. The composition of paragraph 1, wherein the at least one LCO comprises one or more LCOs represented by the structure (I):

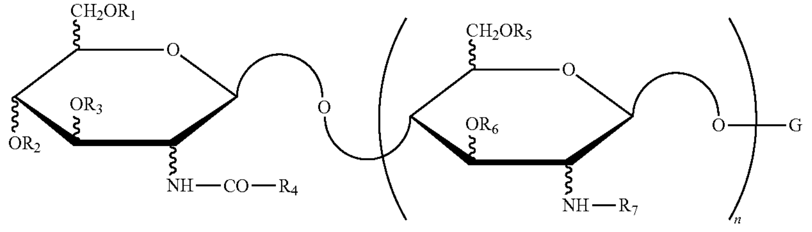

in which G is selected from the group consisting of hexosamine, acetyl-substituted hexosamine, sulfated-substituted hexosamine, and ether-subsitiued hexosamine; $R_1$, $R_2$, $R_3$, $R_5$, $R_6$ and $R_7$, which are identical or different, are selected from the group consisting of H, $CH_3CO$—, $C_xH_yCO$—, a carbamoyl, and a carbamic acid, wherein x is an integer between 0 and 17, and y is an integer between 1 and 35; $R_4$ is selected from the group consisting of a saturated, monounsaturated, diunsaturated or triunsaturated aliphatic chain containing at least 12 carbon atoms; and n is equal to 1, 2, 3, or 4.

3. The composition of paragraph 2, wherein G represents N-acetyl-D-glucosamine or N-acetyl-D-glucosamine 6-sulphate.

4. The composition of any one of paragraphs 1 to 3, wherein the at least one LCO comprises one or more LCOs represented by the structure (II):

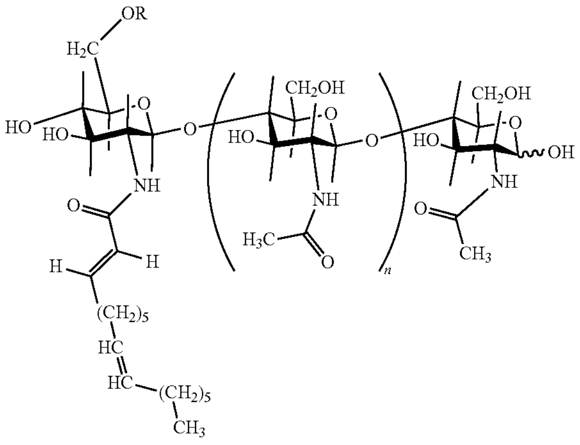

in which R is H or $CH_3CO$—; and n is equal to 2 or 3.

5. The composition of any one of paragraphs 1 to 4, wherein the at least one LCO comprises one or more LCOs represented by the structure (III):

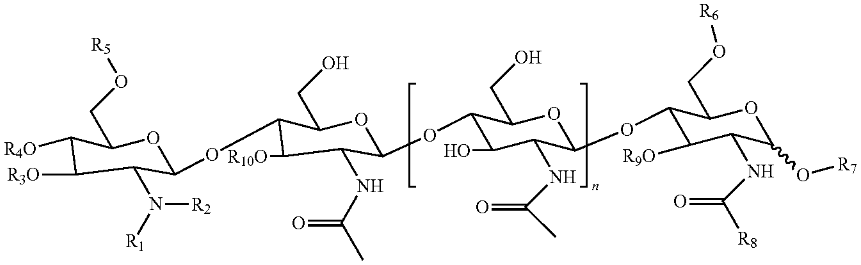

in which $R_1$ is selected from the group consisting of C14:0, 3OH—C14:0, iso-C15:0, C16:0, 3-OH—C16:0, iso-C15:0, C16:1, C16:2, C16:3, iso-C17:0, iso-C17:1, C18:0, 3OH—C18:0, C18:0/3-OH, C18:1, OH—C18:1, C18:2, C18:3, C18:4, C19:1 carbamoyl, C20:0, C20:1, 3-OH—C20:1, C20:1/3-OH, C20:2, C20:3, C22:1, and C18-26(ω-1)-OH (including the C18, C20, C22, C24 and C26 hydroxylated species thereof, and C16:1Δ9, C16:2 (Δ2,9) and C16:3 (Δ2,4,9)); $R_2$ hydrogen or methyl; $R_3$ is selected from the group consisting of hydrogen, acetyl or carbamoyl; $R_4$ hydrogen, acetyl or carbamoyl; $R_5$ represents hydrogen, acetyl or carbamoyl; $R_6$ is selected from the group consisting of hydrogen, arabinosyl, fucosyl, acetyl, sulfate ester, $SO_3H$, 3-0-S-2-0-MeFuc, 2-0-MeFuc, and 4-0-AcFuc; $R_7$ is selected from the group consisting of hydrogen, mannosyl or glycerol; $R_8$ is selected from the group consisting of hydrogen, methyl, or —$CH_2OH$; $R_9$ is selected from the group consisting of hydrogen, arabinosyl, or fucosyl; $R_{10}$ is selected from the group consisting of hydrogen, acetyl or fucosyl; and n is equal to 0, 1, 2 or 3.

6. The composition of any one of paragraphs 1 to 5, wherein the at least one LCO comprises one or more LCOs represented by the structure (IV):

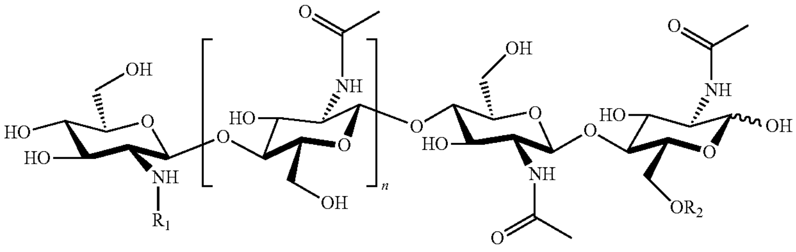

in which $R_1$ is selected from the group consisting of C16, C16:0, C16:1, C16:2, C18:0, C18:1Δ9Z or C18:1Δ11Z; $R_2$ represents hydrogen or $SO_3H$; and n is equal to 1 or 2.
7. The composition of any one of paragraphs 1 to 6, wherein the at least one LCO comprises an LCO represented by the structure (V):
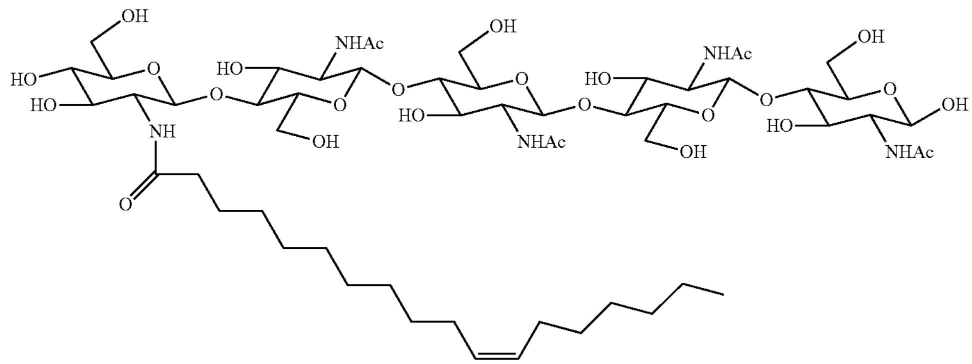 [SMILES: CCCCCC/C=C\CCCCCCCCCC(=O)NC1C(OC2C(CO)OC(OC3C(CO)OC(OC4C(CO)OC(OC5C(CO)OC(O)C(NC(C)=O)C5O)C(NC(C)=O)C4O)C(NC(C)=O)C3O)C(NC(C)=O)C2O)OC(CO)C(O)C1O]
8. The composition of any one of paragraphs 1 to 7, wherein the at least one LCO comprises an LCO represented by the structure (VI):
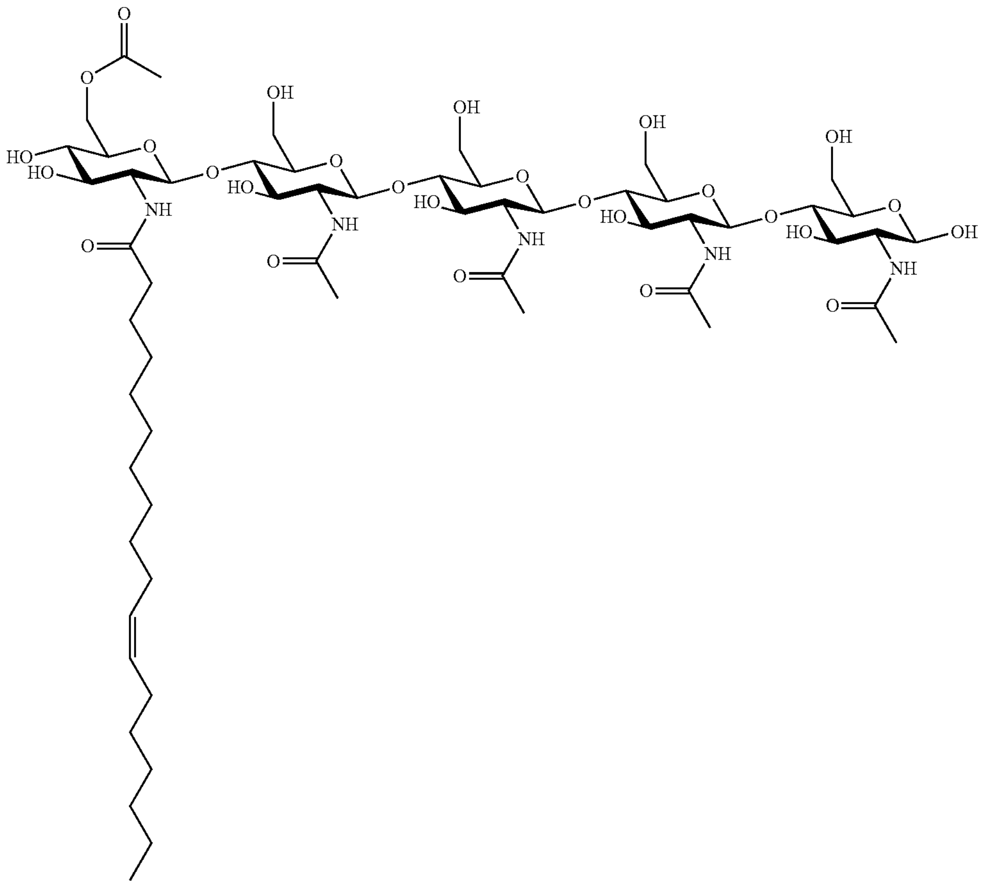

9. The composition of any one of paragraphs 1 to 8, wherein the at least one LCO comprises an LCO represented by the structure (VII):

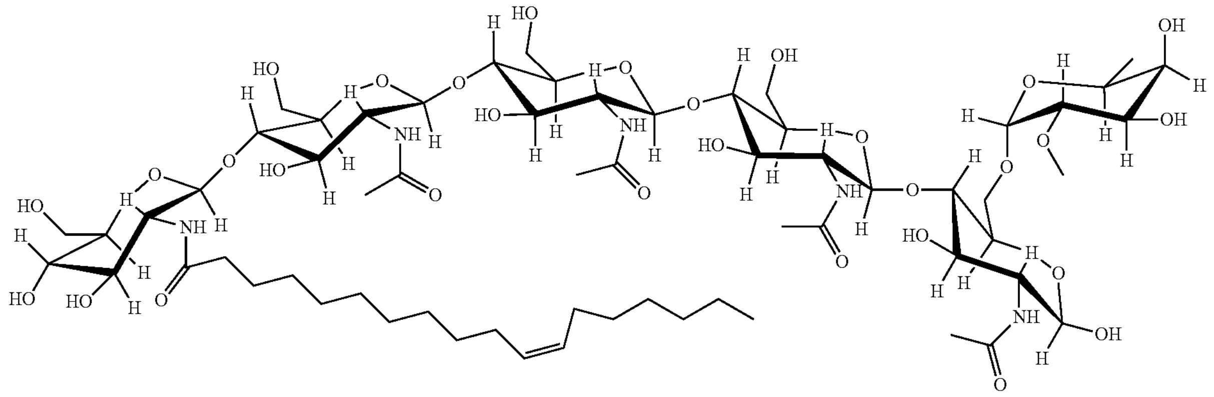

10. The composition of any one of paragraphs 1 to 9, wherein the at least one LCO comprises an LCO represented by the structure (VIII):

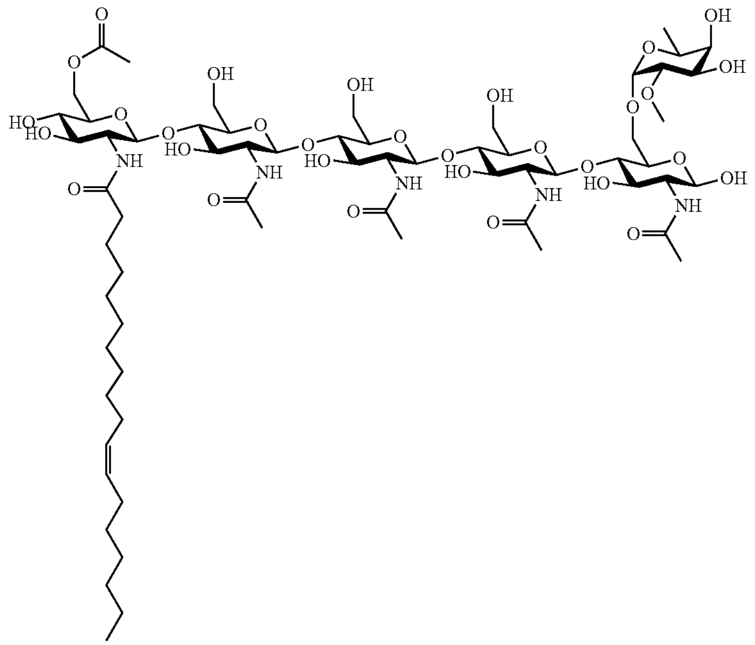

11. The composition of any one of paragraphs 1 to 10, wherein the at least one LCO comprises an LCO represented by the structure (IX):

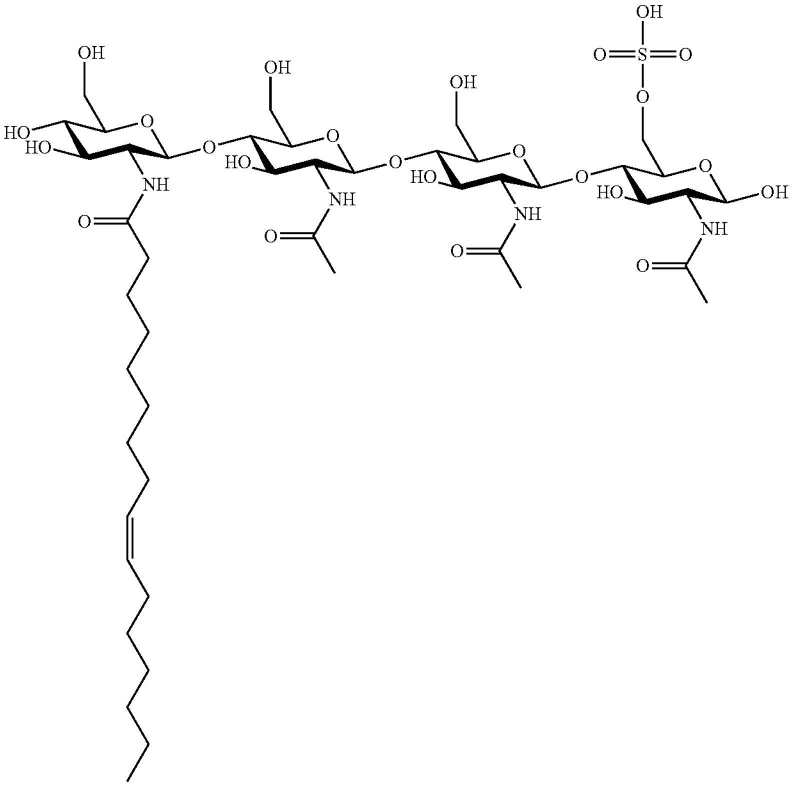
12. The composition of any one of paragraphs 1 to 11, wherein the at least one LCO comprises an LCO represented by the structure (X):
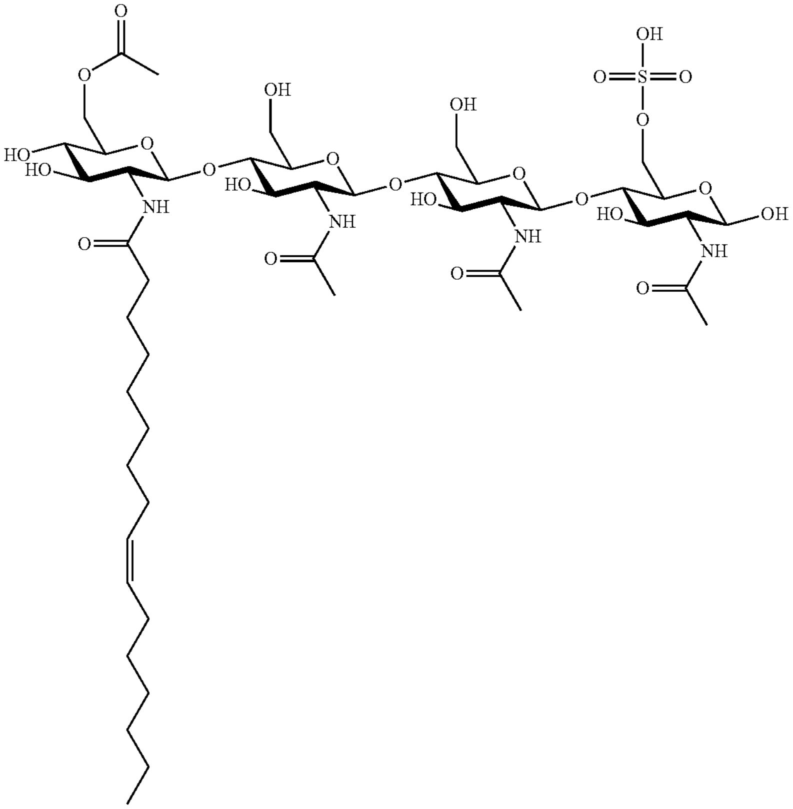

13. The composition of any one of paragraphs 1 to 12, wherein the at least one LCO comprises an LCO represented by the structure (XI):

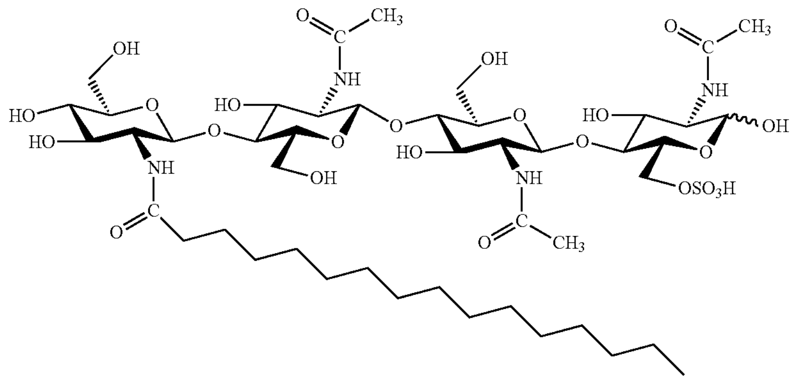

14. The composition of any one of paragraphs 1 to 13, wherein the at least one LCO comprises an LCO represented by the structure (XII):

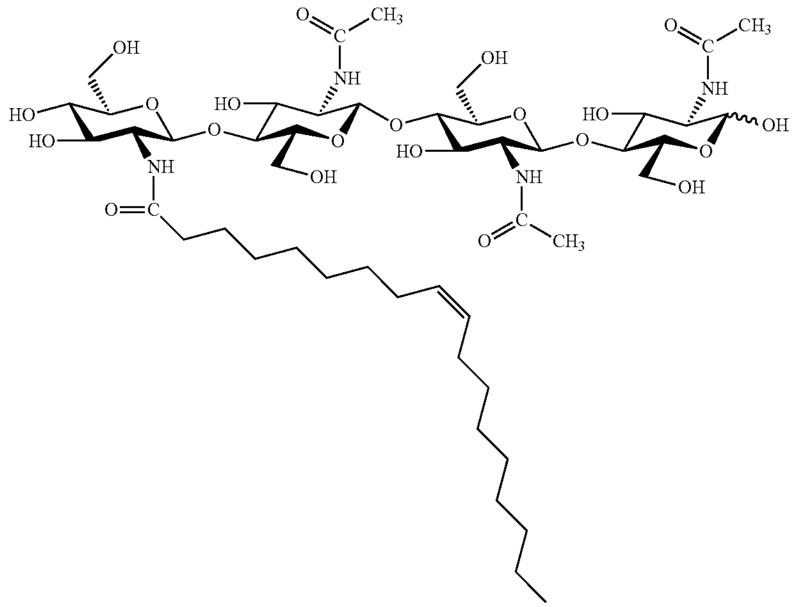

15. The composition of any one of paragraphs 1 to 14, wherein the at least one LCO comprises an LCO represented by the structure (XIII):

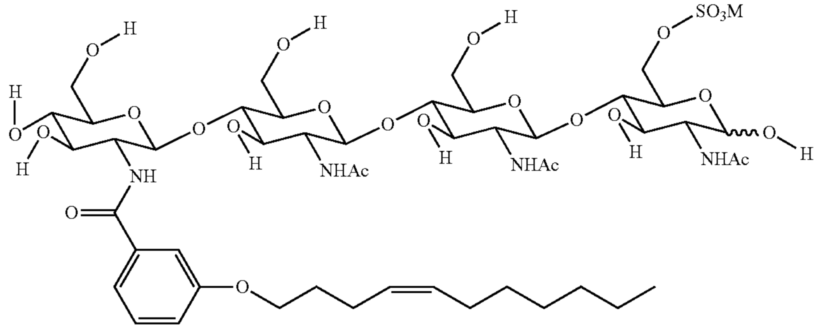

16. The composition of any one of paragraphs 1 to 15, wherein the at least one LCO comprises an LCO represented by the structure (XIV):

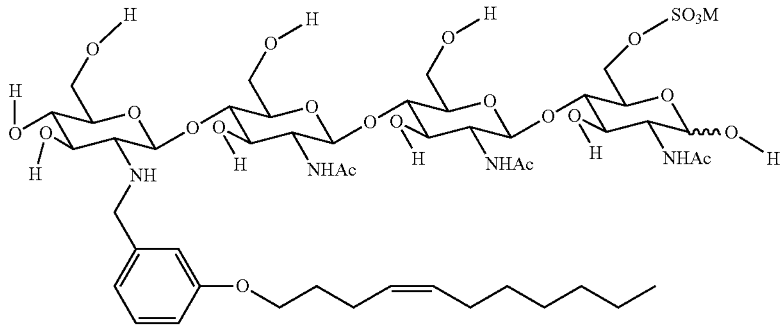

17. The composition of any one of paragraphs 1 to 16, wherein the at least one LCO comprises an LCO represented by the structure (XV):

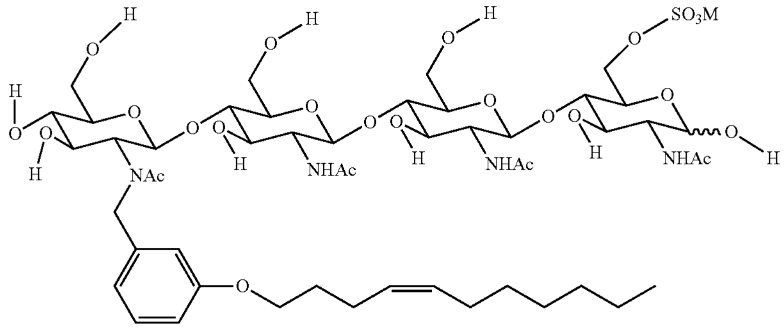

18. The composition of any one of paragraphs 1 to 17, wherein the at least one LCO comprises an LCO represented by the structure (XVI):

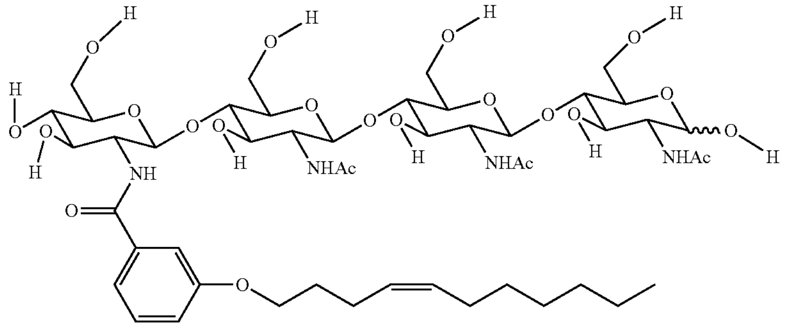 [SMILES: CCCCCC/C=C\CCCOc1cccc(C(=O)NC2C(OC3C(CO)OC(OC4C(CO)OC(OC5C(CO)OC(O)C(NC(C)=O)C5O)C(NC(C)=O)C4O)C(NC(C)=O)C3O)OC(CO)C(O)C2O)c1]

19. The composition of any one of paragraphs 1 to 18, wherein the at least one LCO comprises an LCO represented by the structure (XVII):

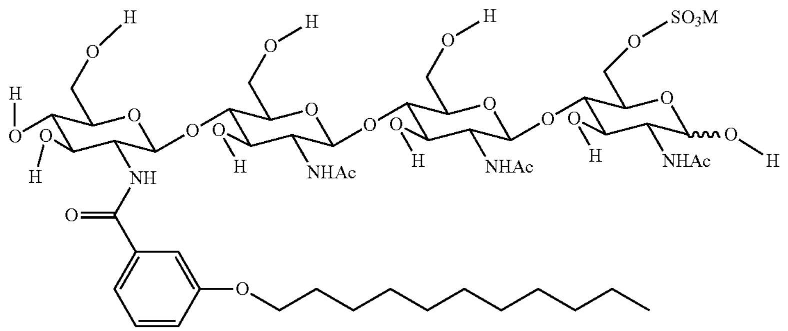

20. The composition of any one of paragraphs 1 to 19, wherein the at least one LCO comprises an LCO represented by the structure (XVIII):

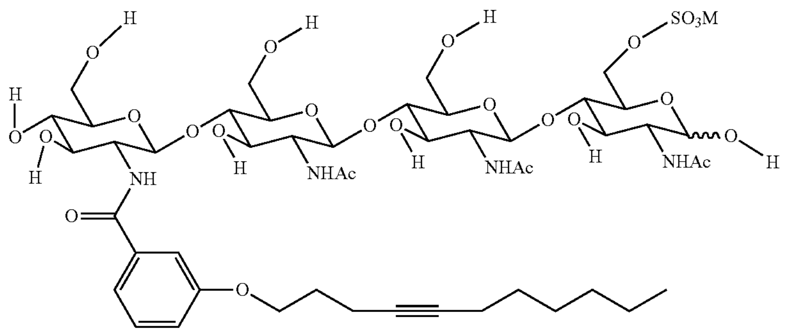

21. The composition of any one of paragraphs 1 to 20, wherein the at least one LCO comprises an LCO represented by the structure (XIX):

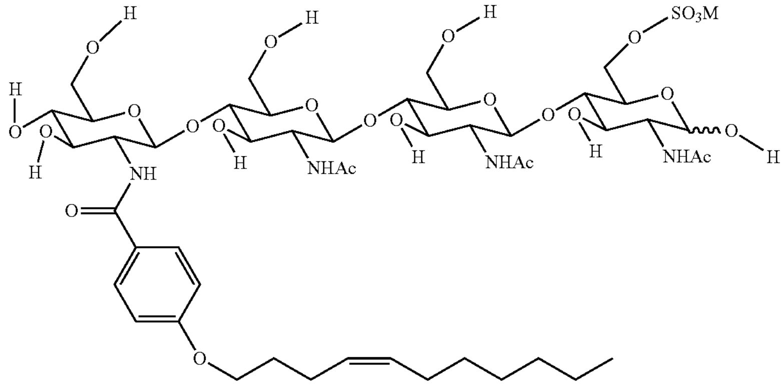

22. The composition of any one of paragraphs 1 to 21, wherein the at least one LCO comprises an LCO represented by the structure (XX):

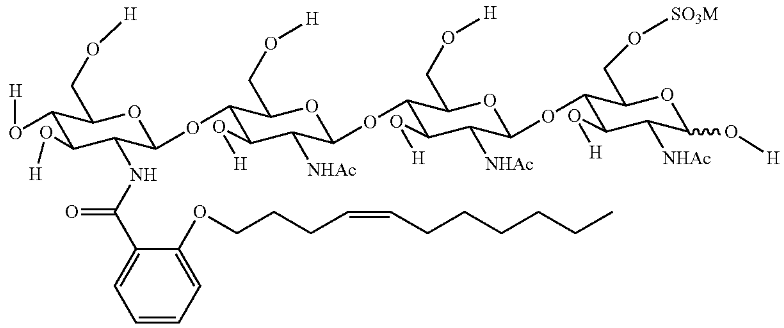

23. The composition of any one of paragraphs 1 to 2, wherein the at least one LCO comprises an LCO represented by the structure (XXI):

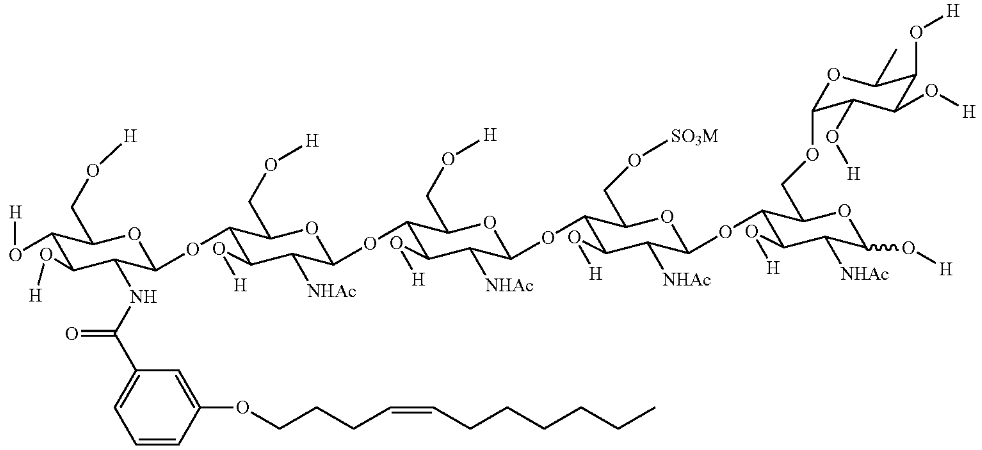

24. The composition of any one of paragraphs 1 to 23, wherein the at least one LCO comprises an LCO represented by the structure (XXII):

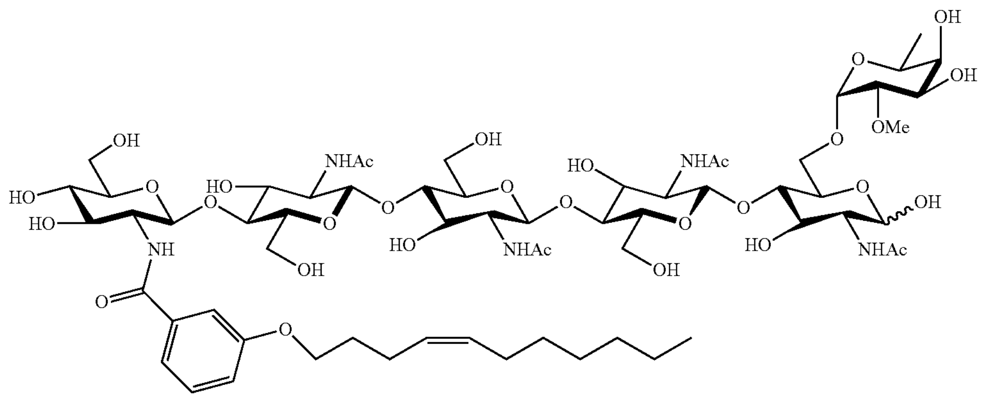

25. The composition of any one of paragraphs 1 to 24, wherein the at least one LCO comprises an LCO represented by the structure (XXIII):

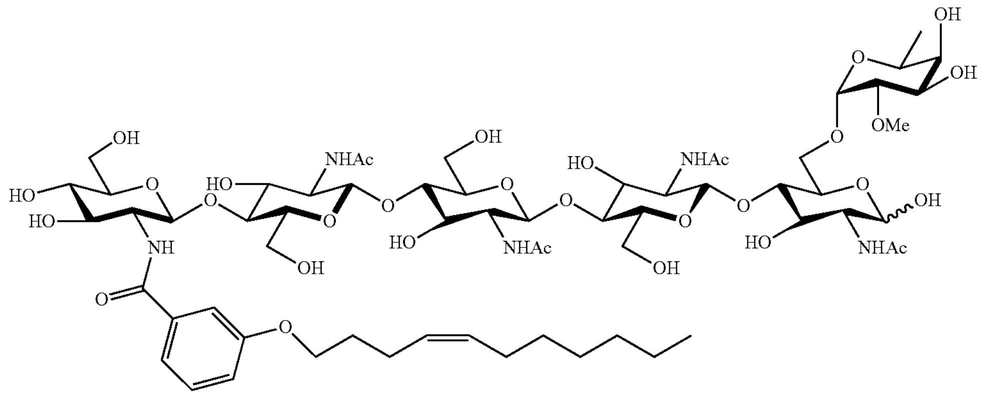

26. The composition of any one of paragraphs 1 to 25, wherein the at least one LCO comprises an LCO represented by the structure (XXIV):

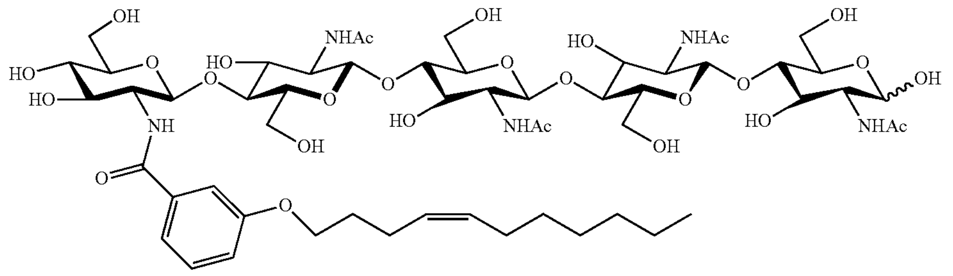

27. The composition of any one of paragraphs 1 to 26, wherein the at least one LCO comprises an LCO represented by the structure (XXV):

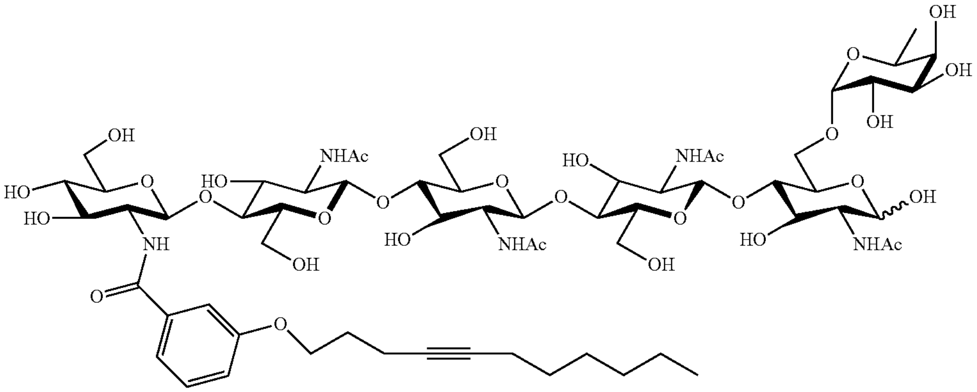

28. The composition of any one of paragraphs 1 to 26, wherein the at least one LCO comprises an LCO represented by the structure (XXVI):

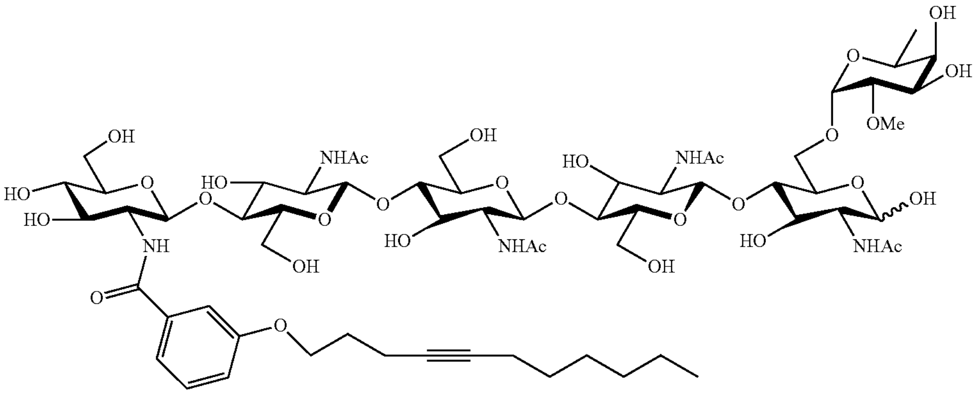

29. The composition of any one of paragraphs 1 to 28, wherein the at least one LCO comprises an LCO represented by the structure (XXVII):

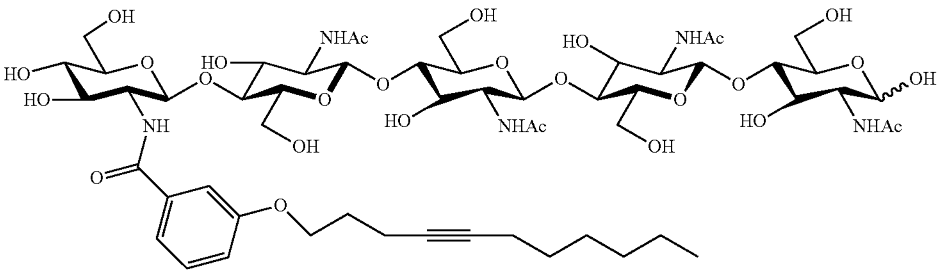

30. The composition of any one of paragraphs 1 to 29, wherein the at least one LCO comprises an LCO represented by the structure (XXVII):

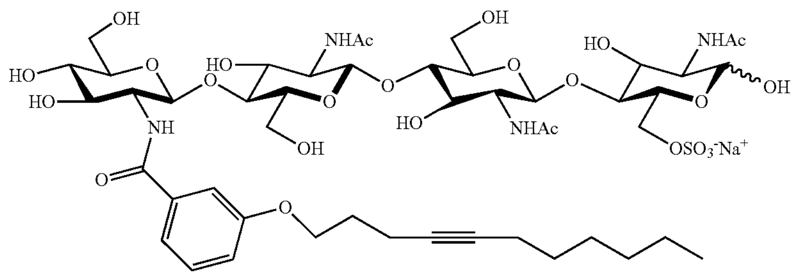

31. The composition of any one of paragraphs 1 to 30, wherein the at least one LCO comprises an LCO represented by the structure (XXIX):

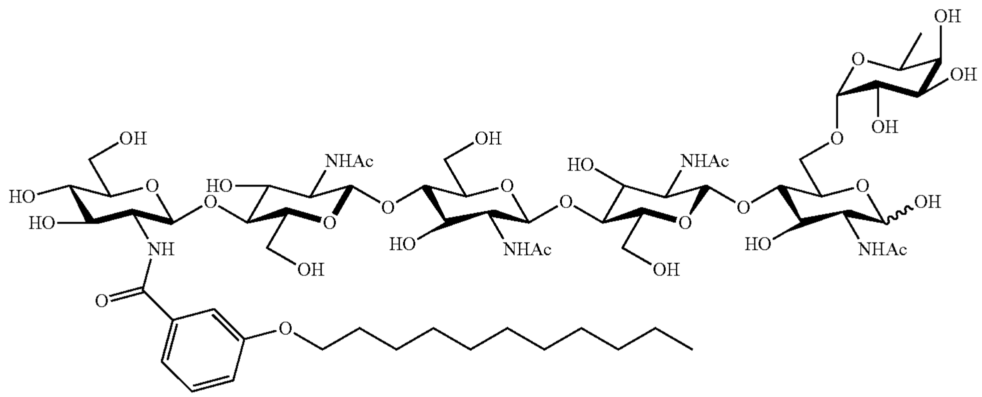

32. The composition of any one of paragraphs 1 to 31, wherein the at least one LCO comprises an LCO represented by the structure (XXX):

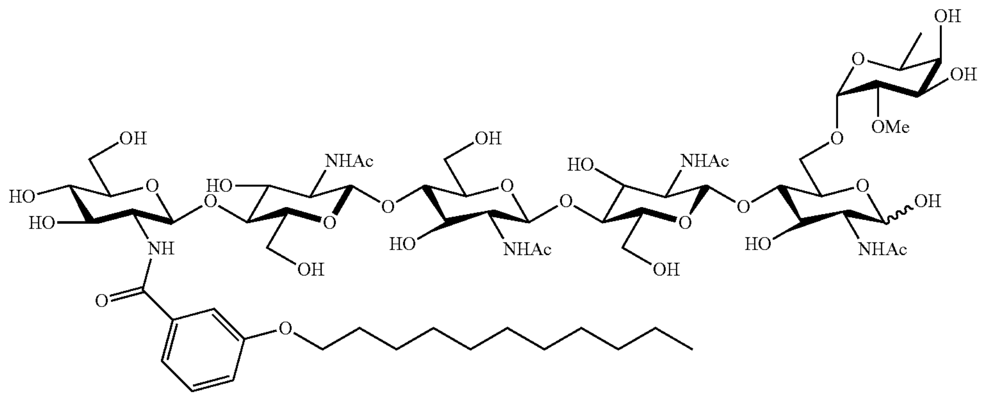

33. The composition of any one of paragraphs 1 to 32, wherein the at least one LCO comprises an LCO represented by the structure (XXXI):

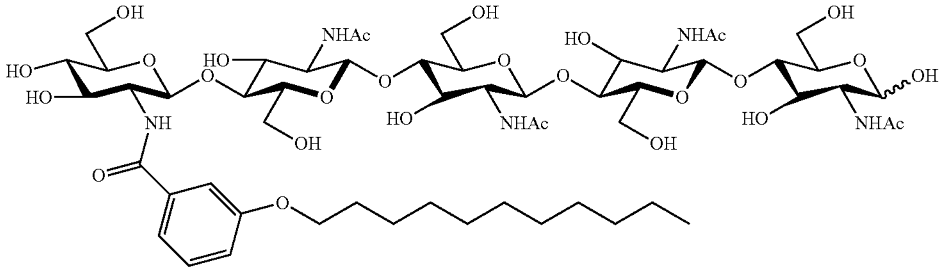

34. The composition of any one of paragraphs 1 to 33, wherein the at least one LCO comprises an LCO represented by the structure (XXXI);

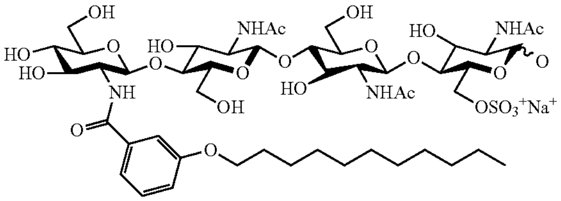

35. The composition of any one of paragraphs 1 to 34, wherein the at least one LCO comprises an LCO represented by the structure (XXXIII):

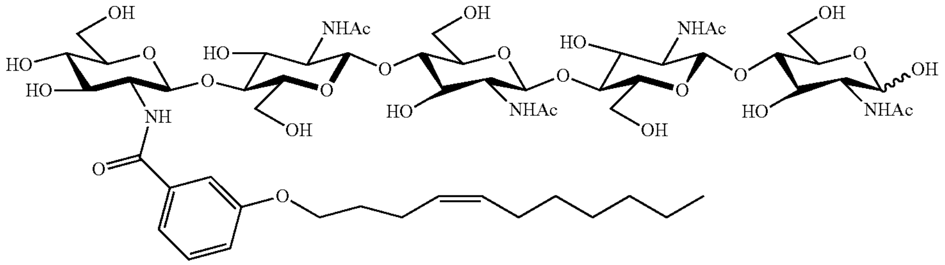

36. The composition of paragraph 1, wherein the at least one LCO compound comprises at least one synthetic LCO.

37. The composition of paragraph 1, wherein the at least one LCO comprises at least one recombinant LCO.

38. The composition of paragraph 37, wherein the at least one recombinant LCO has a purity of at least 60%.

39. The composition of paragraph 37, wherein the at least one recombinant LCO has a purity of at least 70%.

40. The composition of paragraph 37, wherein the at least one recombinant LCO has a purity of at least 80%.

41. The composition of paragraph 37, wherein the at least one recombinant LCO has a purity of at least 90%.

42. The composition of any one of paragraphs 1 to 41, wherein the at least one agriculturally beneficial agent comprises one or more fungicides, optionally one or more biological fungicides and/or one or more chemical fungicides.

43. The composition of paragraph 42, wherein the one or more fungicides comprises one or more strains of *Ampelomyces quisqualis, Aspergillus flavus, Aureobasidium pullulans, Bacillus pumilus, Bacillus* sp., isolate AQ175, ATCC 55608, *Bacillus* sp., isolate AQ177, ATCC 55609, *Bacillus subtilis, Bacillus amyloliquefaciens, Bacillus thuringiensis, Candida oleophila, Candida saitoana, Clonostachys rosea* f. *catenulata, Gliocladium catenulatum* isolate J1446, *Coniothyrium minitans, Cryphonectria parasitica, Cryptococcus albidus, Fusarium oxysporum, Metschnikowia fructicola, Microdochium dimerum, Muscodor albus, Muscodor roseus, Phlebiopsis gigantea, Pseudozyma flocculosa, Pythium oligandrum, Talaromyces flavus, Trichoderma asperellum, Trichoderma atroviride, Trichoderma harzianum*, a mixture of *Trichoderma harzianum* and *Trichoderma viride*, a mixture of *Trichoderma polysporum* and *Trichoderma harzianum, Trichoderma stromaticum, Trichoderma virens*, a mixture of *Trichoderma virens* and *Bacillus amyloliquefaciens, Trichoderma viride, Streptomyces* sp. isolate NRRL No. B-30145, *Streptomyces* sp. isolate M1064, *Streptomyces galbus, Streptomyces violaceusniger, Streptomyces* WYE 53, and/or *Ulocladium oudemansii.*

44. The composition of any one of paragraphs 42 to 43, wherein the one or more fungicides comprises *Bacillus amyloliquefaciens* FZB24; *Bacillus amyloliquefaciens* isolate NRRL B-50349; *Bacillus amyloliquefaciens* SB3778; *Bacillus amyloliquefaciens* TJ1000; *Bacillus pumilus* isolate AQ717, NRRL B-21662; *Bacillus pumilus* isolate NRRL B-30087; *Bacillus subtilis* isolate AQ713, NRRL B-21661;

*Bacillus subtilis* isolate AQ743, NRRL B-21665; *Bacillus thuringiensis* isolate AQ52, NRRL B-21619; *Candida oleophila* I-82, *Muscodor albus* isolate NRRL 30547, *Muscodor roseus* isolate NRRL 30548, *Pythium oligandrum* DV74, *Talaromyces flavus* V117b, *Trichoderma asperellum* SKT-1, *Trichoderma atroviride* LC52, *Trichoderma harzianum* T-22, *Trichoderma harzianum* TH-35, *Trichoderma harzianum* T-39, *Trichoderma harzianum* ICC012, *Trichoderma virens* GL-21, *Trichoderma virens* G1-3, *Trichoderma virens* G1-21, *Trichoderma viride* TV1, *Trichoderma viride* ICC080, *Streptomyces galbus* isolate NRRL 30232, *Streptomyces lydicus* WYEC 108, *Streptomyces violaceusniger* YCED 9, and/or *Ulocladium oudemansii* HRU3.

45. The composition of paragraphs 45-46, wherein the at least one fungicide comprises a mixture of *Trichoderma harzianum* ICC012 and *Trichoderma viride* ICC080, a mixture of *Trichoderma virens* G1-3 and *Bacillus amyloliquefaciens* FZB24, a mixture of *Trichoderma virens* G1-3 and *Bacillus amyloliquefaciens* TJ1000, a mixture of *Trichoderma virens* G1-21 and *Bacillus amyloliquefaciens* FZB24, and/or a mixture of *Trichoderma virens* G1-21 and *Bacillus amyloliquefaciens* TJ1000.

46. The composition of any one of paragraphs 42 to 45, wherein the one or more fungicides comprises at least one chemical fungicide selected from the group consisting of strobilurins, carboxamides, carbox anilides, carboxylic morpholides, benzoic acid amides, azoles, triazoles, imidazoles, pyridines, pyrimidines, piperazines, pyrroles, morpholines, piperidines, dicarboximides, non-aromatic 5-membered heterocycles, benzimidazoles, guanidines, antibiotics, nitrophenyl derivatives, organometal compounds, sulfur-containing heterocyclyl compounds, organophosphours compounds, organochlorine compounds, and salts and esters thereof, racemic mixtures and resolved isomers thereof, and combinations thereof.

47. The composition of any one of paragraphs 42 to 45, wherein the one or more fungicides comprises at least one chemical fungicide selected from the group consisting of azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester, and 2-(2-(3-(2,6-dichlorophenyl)-1-methyl-allylideneaminooxymethyl)-phenyl)-2-methoxyimino-N-methyl-acetamide, benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyra-zole-4-carboxamide, and N-(2-(1,3,3-trimethylbutyl)-phenyl)-1,3-dimethyl-5-fluoro-1H-pyrazole-4-carboxamide, dimethomorph, flumorph, pyrimorph, flumetover, fluopicolide, fluopyram, zoxamide carpropamid, dicyclomet, mandiproamid, oxytetracyclin, silthiofam, and N-(6-methoxy-pyridin-3-yl) cyclopropanecarboxylic acid amide, azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole; cyazofamid, imazalil, pefurazoate, prochloraz, triflumizol fluazinam, pyrifenox, 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine, bupirimate, cyprodinil, diflumetorim, fenarimol, ferimzone, mepanipyrim, nitrapyrin, nuarimol, pyrimethanil, triforine, fenpiclonil, fludioxonil, aldimorph, dodemorph, dodemorph-acetate, fenpropimorph, tridemorph, fenpropidin, fluoroimid, iprodione, procymidone, vinclozolin, famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester, acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole 2-butoxy-6-iodo-3-propylchromen-4-one, 5-chloro-1-(4,6-dimethoxy-pyrimidin-2-yl)-2-methyl-1H-benzoimidazole, and 5-chloro-7-(4-methylpiperidin-1-yl)-6-(2,4,6-trifluorophenyl)-[1,2,4]triazolo-[1,5-a]pyrimidine, carbendazim, guanidine, dodine, dodine free base, guazatine, guazatine-acetate, iminoctadine, iminoctadine-triacetate, iminoctadine-tris(albesilate), kasugamycin, kasugamycin hydrochloride-hydrate, streptomycin, polyoxine, validamycin A, binapacryl, dicloran, dinobuton, dinocap, nitrothal-isopropyl, tecnazen, fentin salts, fentin-acetate, fentin chloride, fentin hydroxide, dithianon, isoprothiolane, edifenphos, fosetyl, fosetyl-aluminum, iprobenfos, phosphorus acid, pyrazophos, tolclofos-methyl, chlorothalonil, dichlofluanid, dichlorophen, flusulfamide, hexachlorobenzene, pencycuron, pentachlorphenole, phthalide, quintozene, thiophanate-methyl, thiophanate, tolylfluanid, N-(4-chloro-2-nitro-phenyl)-N-ethyl-4-methyl-benzenesulfonamide, Bordeaux mixture, copper acetate, copper hydroxide, copper oxychloride, basic copper sulfate, sulfur, and salts and esters thereof, racemic mixtures and resolved isomers thereof, and combinations thereof.

48. The composition of any one of paragraphs 1 to 47, wherein the at least one agriculturally beneficial agent comprises azoxystrobin, pyraoxystrobin, penflufen, sedaxane, dimethomorph and/or ipconazole.

49. The composition of any one of paragraphs 1 to 48, wherein the at least one agriculturally beneficial agent comprises one or more insecticides, optionally one or more biological insectides and/or one or more chemical insecticides.

50. The composition of any one of paragraphs 1 to 44, wherein the at least one agriculturally beneficial agent comprises one or more acaricides, optionally one or more biological acaricides and/or one or more chemical acaricides.

51. The composition of any one of paragraphs 1 to 45, wherein the at least one agriculturally beneficial agent comprises and/or one or more nematicides, optionally one or more biological nematicides and/or one or more chemical nematicides.

52. The composition of any one of paragraphs 49 to 51, wherein the at least one agriculturally beneficial agent comprises at least one insecticidal, acaricidal, and/or nematicidal fungus.

53. The composition of paragraph 52, wherein the at least one insecticidal, acaricidal, and/or nematicidal fungus comprises one or more insecticidal, acaricidal, and/or nematicidal strains of *Alternaria cassia, Arthrobotrys dactyloides, Arthrobotrys oligospora, Arthrobotrys superb, Arthrobotrys dactyloides, Aspergillus parasiticus, Beauveria bassiana, Dactylaria candida, Fusarium lateritum, Fusarium solani,*

*Harposporium anguillulae, Hirsutella rhossiliensis, Hirsutella minnesotensis, Lecanicillium lecanii, Monacrosporium cionopagum, Nematoctonus geogenius, Nematoctonus leiosporus, Meristacrum asterospermum, Metarhizium anisopliae, Myrothecium verrucaria, Paecilomyces fumosoroseus, Paecilomyces lilacinus, Pasteuria penetrans, Pasteuria usage, Pochonia chlamydopora, Trichoderma hamatum, Trichoderma harzianum, Trichoderma virens, Verticillium chlamydosporum*, and/or *Verticillium lecanii.*

54. The composition of paragraph 52, wherein the at least one insecticidal, acaricidal, and/or nematicidal fungus comprises *Beauveria bassiana* isolate ATCC-74040, *Beauveria bassiana* isolate ATCC-74250, *Metarhizium anisopliae* isolate F52, and/or *Paecilomyces fumosoroseus* FE991.

55. The composition of any one of paragraphs 49 to 54, wherein the at least one agriculturally beneficial agent comprises at least one insecticidal, acaricidal, and/or nematicidal bacterium.

56. The composition of paragraph 55, wherein the at least one insecticidal, acaricidal, and/or nematicidal bacterium comprises one or more insecticidal, acaricidal, and/or nematicidal strains of *Bacillus firmus, Bacillus mycoides, Burkholderia* sp., *Burkholderia* sp. nov. rinojensis, *Chromobacterium subtsugae, Chromobacterium subtsugae* sp. nov., *Chromobacterium vaccinii, Chromobacterium violaceum, Flavobacterium* sp., *Streptomyces lydicus*, and/or *Streptomyces violaceusniger.*

57. The composition of paragraph 55, wherein the at least one insecticidal, acaricidal, and/or nematicidal bacterium comprises comprises *Bacillus mycoides* isolate AQ726, NRRL B-21664; *Burkholderia* sp. A396 sp. nov. rinojensis, NRRL B-50319; *Chromobacterium subtsugae* sp. nov. isolate NRRL B-30655; *Chromobacterium vaccinii* isolate NRRL B-50880; and/or *Flavobacterium* sp. isolate H492, NRRL B-50584.

58. The composition of any one of paragraphs 1 to 57, wherein the at least one agriculturally beneficial agent comprises at least one chemical insecticide, acaricide, and/or nematicide selected from the group consisting of carbamates, diamides, macrocyclic lactones, neonicotinoids, organophosphates, phenylpyrazoles, pyrethrins, spinosyns, synthetic pyrethroids, tetronic acids, tetramic acids, and salts and esters thereof, racemic mixtures and resolved isomers thereof, and combinations thereof.

59. The composition of any one of paragraphs 1 to 57, wherein the at least one agriculturally beneficial agent comprises at least one chemical insecticide, acaricide, and/or nematicide selected from the group consisting of acrinathrin, alpha-cypermethrin, betacyfluthrin, cyhalothrin, cypermethrin, deltamethrin, csfenvalcrate, etofenprox, fenpropathrin, fenvalerate, flucythrinat, fosthiazate, lambda-cyhalothrin, gamma-cyhalothrin, permethrin, tau-fluvalinate, transfluthrin, zeta-cypermethrin, cyfluthrin, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, imidaclothiz, chlorfluazuron), diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole, chlothianidin, cyazypyr, emamectin, emamectin benzoate, abamectin, ivermectin, milbemectin lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl)methyl](2,2-difluoroethyl)amino}furan-2(5H)-one, cadusaphos, carbaryl, carbofuran, ethoprophos, thiodicarb, aldicarb, aldoxycarb, metamidophos, methiocarb, sulfoxaflor, cyantraniliprole, and salts and esters thereof, racemic mixtures and resolved isomers thereof, and combinations thereof.

60. The composition of any one of paragraphs 1 to 59, wherein the at least one agriculturally beneficial agent comprises lambda-cyhalothrin, gamma-cyhalothrin, imidacloprid, thiamethoxam, pyriprole, chlorantraniliprole, chlothianidin, cyazypyr, abamectin, and/or pyrimidifen 61. The composition of any one of paragraphs 1 to 60, wherein the at least one agriculturally beneficial agent comprises one or more herbicides, optionally one or more biological herbicides and/or one or more chemical herbicides.

62. The composition of paragraph 61, wherein the one or more herbicides comprises at least one herbicide selected from the group consisting of acetyl CoA carboxylase (ACCase) inhibitors, acetolactate synthase (ALS), acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvyl shikimate-3-phosphate (EPSP) synthase inhibitors, glutamine synthetase inhibitors, dihydropteroate synthetase inhibitors, mitosis inhibitors, 4-hydroxyphenyl-pyruvate-dioxygenase (4-HPPD) inhibitors, synthetic auxins, auxin herbicide salts, auxin transport inhibitors, and nucleic acid inhibitors, salts and esters thereof, racemic mixtures and resolved isomers thereof, and combinations thereof.

63. The composition of paragraph 61, wherein the one or more herbicides comprises at least one herbicide selected from the group consisting of 2,4-dichlorophenoxyacetic acid (2,4-D), 2,4,5-trichlorophenoxyacetic acid (2,4,5-T), ametryn, amicarbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluron, clethodim, clodinafop, clomazone, cyanazine, cycloxydim, cyhalofop, desmedipham, desmetryn, dicamba, diclofop, dimefuron, diuron, dithiopyr, fenoxaprop, fluazifop, fluazifop-P, fluometuron, flufenpyr-ethyl, flumiclorac-pentyl, flumioxazin, fluoroglycofen, fluthiacet-methyl, fomesafe, fomesafen, glyphosate, glufosinate, haloxyfop, hexazinone, imazamox, imazaquin, imazethapyr, ioxynil, isoproturon, isoxaflutole, lactofen, linuron, mecoprop, mecoprop-P, mesotrione, metamitron, metazochlor, methibenzuron, metolachlor, S-metolachlor, metoxuron, metribuzin, monolinuron, oxadiargyl, oxadiazon, oxyfluorfen, phenmedipham, pretilachlor, profoxydim, prometon, prometryn, propachlor, propanil, propaquizafop, propisochlor, pyraflufen-ethyl, pyrazon, pyrazolynate, pyrazoxyfen, pyridate, quizalofop, quizalofop-P, quizalofop-ethyl, quizalofop-P-ethyl, clodinafop-propargyl, cyhalofop-butyl, diclofop-methyl, fenoxaprop-P-ethyl, fluazifop-P-butyl, haloxyfop-methyl, haloxyfop-R-methyl, saflufenacil, sethoxydim, siduron, simazine, simetryn, sulcotrione, sulfentrazone, tebuthiuron, tembotrione, tepraloxydim, terbacil, terbumeton, terbuthylazine, thaxtomin, thenylchlor, tralkoxydim, triclopyr, trietazine, topramezone, and salts and esters thereof, racemic mixtures and resolved isomers thereof, and combinations thereof.

64. The composition of any of paragraphs 1-63, wherein the at least one agriculturally beneficial agent comprises at least one agriculturally beneficial microorganism.

65. The composition of paragraph 64, wherein the at least one agriculturally beneficial microorganism comprises at least one diazotroph.

66. The composition of paragraph 65, wherein the at least one diazotroph comprises one or more diazotrophs selected from the group consisting of *Azorhizobium caulinodans, Azorhizobium doebereinerae, Azospirillum amazonense, Azospirillum brasilense, Azospirillum canadense, Azospirillum doebereinerae, Azospirillum formosense, Azospirillum halopraeferans, Azospirillum irakense, Azospirillum largimobile, Azospirillum lipoferum, Azospirillum melinis, Azospirillum oryzae, Azospirillum picis, Azospirillum rugosum, Azospirillum thiophilum, Azospirillum zeae, Bradyrhizobium bête, Bradyrhizobium canariense, Bradyrhizobium elkanii, Bradyrhizobium iriomotense, Bradyrhizobium japonicum, Bradyrhizobium jicamae, Bradyrhizobium liaoningense, Bradyrhizobium pachyrhizi, Bradyrhizobium yuanmingense, Mesorhizobium albiziae, Mesorhizobium amorphae, Mesorhizobium chacoense, Mesorhizobium ciceri, Mesorhizobium huakuii, Mesorhizobium loti, Mesorhizobium mediterraneum, Mesorhizobium pluifarium, Mesorhizobium septentrionale, Mesorhizobium temperatum, Mesorhizobium tianshanense, Rhizobium cellulosilyticum, Rhizobium daejeonense, Rhizobium etli, Rhizobium galegae, Rhizobium gallicum, Rhizobium giardinii, Rhizobium hainanense, Rhizobium huautlense, Rhizobium indigoferae, Rhizobium leguminosarum, Rhizobium loessense, Rhizobium lupini, Rhizobium lusitanum, Rhizobium meliloti, Rhizobium mongolense, Rhizobium miluonense, Rhizobium sullae, Rhizobium tropici, Rhizobium undicola, Rhizobium yanglingense, Sinorhizobium abri, Sinorhizobium adhaerens, Sinorhizobium americanum, Sinorhizobium aboris, Sinorhizobium fredii, Sinorhizobium indiaense, Sinorhizobium kostiense, Sinorhizobium kummerowiae, Sinorhizobium medicae, Sinorhizobium meliloti, Sinorhizobium mexicanus, Sinorhizobium morelense, Sinorhizobium saheli, Sinorhizobium terangae, Sinorhizobium xinjiangense*, and combinations thereof.

67. The composition of paragraph 65, wherein the at least one diazotroph comprises one or more diazotrophs selected from the group consisting of *Azospirillum brasilense* isolate INTA Az-39, *Bradyrhizobium elkanii* isolate SEMIA 587, *Bradyrhizobium elkanii* isolate SEMIA 5019, *Bradyrhizobium japonicum* isolate SEMIA 5079, *Bradyrhizobium japonicum* isolate SEMIA 5080, *Bradyrhizobium japonicum* isolate NRRL B-50608, *Bradyrhizobium japonicum* isolate NRRL B-50609, *Bradyrhizobium japonicum* isolate NRRL B-50610, *Bradyrhizobium japonicum* isolate NRRL B-50611, *Bradyrhizobium japonicum* isolate NRRL B-50612, *Bradyrhizobium japonicum* isolate NRRL B-50592, *Bradyrhizobium japonicum* isolate NRRL B-50593, *Bradyrhizobium japonicum* isolate NRRL B-50586, *Bradyrhizobium japonicum* isolate NRRL B-50588, *Bradyrhizobium japonicum* isolate NRRL B-50587, *Bradyrhizobium japonicum* isolate NRRL B-50589, *Bradyrhizobium japonicum* isolate NRRL B-50591, *Bradyrhizobium japonicum* isolate NRRL B-50590, *Bradyrhizobium japonicum* isolate NRRL B-50594, *Bradyrhizobium japonicum* isolate NRRL B-50726, *Bradyrhizobium japonicum* isolate NRRL B-50727, *Bradyrhizobium japonicum* isolate NRRL B-50728, *Bradyrhizobium japonicum* isolate NRRL B-50729, *Bradyrhizobium japonicum* isolate NRRL B-50730, *Bradyrhizobium japonicum* isolate USDA 532C, *Bradyrhizobium japonicum* isolate USDA 110, *Bradyrhizobium japonicum* isolate USDA 123, *Bradyrhizobium japonicum* isolate USDA 127, *Bradyrhizobium japonicum* isolate USDA 129, *Rhizobium leguminosarum* isolate SO12A-2-(IDAC 080305-01), and combinations thereof.

68. The composition of any one of paragraphs 64 to 67, wherein the at least one agriculturally beneficial microorganism comprises at least one phosphate-solubilizing microorganism.

69. The composition of paragraph 68, wherein the at least one phosphate-solubilizing microorganism comprises one or more phosphate-solubilizing microorganisms selected from the group consisting of *Penicillium albidum, Penicillium aurantiogriseum, Penicillium bilaiae, Penicillium canescens, Penicillium chrysogenum, Penicillium citreonigrum, Penicillium citrinum, Penicillium digitatum, Penicillium expansum, Penicillium fellutanum, Penicillium frequentas, Penicillium fuscum, Penicillium fussiporus, Penicillium gaestrivorus, Penicillium glabrum, Penicillium glaucum, Penicillium griseofulvum, Penicillium implicatum, Penicillium janthinellum, Penicillium lanosocoeruleum, Penicillium lilacinum, Penicillium minioluteum, Penicillium montanense, Penicillium nigricans, Penicillium oxalicum, Penicillium pinetorum, Penicillium pinophilum, Penicillium purpurogenum, Penicillium radicum, Penicillium raistrickii, Penicillium rugulosum, Penicillium simplicissimum, Penicillium solitum, Penicillium variabile, Penicillium velutinum, Penicillium viridicatum, Talaromyces aculeatus*, and combinations thereof.

70. The composition of paragraph 68, wherein the at least one phosphate-solubilizing microorganism comprises one or more phosphate-solubilizing microorganisms selected from the group consisting of *Penicillium bilaiae* isolate ATCC 20851, *Penicillium bilaiae* isolate ATCC 22348, *Penicillium bilaiae* isolate V08/021001, *Penicillium bilaiae* isolate NRRL B-50776, *Penicillium bilaiae* isolate NRRL B-50777, *Penicillium bilaiae* isolate NRRL B-50778, *Penicillium bilaiae* isolate NRRL B-50779, *Penicillium bilaiae* isolate NRRL B-50780, *Penicillium bilaiae* isolate NRRL B-50781, *Penicillium bilaiae* isolate NRRL B-50782, *Penicillium bilaiae* isolate NRRL B-50783, *Penicillium bilaiae* isolate NRRL B-50784, *Penicillium bilaiae* isolate NRRL B-50785, *Penicillium bilaiae* isolate NRRL B-50786, *Penicillium bilaiae* isolate NRRL B-50787, *Penicillium bilaiae* isolate NRRL B-50788, *Penicillium bilaiae* isolate NRRL B-50169, *Penicillium bilaiae* isolate ATCC 18309, *Penicillium brevicompactum* isolate AgRF18, *Penicillium canescens* isolate ATCC 10419, *Penicillium expansum* isolate ATCC 24692, *Penicillium expansum* isolate YT02, *Penicillium fellutanum* isolate ATCC 48694, *Penicillium gaestrivorus* isolate NRRL 50170, *Penicillium glabrum* isolate DAOM 239074, *Penicillium glabrum* isolate CBS 229.28, *Penicillium janthinellum* isolate ATCC 10455, *Penicillium lanosocoeruleum* isolate ATCC 48919, *Penicillium radicum* isolate N93/47267, *Penicillium radicum* isolate FRR 4717, *Penicillium radicum* isolate ATCC 201836, *Penicillium radicum* isolate FRR 4719, *Penicillium raistrickii* isolate ATCC 10490, *Talaromyces aculeatus* isolate ATCC 10409, and combinations thereof.

71. The composition of any one of paragraphs 64 to 70, wherein the at least one agriculturally beneficial microorganism comprises at least one mycorrhiza.

72. The composition of paragraph 71, wherein the at least one mycorrhiza comprises one or more mycorrhizae selected from the group consisting of *Gigaspora margarita, Glomus aggregatum, Glomus brasilianum, Glomus clarum, Glomus deserticola, Glomus etunicatum, Glomus fasciculatum, Glomus intraradices, Glomus monosporum, Glomus mosseae, Hymenoscyphous ericae, Laccaria bicolor, Laccaria laccata, Oidiodendron* sp., *Paraglomus brazilianum, Pisolithus tinctorius, Rhizoctonia* sp., *Rhizopogon amylopogon, Rhizopogon fulvigleba, Rhizopogon luteolus, Rhizopogon villosuli, Scleroderma cepa, Scleroderma citrinum*, and combinations thereof.

73. The composition of paragraphs 1-72, wherein the composition futher comprises one or more additional agriculturally beneficial agents selected from the group consisting of chito-oliogosaccharides (COs), chitinous compounds, flavonoids, jasmonic acid, methyl jasmonate, linoleic acid, linolenic acid, karrikins, gluconolactones, glutathiones, and combinations thereof.

74. A method for enhancing the growth of a plant or plant part comprising contacting a plant or plant part with at least one lipo-chitooligosaccharide compound (LCOs) and at least one agriculturally beneficial agent selected from the group consisting of pesticides, agriculturally beneficial microorganisms, and combinations thereof.

75. The method of paragraph 74, wherein the plant or plant part is contacted with the composition of any one of paragraphs 1-73.

76. The method of paragraph 74, wherein the plant or plant part is contacted with the at least one LCO prior to contacting the plant or plant part with the at least one agriculturally beneficial agent.

77. The method of paragraph 74, wherein the plant or plant part is contacted with the at least one LCO after contacting the plant or plant part with the at least one agriculturally beneficial agent.

78. The method of paragraph 74, wherein the plant or plant part is contacted with the at least one LCO and the at least one agriculturally beneficial agent simultaneously.

79. A method for enhancing the growth of a plant or plant part comprising treating a soil with at least one lipo-chitooligosaccharide compound (LCO) and at least one agriculturally beneficial agent selected from the group consisting of pesticides, agriculturally beneficial microorganisms, and combinations thereof; and planting a plant or plant part in the soil.

80. The method of paragraph 79, wherein the soil is treated with the composition of any one of paragraphs 1-73.

81. The method of paragraph 79, wherein the soil is treated with the at least one LCO prior to treating the soil with the at least one agriculturally beneficial agent.

82. The method of paragraph 79, wherein the soil is treated with the at least one LCO after treating the soil with the at least one agriculturally beneficial agent.

83. The method of paragraph 79, wherein the soil is treated with the at least one LCO and the at least one agriculturally beneficial agent simultaneously.

84. The method of any one of paragraphs 79-83, wherein planting the plant or plant part in the soil occurs before the soil treatment.

85. The method of any one of paragraphs 79-83, wherein planting the plant or plant part in the soil occurs after the soil treatment.

86. The method of any one of paragraphs 79-83, wherein planting the plant or plant part in the soil occurs simultaneously with the soil treatment.

87. A seed at least partially coated with the composition of any one of paragraphs 1-73.

EXAMPLES

The following examples are not intended to be a detailed catalogue of all the different ways in which the present invention may be implemented or of all the features that may be added to the present invention. Subjects skilled in the art will appreciate that numerous variations and additions to the various embodiments may be made without departing from the present invention. Hence, the following descriptions are intended to illustrate some particular embodiments of the invention, and not to exhaustively specify all permutations, combinations and variations thereof.

Example 1

LCO and *Streptomyces Lydicus* WYEC 108 Synergistically Increased Soybean Shoot Diameter, Shoot Area, Shoot Volume and Root Volume Soybean seeds (Asgrow 4831, A1024750, HU3U11) were weighed out into 200 g allotments. Each allotment of seed was treated with one of the following: a control of 2.4 ml of DI water ("UTC"); Actinovate® STP (Novozymes BioAg, Inc., Brookfield, WI) at 6 oz per cwt ("Actinovate"); LCO at 1.86 μg per cwt ("LCO"); Actinovate STP at 6 oz per cwt and LCO at 1.86 μg per cwt ("Actinovate+LCO").

To confirm that the *Streptomyces lydicus* in Actinovate were successfully applied to the seeds, one gram treated seed was placed in 99 ml of phosphate buffer and shaken in a wrist action shaker for 30 min. Serial dilutions were made by pipetting 100 μl into 900 μl phosphate buffer until desired dilutions were reached, vortexing for at least 1 min for each dilution. Again vortexing sample, 100 uL of each target dilution (2 and 3) was plated at the minimum of 3 replicates on LB+Dextrose plates. Plates were incubated at room temperature for 5 days. Colonies of *Streptomyces lydicus* were observed on both Actinovate and Actinovate+Torque plates, with colonies becoming visible approximately one day earlier on the Actinovate+LCO plates.

Treated seeds were planted in 72 well flats (1 flat per treatment) containing Fafard® Ultra-Fine Germination mix. The seeded flats were cut into 3×3 squares and randomized. Each 9-well square was considered one rep for germination count.

Germinated plants were harvested (3 subsamples per rep) and scanned using WinRhizo (Regent Instruments, Inc., Quebec, Canada). Plants germinated from seeds treated with Actinovate+LCO exhibited an increase in mean shoot area, mean shoot diameter, mean shoot volume, mean shoot dry weight, mean root length, mean root area, and mean root volume, as compared to plants treated with Actinovate or LCO alone. Plants germinated from seeds treated with Actinovate+LCO exhibited a synergistic increase in mean shoot diameter, mean shoot area, mean shoot volume, and mean root volume, as compared to plants germinated from seeds treated with Actinovate or LCO alone.

Example 2

LCO and *Trichoderma Virens* GI-3 Synergistically Increased Soybean Shoot Length, Shoot Projected Area, and Shoot Surface Area Soybean seeds (AG4531) were weighed out into 200 g allotments. Each allotment of seed was treated with one of the following: a control of 2.4 ml DI water ("UTC");

*Trichoderma virens* strain GI-3 at $1\times10^5$ colony forming units per seed ("GI-3"); LCO at 1.86 μg per cwt ("LCO"); or *Trichoderma virens* strain GI-3 at $1\times10^5$ colony forming units per seed and LCO at 1.86 μg per cwt ("GI-3+LCO"). Seeds were treated using a Wintersteiger Hege 11 seed treater and allowed to dry for 10 minutes prior to planting.

Treated seeds were planted in 72 cell germination flats filled with ProMix BX potting media. The seeded flats were grown in a greenhouse and watered to field capacity during the growth period.

Germinated plants were harvested 10 days after planting and analyzed using WinRhizo (Regent Instruments, Inc., Quebec, Canada). As shown in Tables 1-3, plants germinated from seeds treated with GI-3 and LCO exhibited a synergistic increase in mean shoot length, meanprojected shoot area, and mean shoot surface area, as compared to plants germinated from seeds treated with GI-3 or LCO alone.

TABLE 1

Mean shoot length of soybean plants harvested 10 days after planting.

| Treatments | Length, cm/ Connecting Letters ($p \leq 0.05$) | Percent Increase over Control (%) |
|---|---|---|
| Untreated Control | $12.07^{B}$ | N/A |
| GI-3 | $12.55^{AB}$ | 3.98 |
| GI-3 + LCO | $14.63^{A}$ | 21.21 |
| LCO | $13.44^{AB}$ | 11.35 |

TABLE 2

Mean projected shoot area of soybean plants harvested 10 days after planting.

| Treatments | Projected Area, $cm^2$/Connecting Letters ($p \leq 0.05$) | Percent Increase over Control (%) |
|---|---|---|
| Untreated Control | $7.75^{B}$ | N/A |
| GI-3 | $8.62^{AB}$ | 11.23 |
| GI-3 + LCO | $10.93^{A}$ | 41.03 |
| SP104 | $8.89^{AB}$ | 14.71 |

TABLE 3

Mean shoot surface area of soybean plants harvested 10 days after planting.

| Treatments | Surface Area, $cm^2$/Connecting Letters ($p \leq 0.05$) | Percent Increase over Control (%) |
|---|---|---|
| Untreated Control | $24.36^{B}$ | N/A |
| GI-3 | $27.09^{AB}$ | 11.21 |
| GI-3 + LCO | $34.32^{A}$ | 40.89 |
| LCO | $27.95^{AB}$ | 14.74 |

Example 3

LCO and *Trichoderma Virens* GI-3 Synergistically Increased Corn Germination, Shoot Length, Shoot Projected Area, Shoot Surface Area, Root Length, Root Projected Area, and Root Surface Area Corn seeds (DKC 63-33) were weighed out into 200 g allotments. Each allotment of seed was treated with one of the following: a control of 2.1 mL DI water ("UTC"); *Trichoderma virens* strain GI-3 at $1\times10^5$ colony forming units per seed ("GI-3"); LCO at 1.86 μg per cwt ("LCO"); or *Trichoderma virens* strain GI-3 at $1\times10^5$ colony forming units per seed and LCO at 1.86 μg per cwt ("GI-3+SP104"). Seeds were treated using a Wintersteiger Hege 11 seed treater and allowed to dry for 10 minutes prior to planting.

Treated seeds were planted in 72 cell germination flats filled with ProMix BX potting media. The seeded flats were grown in a greenhouse and watered to field capacity during the growth period.

A germination count was conducted 6 days after planting, and germinated plants were harvested 8 days after planting and analyzed using WinRhizo (Regent Instruments, Inc., Quebec, Canada). Surprisingly, plants germinated from seeds treated with GI-3 and LCO exhibited a synergistic increase in germination, mean shoot length, meanprojected shoot area, mean shoot surface area, mean root length, mean root projected area, and mean root surface area, as compared to plants germinated from seeds treated with GI-3 or LCO alone.

Example 4

LCO and *Bacillus Amyloliqufaciens* Synergistically Increased Corn Biomass

Corn seeds (DKC 63-33) were weighed out into 100 g allotments. Each allotment of seed was treated with one of the following: a control of 500 μl DI water ("UTC"); 500 μl of *Bacillus amyloliquefaciens* strain SB3778 fermentation broth ("SB3778"); 500 μl of $10^{-8}$ M LCO ("LCO"); or 250 μl of *Bacillus amyloliquefaciens* strain SB3778 fermentation broth and 250 μl of $10^{-8}$ M LCO ("SB3778+LCO"). Treated seeds were allowed to dry for 3-4 hours prior to planting.

Treated seeds were planted in germination flats filled with Promix potting media (5 rows per treatment; 6 seedlings per row). The seeded flats were grown for two weeks in a growth chamber at 25° C. and 70% humidity with 16 hours of light per day, then harvested and analyzed.

As shown in Table 4, plants germinated from seeds treated with SB3778 and LCO exhibited a synergistic increase in dry weight biomass, as compared to plants germinated from seeds treated with SB3778 or LCO alone.

TABLE 4

Mean dry weight of corn plants harvested two weeks after planting.

| Yield Parameter | Control | SB3281 + LCO | LCO | SB3281 |
|---|---|---|---|---|
| Average plant DW (g) | 0.219 | 0.234 | 0.224 | 0.224 |
| % dry weight increase | | 6.85% | 2.30% | 2.30% |

Example 5

LCO Increased Yield of Corn Seeds Treated With CruiserMaxx®

Corn seeds treated with CruiserMaxx® (thiamethoxam, mefenoxam, fludioxonil; Syngenta Crop Protection, LLC, Greensboro, NC) ("control") or CruiserMaxx® and LCO (Torque® ST, Novozymes BioAg Inc., Brookfield, WI) ("CruiserMaxx+LCO").

Control and CruiserMaxx+LCO seeds were planted in various locations during two separate growing seasons: Arkansaw, WI; Carroll, IA; Geneva, MN; Sparta, IL; Tekamah, NE; and Verona, WI during the first growing season and Fishers, IN; Geneva, MN; Madison, WI; Richland, IA; Sparta, IL; and York, NE during the second growing season.

The average yield of plants germinated from CruiserMaxx+LCO seeds exceeded the average yield of plants germinated from control seeds by 2.03 bushels per acre.

Example 6

LCO Increased Yield of Soybean Seeds Treated With Acceleron®

Soybean seeds treated with Acceleron® (pyraclostrobin, metalaxyl, imidacloprid; Monsanto Technology LLC, St. Louis, MO) ("control") or Acceleron® and LCO (Torque® ST, Novozymes BioAg Inc., Brookfield, WI) ("Acceleron+LCO").

Control and Acceleron+LCO seeds were planted in various locations during three separate growing seasons: Campbell, MN; Fishers, IN; Sparta, IL; Verona, WI; and York, NE during the first growing season, Arkansaw, WI; Carroll, IA; Madison, WI; and Sparta, IL during the second growing season, and Arkansaw, WI; Belleville, WI; Brookings, SD; Carroll, IA; Fishers, IN; Geneva, MN; Marissa, IL; and York, NE during the third growing season.

The average yield of plants germinated from Acceleron+LCO seeds exceeded the average yield of plants germinated from control seeds treated by 1.6 bushels per acre.

Example 7

LCO Increased Yield of Soybean Seeds Treated With CruiserMaxx® Plus

Soybean seeds treated with CruiserMaxx® Plus (thiamethoxam, mefenoxam, fludioxonil; Syngenta Crop Protection, LLC, Greensboro, NC) ("control") or CruiserMaxx® Plus and LCO (Torque® ST, Novozymes BioAg Inc., Brookfield, WI) ("CruiserMaxx Plus+LCO").

Control and CruiserMaxx Plus+LCO seeds were planted in various locations during two separate growing seasons: Arkansaw, WI; Carroll, IA; and Sparta, IL during the first growing season and Arkansaw, WI; Brookings, IL; Carroll, IA; Clarence, MO; Fishers, IN; Geneva, MN; Marissa, IL; and York, NE during the second growing season.

The average yield of plants germinated from CruiserMaxx Plus+LCO seeds exceeded the average yield of plants germinated from control seeds by 2.2 bushels per acre.

Example 8

LCO Increased Yield of Soybean Seeds Treated With CruiserMaxx® Plus

Soybean seeds treated with CruiserMaxx® Plus (thiamethoxam, mefenoxam, fludioxonil; Syngenta Crop Protection, LLC, Greensboro. NC) ("control") or CruiserMaxx® Plus and LCO (ProStablish™, Novozymes BioAg Inc., Brookfield, WI) ("CruiserMaxx Plus+LCO").

Control and CruiserMaxx Plus+LCO seeds were planted in Campbell, MN and Sparta, IL.

The average yield of plants germinated from CruiserMaxx Plus+LCO seeds exceeded the average yield of plants germinated from control seeds by 3.0 bushels per acre.

Example 9

LCO Increased Yield of Soybean Seeds Treated With CruiserMaxx® Beans

Soybean seeds treated with CruiserMaxx® Beans (thiamethoxam, mefenoxam, fludioxonil; Syngenta Crop Protection, LLC, Greensboro, NC) ("control") or CruiserMaxx® Beans and LCO (ProStablish™, Novozymes BioAg Inc., Brookfield, WI) ("CruiserMaxx Beans+LCO").

Control and CruiserMaxx Beans+LCO seeds were planted in Campbell, MN; Fishers, IN; Geneva, MN; Sparta, IL; Tipp City, Ohio; Verona, WI; and York, NE.

The average yield of plants germinated from CruiserMaxx Beans+LCO seeds exceeded the average yield of plants germinated from control seeds by 2.7 bushels per acre.

Example 10

LCO Increased Yield of Soybean Seeds Treated With Trilex®

Soybean seeds treated with Trilex® 6000 (trifloxystrobin, metalaxyl, imidacloprid, *Bacillus pumilus* GB34; Bayer CropScience, Research Triangle Park, NC) ("control") or Trilex® 6000 and LCO (Torque® ST, Novozymes BioAg Inc., Brookfield, WI) ("Trilex+LCO").

Control and Trilex+LCO seeds were planted in various locations during three separate growing seasons: Campbell, MN; Fishers, IN; Sparta, IL; Verona, WI; and York, NE during the first growing season, Arkansaw, WI; Carroll, IA; Fitchburg, WI; and Sparta, IL during the second growing season, and Arkansaw, WI; Belleville, WI; Brookings, SD; Carroll, IA; Clarence, MO; Fishers, IN; Geneva, MN; Marissa, IL; and York, NE during the third growing season.

The average yield of plants germinated from Trilex+LCO seeds exceeded the average yield of plants germinated from control seeds treated by 2.2 bushels per acre.

Example 11

LCO Increased Yield of Soybean Seeds Treated With Trilex®

Soybean seeds treated with Trilex® 6000 (trifloxystrobin, metalaxyl, imidacloprid, *Bacillus pumilus* GB34; Bayer CropScience, Research Triangle Park, NC) ("control") or Trilex® 6000 and LCO (ProStablish™, Novozymes BioAg Inc., Brookfield, WI) ("Trilex+LCO").

Control and Trilex+LCO seeds were planted in various locations during two separate growing seasons: Campbell, MN; Fishers, IN; Sparta, IL; Verona, WI; and York, NE during the first growing season, and Arkansaw, WI; Carroll, IA; Fitchburg, WI; and Sparta, IL during the second growing season.

The average yield of plants germinated from Trilex+LCO seeds exceeded the average yield of plants germinated from control seeds treated by 2.7 bushels per acre.

Example 12

LCO Increased Yield of Soybean Seeds Treated With Poncho®/Votivo® and Trilex®

Soybean seeds treated with Poncho®/Votivo® (clothianidin, *Bacillus firmus*; Bayer CropScience, Research Triangle Park, NC) Trilex® 2000 (Bayer CropScience, Research Triangle Park, NC) ("control") or Poncho®/Votivo®, Trilex® 2000, and LCO (Torque® ST, Novozymes BioAg Inc., Brookfield, WI) ("Poncho/Votivo+Trilex+LCO").

Control and Poncho/Votivo+Trilex+LCO seeds were planted in Arkansaw, WI; Carroll, IA; Madison, WI; and Sparta, IL.

The average yield of plants germinated from Poncho/Votivo+Trilex+LCO seeds exceeded the average yield of plants germinated from control seeds treated by 3.9 bushels per acre.

Example 13

LCO Increased Yield of Soybean Seeds Treated With Poncho®/Votivo® and Trilex®

Soybean seeds treated with Poncho®/Votivo® (clothianidin, *Bacillus firmus*; Bayer CropScience, Research Triangle Park, NC) Trilex® 2000 (trifloxystrobin, metalaxyl; Bayer CropScience, Research Triangle Park, NC) ("control") or Poncho®/Votivo®, Trilex® 2000, and LCO (ProStablish™, Novozymes BioAg Inc., Brookfield, WI) ("Poncho/Votivo+Trilex+LCO").

Control and Poncho/Votivo+Trilex+LCO seeds were planted in Arkansaw, WI; Campbell, MN; Carroll, IA; Oregon, WI; and Sparta, IL.

The average yield of plants germinated from Poncho/Votivo+Trilex+LCO seeds exceeded the average yield of plants germinated from control seeds treated by 2.0 bushels per acre.

Example 14

LCO Increased Yield of Soybean Seeds Treated With Pioneer® Premium Seed Treatment Soybean seeds treated with Pioneer® Premium Seed Treatment (trifloxystrobin, metalaxyl, imidacloprid, *Bradyrhizobium japonicum*, LCO; DuPont Pioneer, Johnston, IA) ("control") or Pioneer® Premium Seed Treatment and LCO (Torque® ST, Novozymes BioAg Inc., Brookfield, WI) ("PPST+LCO").

Control and PPST+LCO seeds were planted in Fishers, IN; Oregon, WI; Sparta, IL; and York, NE.

The average yield of plants germinated from PPST+LCO seeds exceeded the average yield of plants germinated from control seeds treated by 2.1 bushels per acre.

Example 15

LCO Increased Yield of Soybean Seeds Treated With Pioneer® Premium Seed Treatment Soybean seeds treated with Pioneer® Premium Seed Treatment (trifloxystrobin, metalaxyl, imidacloprid, *Bradyrhizobium japonicum*, LCO; DuPont Pioneer, Johnston, IA) ("control") or Pioneer® Premium Seed Treatment and LCO (ProStablish™, Novozymes BioAg Inc., Brookfield, WI) ("PPST+LCO").

Control and PPST+LCO seeds were planted in various locations during two separate growing seasons: Fishers, IN; Oregon, WI; Sparta, IL; and York, NE during the first growing season and Arkansaw, WI; Clarence, MN; Fishers, IN; Geneva, WI; Madison, WI; Sparta, IL; Stoneville, MS; and York, NE during the second growing season.

The average yield of plants germinated from PPST+LCO seeds exceeded the average yield of plants germinated from control seeds treated by 1.3 bushels per acre.

The foregoing is illustrative of the present invention and is not to be construed as limiting thereof. Although exemplary embodiments have been described above, those skilled in the art will readily appreciate that various modifications may be made to those embodiments without materially departing from the novel teachings and advantages of the present invention. Accordingly, all such modifications are intended to be included within the scope of the present invention.

That which is claimed:

1. A method comprising applying (a) *Streptomyces lydicus* WYEC 108 and (b) a lipo-chitooligosaccharide selected from the lipo-chitooligosaccharide represented by structure (V):

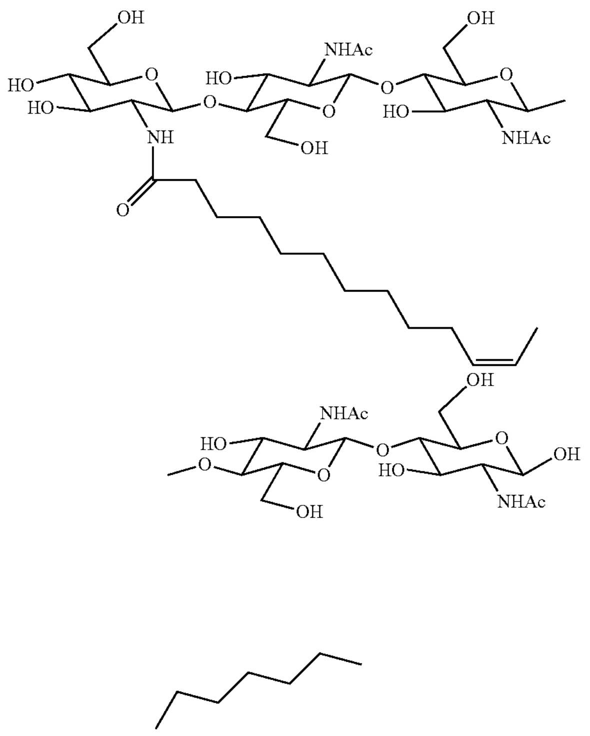

and the lipo-chitooligosaccharide represented by structure (VII):

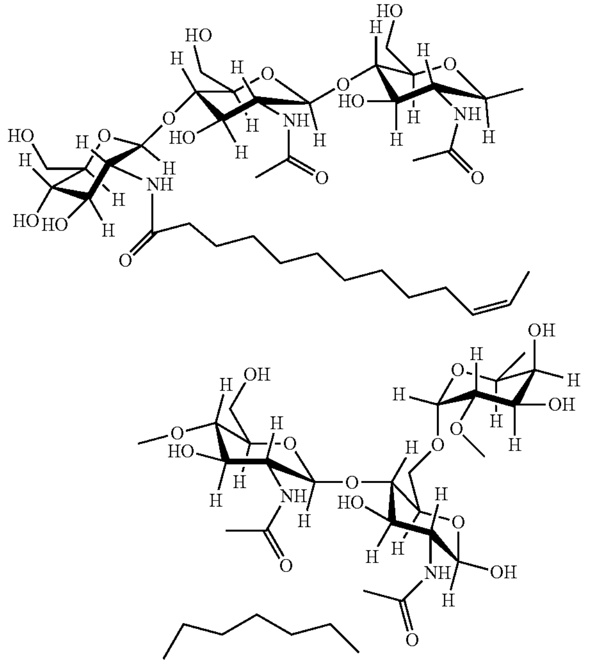

to a plant seed in amounts effective to synergistically enhance one or more growth parameters of the plant that grows from said seed vis-à-vis separate application of (a) and (b), wherein said *Streptomyces lydicus* WYEC 108 is applied to the plant seed at least at a rate of $1\times10^4$ to $1\times10^5$ colony forming units (CFU) per seed, and wherein said lipo-chitooligosaccharide is applied to the plant seed at a rate of at least 1.86 μg per cwt (μg/hundred weight).

2. The method of claim 1, wherein said one or more growth parameters comprises shoot diameter, shoot area, and/or shoot volume.

3. The method of claim 1, wherein said one or more growth parameters comprises root volume.

4. The method of claim 1, wherein said plant seed is leguminous.

5. The method of claim 1, wherein said plant seed is a soybean seed.

6. The method of claim 1, wherein said plant seed is non-leguminous.

7. The method of claim 1, wherein said plant seed is a corn seed.

8. The method of claim 1, wherein said lipo-chitooligosaccride is the lipo-chitooligosaccharide represented by structure (V):

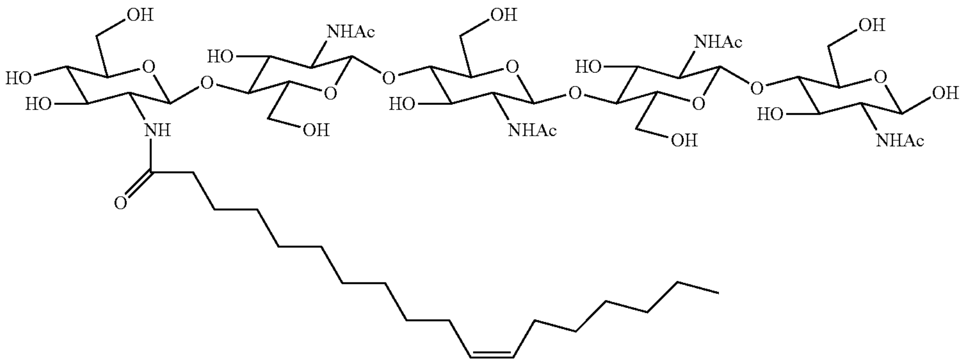 [SMILES: CCCCCC/C=C\CCCCCCCCCC(=O)NC1C(OC2C(CO)OC(OC3C(CO)OC(OC4C(CO)OC(OC5C(CO)OC(O)C(NC(C)=O)C5O)C(NC(C)=O)C4O)C(NC(C)=O)C3O)C(NC(C)=O)C2O)OC(CO)C(O)C1O]

-

9. The method of claim 1, wherein said lipo-chitooligosaccride is the lipo-chitooligosaccharide represented by structure (VII):

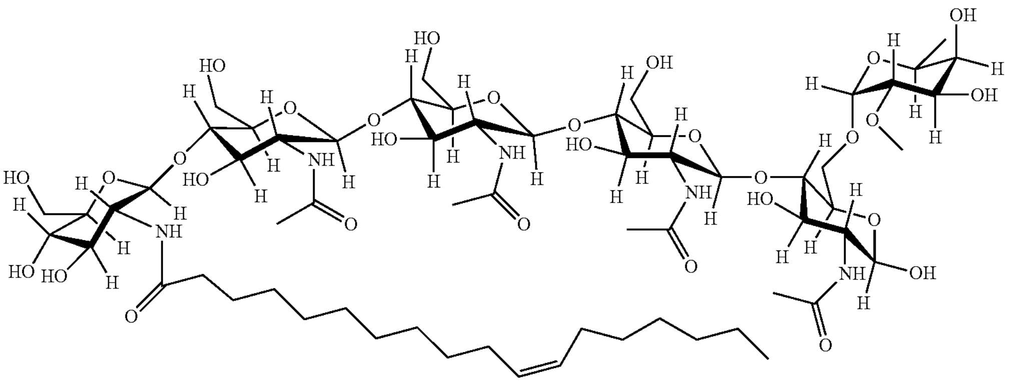

10. The method of claim 1, wherein the lipo-chitooligosaccharide represented by structure (V):

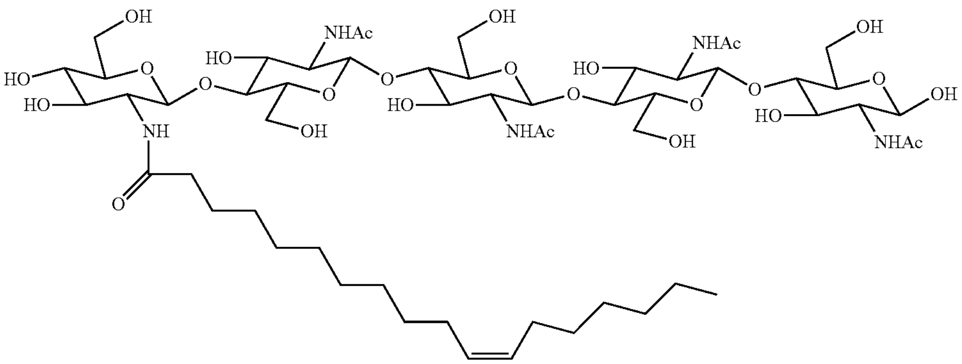 [SMILES: CCCCCC/C=C\CCCCCCCCCC(=O)NC1C(OC2C(CO)OC(OC3C(CO)OC(OC4C(CO)OC(OC5C(CO)OC(O)C(NC(C)=O)C5O)C(NC(C)=O)C4O)C(NC(C)=O)C3O)C(NC(C)=O)C2O)OC(CO)C(O)C1O]

is applied to said plant seed at a rate of about 1.86 ug per cwt.

11. The method of claim 1, wherein the lipo-chitooligosaccharide represented by structure (VII):

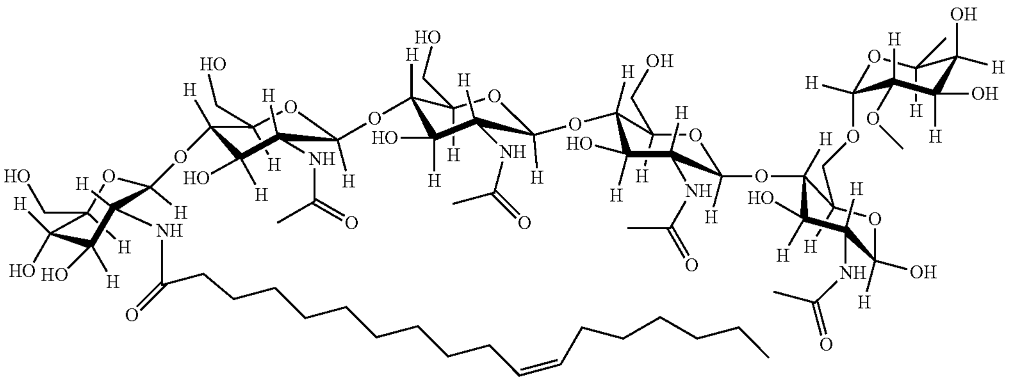

is applied to said plant seed at a rate of about 1.86 ug per cwt.

12. A composition comprising (a) *Streptomyces lydicus* WYEC 108 and (b) one or more lipo-chitooligosaccharides selected from the lipo-chitooligosaccharide represented by the structure (V):

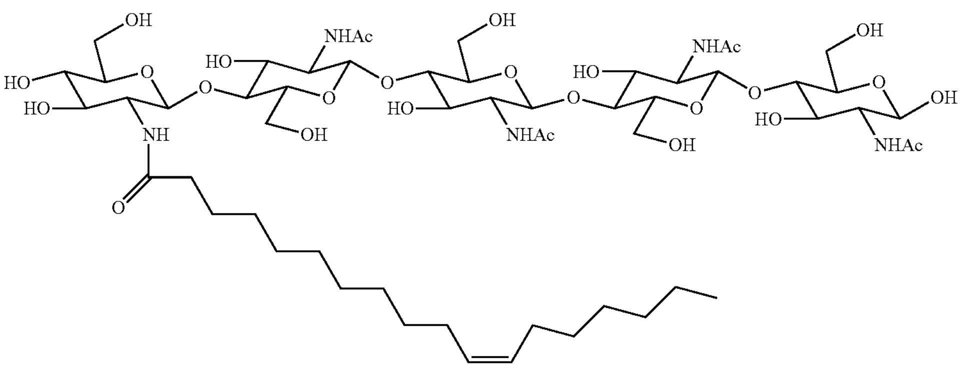 [SMILES: CCCCCC/C=C\CCCCCCCCCC(=O)NC1C(OC2C(CO)OC(OC3C(CO)OC(OC4C(CO)OC(OC5C(CO)OC(O)C(NC(C)=O)C5O)C(NC(C)=O)C4O)C(NC(C)=O)C3O)C(NC(C)=O)C2O)OC(CO)C(O)C1O]

and the lipo-chitooligosaccharide represented by the structure (VII):

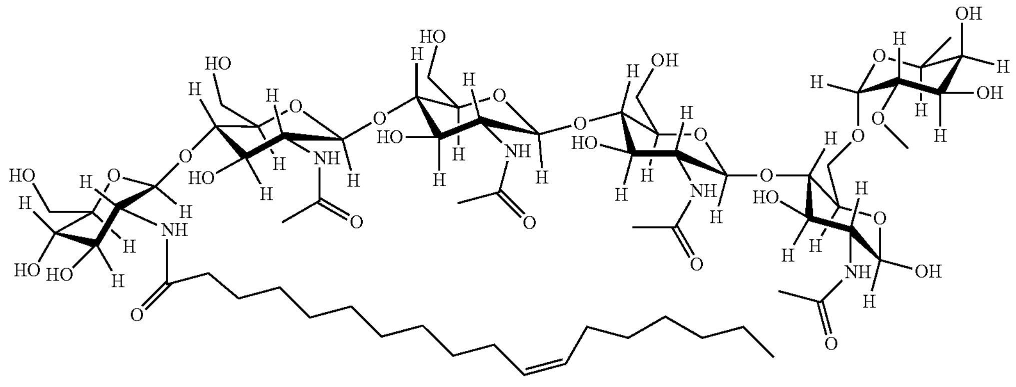

in amounts effective to synergistically enhance one or more growth parameters of a plant when said composition is applied to said plant and/or to the seed from which said plant is grown vis-à-vis separate application of (a) and (b), wherein said *Streptomyces lydicus* WYEC 108 is applied to the plant and/or seed at least at a rate of $1\times10^4$ to $1\times10^5$ colony forming units (CFU) per plant and/or seed, and wherein said lipo-chitooligosaccharide is applied to the plant and/or seed at a rate of at least 1.86 μg per cwt (μg/hundred weight).

13. The composition of claim 12, wherein said one or more growth parameters comprises shoot diameter, shoot area, and/or shoot volume.

14. The composition of claim 12, wherein said one or more growth parameters comprises root volume.

15. The composition of claim 12, wherein said composition comprises the lipo-chitooligosaccharide represented by structure (V):

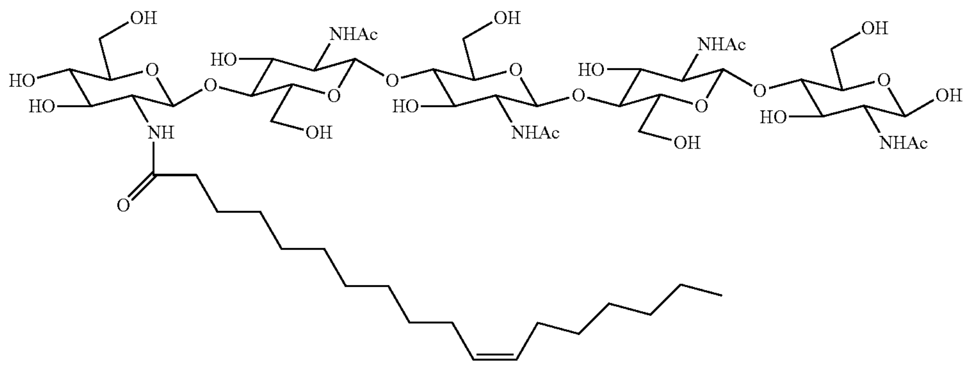 [SMILES: CCCCCC/C=C\CCCCCCCCCC(=O)NC1C(OC2C(CO)OC(OC3C(CO)OC(OC4C(CO)OC(OC5C(CO)OC(O)C(NC(C)=O)C5O)C(NC(C)=O)C4O)C(NC(C)=O)C3O)C(NC(C)=O)C2O)OC(CO)C(O)C1O]

16. The composition of claim 12, wherein said composition comprises the lipo-chitooligosaccharide represented by structure (VII):

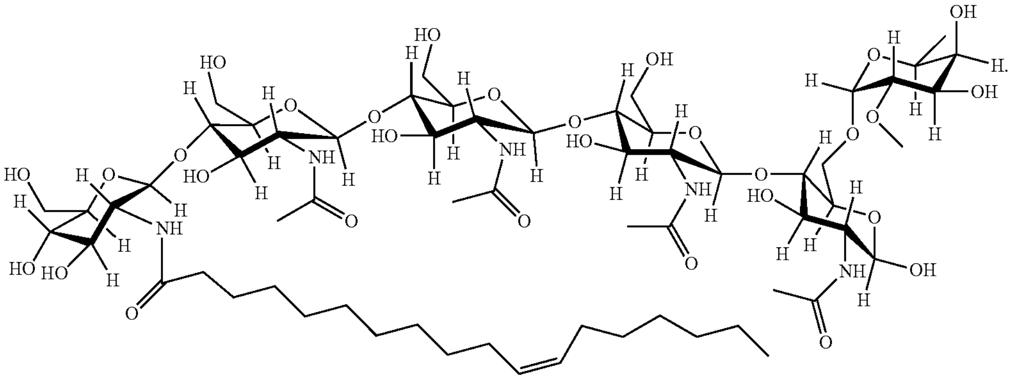
17. The composition of claim 12, wherein said plant and/or seed from which said plant is grown is leguminous.
18. The composition of claim 12, wherein said plant and/or seed from which said plant is grown is soybean.
* * * * *